US008931346B2

(12) United States Patent
Rieder et al.

(10) Patent No.: US 8,931,346 B2
(45) Date of Patent: *Jan. 13, 2015

(54) VIBRATION TYPE MEASURING TRANSDUCER AND MEASURING SYSTEM FORMED THEREWITH

(75) Inventors: Alfred Rieder, Landshut (DE); Christof Huber, Bern (CH); Ennio Bitto, Aesch (CH); Christian Schutze, Basel (CH); Marcel Braun, Inzlingen (DE)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 13/976,138

(22) PCT Filed: Nov. 24, 2011

(86) PCT No.: PCT/EP2011/070877
§ 371 (c)(1),
(2), (4) Date: Sep. 12, 2013

(87) PCT Pub. No.: WO2012/089431
PCT Pub. Date: Jul. 5, 2012

(65) Prior Publication Data
US 2014/0000374 A1 Jan. 2, 2014

Related U.S. Application Data

(60) Provisional application No. 61/428,541, filed on Dec. 30, 2010.

(30) Foreign Application Priority Data

Dec. 30, 2010 (DE) .......................... 10 2010 056 465
Jun. 22, 2011 (DE) .......................... 10 2011 077 994

(51) Int. Cl.
*G01H 1/00* (2006.01)
*G01F 1/84* (2006.01)
(Continued)

(52) U.S. Cl.
CPC ............ *G01F 1/8472* (2013.01); *G01F 1/8413* (2013.01); *G01F 1/8477* (2013.01)
USPC ........................................ 73/658; 73/861.355

(58) Field of Classification Search
USPC .................................. 73/658 P, 658, 861.355
See application file for complete search history.

(56) References Cited

U.S. PATENT DOCUMENTS 6,415,668 B1    7/2002  Cage
(Continued)

FOREIGN PATENT DOCUMENTS

WO        2011085852 A1     7/2011

OTHER PUBLICATIONS
English Machine Translation of WO 2011/085852, Schutze.*
(Continued)

*Primary Examiner* — Lisa Caputo
*Assistant Examiner* — Philip Cotey
(74) *Attorney, Agent, or Firm* — Bacon & Thomas, PLLC

(57) ABSTRACT

A measuring transducer having exactly four flow openings, and an outlet-side housing end formed by means of an outlet-side flow divider having exactly four flow openings. A tube arrangement has exactly four curved or bent measuring tubes connected to the flow dividers for guiding flowing medium along flow paths connected in parallel. Each of the four measuring tubes opens with an inlet-side measuring tube end into one of the flow openings of the inlet-side flow divider, and with an outlet-side measuring tube end into one of the flow openings of the outlet-side flow divider. A first coupling element for adjusting eigenfrequencies of natural oscillation modes of the tube arrangement. An electro-mechanical exciter mechanism of the measuring transducer serves for producing and/or maintaining mechanical oscillations of the four measuring tubes. The first coupling element of first type includes, furthermore, a deformation body as well as four connecting struts, of which each is connected both with the deformation body as well as also with exactly one of the measuring tubes; conversely, also each of the measuring tubes is connected with exactly one of the four connecting struts.

52 Claims, 14 Drawing Sheets

(51) Int. Cl.
*G01H 11/06* (2006.01)
*G01N 1/00* (2006.01)
*G01N 9/18* (2006.01)
*G01N 29/00* (2006.01)
*G01R 9/04* (2006.01)

(56) References Cited

U.S. PATENT DOCUMENTS

2006/0016273 A1* 1/2006 Bitto et al. ............... 73/861.355
2007/0095152 A1* 5/2007 Bitto et al. ............... 73/861.355
2011/0167907 A1 7/2011 Bitto
2011/0265580 A1* 11/2011 Huber et al. ............. 73/861.357

OTHER PUBLICATIONS

International Search Report, EPO Patent Office, The Netherlands, Apr. 27, 2012.
English translation of the IPR, WIPO, Geneva, Jul. 11, 2013.

* cited by examiner

VIBRATION TYPE MEASURING TRANSDUCER AND MEASURING SYSTEM FORMED THEREWITH

TECHNICAL FIELD

The invention relates to a measuring transducer of the vibration type having four curved measuring tubes and serving for measuring a flowable medium conveyed in a pipeline, especially a gas, a liquid, a powder or other flowable material, especially a measuring transducer of the vibration type for measuring a density and/or a mass flow rate, especially also a total mass flow totaled over a time interval of a medium flowing in a pipeline at least at times and having a mass flow rate of more than 1000 t/h, especially more than 1500 t/h. Additionally, the invention relates to a measuring system with such a measuring transducer, for instance, one embodied as an in-line measuring device.

BACKGROUND DISCUSSION

In process measurements and automation technology, for measuring physical parameters, such as, for example, the mass flow, the density and/or the viscosity of media flowing in pipelines—for instance, an aqueous liquid, a gas, a liquid-gas mixture, a steam, an oil, a paste, a slurry or another flowabie material—such in-line measuring devices are often used, which, by means of a measuring transducer of the vibration type through which medium flows, and by means of a measuring and operating circuit connected thereto, effect reaction forces in the medium—such as, for example, Coriolis forces corresponding to a mass flow, inertial forces corresponding to a density of the medium and/or frictional forces corresponding to a viscosity of the medium, etc.—and, derived from these, produce a measurement signal representing the particular mass flow, viscosity and/or density of the medium. Such measuring transducers, especially measuring transducers embodied as Coriolis mass flow meters or Coriolis mass flow/densimeters, are described at length and in detail in, for example, EP-A 1 001 254, EP-A 553 939, US-A 2002/0157479, US-A 2006/0150750, US-A 2007/0151368, U.S. Pat. No. 4,793,191, U.S. Pat. No. 5,370,002, U.S. Pat. No. 5,796,011, U.S. Pat. No. 6,308,580, U.S. Pat. No. 6,415,668, U.S. Pat. No. 6,711,958, U.S. Pat. No. 6,920,798, U.S. Pat. No. 7,134,347, U.S. Pat. No. 7,392,709, or WO-A 03/027616.

Each of the measuring transducers includes a transducer housing, an inlet-side, first housing end of which is formed at least partially by means of a first flow divider having exactly two, mutually spaced, circularly cylindrical, or tapered or conical flow openings, and an outlet-side, second housing end formed at least partially by means of a second flow divider having exactly two, mutually spaced flow openings. In the case of some of the measuring transducers illustrated in U.S. Pat. No. 5,796,011, or U.S. Pat. No. 7,350,421, or US-A 2007/0151368, the transducer housing comprises a rather thick-walled, circularly cylindrical, tubular segment, which forms at least a middle segment of the transducer housing.

For guiding a medium (in given cases also an extremely hot medium), which flows, at least at times, the measuring transducers include furthermore in each case exactly two measuring tubes made of metal, especially steel or titanium, which are connected in such a manner that the medium can flow in parallel, and which are positioned within the transducer housing and held oscillatably therein by means of the aforementioned flow dividers. A first of the measuring tubes, which are most often equally constructed and extend parallelly relative to one another, opens with an inlet-side, first measuring tube end into a first flow opening of the inlet-side, first flow divider, and opens with an outlet-side, second measuring tube end into a first flow opening of the outlet-side, second flow divider. A second of the measuring tubes opens with an inlet-side, first measuring tube end into a second flow opening of the first flow divider, and opens with an outlet-side, second measuring tube end into a second flow opening of the second flow divider. Each of the flow dividers additionally in each case includes a flange with a sealing surface for fluid-tight connecting of the measuring transducer to tubular segments of the pipeline, which serve, respectively, for supplying and removing medium to and from the measuring transducer.

For producing the reaction forces discussed above, the measuring tubes are caused to vibrate during operation, driven by an exciter mechanism serving for producing or maintaining, as the case may be, mechanical oscillations, especially bending oscillations, of the measuring tubes in the so-called wanted mode. The oscillations in the wanted mode are, especially in the case of application of the measuring transducer as a Coriolis mass flow meter and/or densimeter, most often formed at least partially as lateral bending oscillations, and, in the case of medium flowing through the measuring tubes, as a result of Coriolis forces induced therein, superimposed with additional, equal-frequency oscillations in the so-called Coriolis mode. Accordingly, the—here most often electrodynamic—exciter mechanism is embodied in such a manner that, therewith, the two measuring tubes are, in the wanted mode, differentially—thus via introduction of exciter forces acting simultaneously along a shared line of action, but in opposed directions—excitable at least partially and especially also predominantly to opposite-equal bending oscillations.

For registering vibrations, especially bending oscillations, of the measuring tubes excited by means of the exciter mechanism, and for producing oscillation signals representing vibrations, the measuring transducers additionally each have a—most often likewise electrodynamic—sensor arrangement reacting to relative movements of the measuring tubes. Typically, the sensor arrangement is formed by means of an inlet-side oscillation sensor registering oscillations of the measuring tubes differentially—thus only relative movements of the measuring tubes—as well as by means of an outlet-side oscillation sensor registering oscillations of the measuring tubes differentially. Each of the oscillation sensors, which are usually equally constructed with respect to one another, is formed by means of a permanent magnet held on the first measuring tube and a cylindrical coil held on the second measuring tube and permeated by the magnetic field of the permanent magnet.

In operation, the above described tube arrangement formed by means of the two measuring tubes is, at least at times, excited by means of the electromechanical exciter mechanism to perform mechanical oscillations in the wanted mode at at least one dominating, wanted oscillation frequency. In such case, usually a natural, instantaneous resonance frequency of the tube arrangement, which, in turn, depends essentially both on the size, shape and material of the measuring tubes as well as also on an instantaneous density of the medium (and, insofar, as is known, can serve also as a measure for the density of the medium), is selected as the oscillation frequency for the oscillations in the wanted mode; in given cases, this wanted oscillation frequency can also be influenced significantly by an instantaneous viscosity of the medium. As a result of fluctuating density of the medium being measured and/or as a result of media change occurring during operation, the wanted oscillation frequency during operation of the measuring transducer varies naturally, at least within a calibrated, and thus predetermined, wanted frequency band, which correspondingly has a predetermined lower limit frequency and a predetermined upper limit frequency.

For defining a wanted oscillatory length of the measuring tubes and, in association therewith, for adjusting the band of the wanted frequency, measuring transducers of the above described type additionally most often include at least one inlet-side coupling element, which is affixed to both measuring tubes and spaced from the two flow dividers, this coupling element serving for forming inlet-side oscillation nodes for opposite-equal vibrations—especially bending oscillations—of both measuring tubes, as well as at least one outlet-side coupling element, which is affixed to both measuring tubes and spaced both from the two flow dividers, as well as also from the inlet-side coupling element, this outlet-side coupling element serving for forming outlet-side oscillation nodes for opposite-equal vibrations—especially bending oscillations—of the measuring tubes. In the case of curved measuring tubes, the length of a section of a deflection curve of any of the measuring tubes extending between the inlet side and the outlet-side coupling elements—and consequently the length of an imaginary center line of said measuring tube connecting the areal centers of gravity of all imaginary cross sectional areas of the respective measuring tube—corresponds to the wanted oscillatory length of the measuring tubes. By means of the coupling elements, which thus belong to the tube arrangement, also an oscillation quality factor of the tube arrangement, as well as also the sensitivity of the measuring transducer, can additionally be influenced, in a manner such that, for a minimum required sensitivity of the measuring transducer, at least one minimum, wanted oscillatory length is provided.

Development in the field of measuring transducers of vibration type has, by this point, reached a level wherein modern measuring transducers of the described type can, for a broad application spectrum of flow measurement technology, satisfy the highest requirements as regards precision and reproducibility of measurement results. Thus, such measuring transducers are, in practice, used for mass flow rates from some few g/h (grams per hour) up to some t/min (tons per minute), at pressures of up to 100 bar for liquids or even over 300 bar for gases. The accuracy of measurement achieved, in such case, usually lies at about 99.9% of the actual value or above, respectively a measuring error of about 0.1%, wherein a lower limit of the guaranteed measurement range can quite easily lie at about 1% of the measurement range end value. Due to their wide range of possibilities for use, industrial grade measuring transducers of vibration type are available with nominal diameters (corresponding to the caliber of the pipeline to be connected to the measuring transducer, or to the caliber of the measuring transducer measured at the connecting flange), which lie in a nominal diameter range of between 1 mm and 250 mm, and at maximum nominal mass flow rate of 1000 t/h, are in each case specified for pressure losses of less than 3 bar. A caliber of the measuring tubes lies, in such case, for instance, in a range of between 80 mm and 100 mm.

In spite of the fact that, by this point, measuring transducers for use in pipelines with very high mass flow rates and, in association therewith, very large calibers of far beyond 100 mm have become available, there is still considerable interest in obtaining measuring transducers of high precision and low pressure loss also for still larger pipeline calibers of about 300 mm or more, or mass flow rates of 1500 t/h or more, for instance for applications in the petrochemical industry or in the field of transport and transfer of petroleum, natural gas, fuels, etc. This leads, in the case of correspondingly scaled enlarging of the already established measuring transducer designs known from the state of the art, especially from EP-A 1 001 254, EP-A 553 939, US-A 2002/0157479, US-A 2007/0151368, U.S. Pat. No. 4,793,191, U.S. Pat. No. 5,370,002, U.S. Pat. No. 5,796,011, U.S. Pat. No. 6,308,580, U.S. Pat. No. 6,711,958, U.S. Pat. No. 7,134,347, U.S. Pat. No. 7,350,421, or WO-A 03/027616, to the fact that the geometric dimensions would be exorbitantly large, especially the installed length corresponding to a distance between the sealing surfaces of both flanges and, in the case of curved measuring tubes, a maximum lateral extension of the measuring transducer, especially dimensions for the desired oscillation characteristics, the required load-bearing ability, as well as the maximum allowed pressure loss. Along with that, also the empty mass of the measuring transducer increases unavoidably, with conventional measuring transducers of large nominal diameters already having an empty mass of about 400 kg. Investigations, which have been carried out for measuring transducers with two bent measuring tubes constructed, for instance, according to U.S. Pat. No. 7,350,421 or U.S. Pat. No. 5,796,011 as regards their to-scale enlargement to still greater nominal diameters, have, for example, shown that, for nominal diameters of more than 300 mm, the empty mass of a conventional measuring transducer enlarged to scale would lie far above 500 kg, accompanied by an installed length of more than 3000 mm, and a maximum lateral extension of more than 1000 mm. As a result, it can be said that industrial grade, mass producible measuring transducers of conventional design and materials with nominal diameters far above 300 mm cannot be expected in the foreseeable future both for reasons of technical implementability, as well as also due to economic considerations.

Taking this into consideration, in the assignee's own, non-pre-published international patent applications PCT/EP2010/068251, or PCT/EP2010/068250, for example, new measuring transducers of the vibration type, which are not least of all also scalable to comparatively large nominal nominal diameters of more than 300 mm, are in each case provided, wherein the particular tube arrangement of these measuring transducers in each case comprises four bent measuring tubes—for example, at least sectionally V-shaped and/or at least sectionally circular arc shaped measuring tubes—for conveying flowing medium. These measuring tubes are in each case connected to the flow dividers, which accordingly also each have four flow openings, so as to form flow paths, along which parallel flow can take place. Of the measuring tubes, a first measuring tube opens with an inlet-side first measuring tube end into in a first flow opening of the first flow divider, and opens with an outlet-side second measuring tube end into a first flow opening of the second flow divider; a second measuring tube parallel to the first measuring tube opens with an inlet-side first measuring tube end into a second flow opening of the first flow divider, and with an outlet-side second measuring tube end into a second flow opening of the second flow divider; a third measuring tube opens with an inlet-side first measuring tube end into a third flow opening of the first flow divider, and with an outlet-side second measuring tube end into a third flow opening of the second flow divider; and a fourth measuring tube parallel to the third measuring tube opens with an inlet-side first measuring tube end into a fourth flow opening of the first flow divider, and with an outlet-side second measuring tube end into a fourth flow opening of the second flow divider. Especially, in PCT/EP2010/068251, not least of all for the purpose of reducing undesired oscillation-related deformations of the flow dividers, it is additionally provided to excite as the wanted mode a natural bending oscillation mode inherent to the tube arrangement—the so-called V-mode—in which the first and second measuring tubes in each case execute opposite-equal bending oscillations about a static resting position associated with the respective measuring tubes, and in which the third and the fourth measuring tubes in each case execute opposite-equal bending oscillations about a static resting position associated with the respective measuring tubes, and in such a manner that, relative to an imaginary longitudinal section plane of the tube arrangement extending between the first and third measuring tubes as well as also between the second and the fourth measuring tubes, said bending oscillations of the first measuring tube are also opposite-equal to said bending oscillations of the third measuring tube, and that, relative to the imaginary longitudinal section plane, said bending oscillations of the second measuring tube are also opposite-equal to said bending oscillations of the fourth measuring tube.

Further investigations have revealed, however, that a special problem in such case can be that an eigenfrequency, thus also the instantaneous resonance frequency, of the V-mode of the tube arrangement is initially—thus without taking additional actions—essentially equal to an eigen-, respectively resonance, frequency of an additional natural bending oscillation mode inherent to the tube arrangement—the so-called X-mode—in which the first and second measuring tubes in each case execute opposite-equal bending oscillations about a static resting position associated with the respective measuring tubes, and in which the third and the fourth measuring tubes in each case execute opposite-equal bending oscillations about a static resting position associated with the respective measuring tubes, but do so, however, in such a manner that, relative to the aforementioned imaginary longitudinal section plane, said bending oscillations of the first measuring tube are also opposite-equal to said bending oscillations of the fourth measuring tube, and that, relative to the imaginary longitudinal section plane, said bending oscillations of the second measuring tube are also opposite-equal to said bending oscillations of the third measuring tube. As a result of this, in the case of measuring transducers with a tube arrangement of the aforementioned type having four measuring tubes, the case can certainly occur that the tube arrangement, when actually exciting the V-mode, namely to its instantaneous resonance frequency, switches in an unpredictable manner from the V-mode to the X-mode and vice versa, or simultaneously oscillates both in the V-mode as well as also in the X-mode, so that the tube arrangement, as a result, at times assumes undefined oscillatory states.

SUMMARY OF THE INVENTION

Proceeding from the aforementioned state of the art, an object of the invention is consequently to provide a measuring transducer with a tube arrangement having four curved measuring tubes, wherein this tube arrangement also has a stable oscillatory state in the V-mode, and consequently wherein a use of at least the V-mode as the actively excited wanted mode is enabled, or a capability of the V-mode being used as an actively excited wanted mode is further improved.

For achieving the object, the invention resides in a measuring transducer of the vibration type for registering at least one physical, measured variable of a flowable medium conveyed in a pipeline, for example, a gas, a liquid, a powder or other flowable material, and/or for producing Coriolis forces serving for registering a mass flow rate of a flowable medium conveyed in a pipeline, especially a gas, a liquid, a powder or other flowable material. According to the invention, the measuring transducer comprises a transducer housing (for example, an at least partially essentially tubular and/or at least partially externally circularly cylindrical, transducer housing), an inlet-side, first housing end of which is formed by means of an inlet-side, first flow divider having exactly four flow openings, which are, for example, circularly cylindrical, tapered or conical, and which are in each case spaced from one another; and an outlet-side, second housing end of which is formed by means of an outlet-side, second flow divider having exactly four flow openings, which are, for example, circularly cylindrical, tapered or conical, and which are in each case spaced from one another.

Furthermore, the measuring transducer comprises a tube arrangement with exactly four, curved or bent measuring tubes for conveying flowing medium on flow paths connected in parallel. These four measuring tubes are connected to the flow dividers, for example, equally-constructed flow dividers, and oscillatably held in the transducer-housing, for example only by means of said flow dividers, and/or are equally constructed and/or are pairwise parallel to one another. Of the four measuring tubes, which are, for example, constructed equally both as regards geometry as well as also as regards material, a first measuring tube, especially a circularly cylindrical, first measuring tube, opens with an inlet-side, first measuring tube end into a first flow opening of the first flow divider, and opens with an outlet-side, second measuring tube end into a first flow opening of the second flow divider; a second measuring tube, which is at least sectionally parallel to the first measuring tube, opens with an inlet-side, first measuring tube end into a second flow opening of the first flow divider, and opens with an outlet-side, second measuring tube end into a second flow opening of the second flow divider; a third measuring tube opens with an inlet-side, first measuring tube end into a third flow opening of the first flow divider, and opens with an outlet-side, second measuring tube end into a third flow opening of the second flow divider; and a fourth measuring tube, which is at least sectionally parallel to the third measuring tube, opens with an inlet-side, first measuring tube end into a fourth flow opening of the first flow divider, and opens with an outlet-side, second measuring tube end into a fourth flow opening of the second flow divider. Additionally, the measuring transducer includes an electromechanical exciter mechanism—for example, one formed by means of one or more electrodynamic oscillation exciters—for producing and/or maintaining mechanical oscillations, for example bending oscillations, of the four measuring tubes.

In the case of the measuring transducer of the invention, the two flow dividers are additionally embodied and arranged in the measuring transducer in such a manner that an imaginary first connecting axis of the measuring transducer imaginarily connecting the first flow opening of the first flow divider with the first flow opening of the second flow divider extends parallel to an imaginary second connecting axis of the measuring transducer imaginarily connecting the second flow opening of the first flow divider with the second flow opening of the second flow divider, and that an imaginary third connecting axis of the measuring transducer imaginarily connecting the third flow opening of the first flow divider with the third flow opening of the second flow divider extends parallel to an imaginary fourth connecting axis of the measuring transducer imaginarily connecting fourth flow opening of the first flow divider with fourth flow opening of the second flow divider, and the measuring tubes are embodied and arranged in such a manner that the tube arrangement has a first imaginary longitudinal section plane extending both between the first measuring tube and the third measuring tube as well as also between the second measuring tube and the fourth measuring tube, and that the tube arrangement has a second imaginary longitudinal section plane, which is perpendicular to its imaginary first longitudinal section plane, and which extends both between the first measuring tube and second measuring tube as well as also between the third measuring tube and the fourth measuring tube. Apart from this, the tube arrangement also additionally has an imaginary cross sectional plane, which is in each case perpendicular both to the first imaginary longitudinal section plane as well as also to the second imaginary longitudinal section plane.

Furthermore, the tube arrangement, and consequently the measuring transducer of the invention formed therewith, includes a first coupling element of the first type, which is spaced both from the first flow divider as well as also from the second flow divider and is affixed, for example on the inlet side, to each of the four measuring tubes. The first coupling element of the first type is furthermore embodied, for instance, as a frame construction and/or as an interconnection of struts, and serves for setting the eigenfrequencies of natural oscillation modes of the tube arrangement, not least of all also such, in which measuring tubes in each case simultaneously execute, or can execute, bending oscillations about a static resting position. The first coupling element of the first type includes a deformation body, for example, one which is box-shaped and/or formed by means of a frame construction having a plurality of profile struts, bars and/or plates, as well as four connecting struts, which, for example, are equally long and/or at least pairwise equally constructed, of which a first connecting strut, for example, a rod, plate or bar shaped, first connecting strut, is connected both with the deformation body as well as also with the first measuring tube; a second connecting strut, for example, a rod, plate or bar shaped, second connecting strut, is connected both with the deformation body as well as also with the second measuring tube; a third connecting strut, for example, a rod, plate or bar shaped, third connecting strut, is connected both with the deformation body as well as also with the third measuring tube; and a fourth connecting strut, for example, a rod, plate or bar shaped, fourth connecting strut, is connected both with the deformation body as well as also with fourth measuring tube.

Moreover, the invention resides in a measuring system for measuring density and/or mass flow rate—thus, for example, a total mass flow totaled over a time interval—of a medium flowing at least at times in a pipeline, for instance, a medium such as a gaseous material, a liquid, a powder or other flowable material, with, for example, a mass flow rate of more than 1000 t/h. The measuring system, for example one embodied as an in-line measuring device and/or as a measuring device in compact construction, comprises said measuring transducer, as well as—electrically coupled with the measuring transducer, and, for example, arranged in an electronics housing mechanically connected with the transducer housing—a transmitter-electronics for activating the measuring transducer, especially its exciter mechanism, and for evaluating oscillation signals delivered by the measuring transducer. The invention especially thus also resides in the use of the measuring system for measuring a density and/or a mass flow rate, especially a total mass flow totaled over a time interval, and/or a viscosity and/or a Reynolds number of a medium flowing in a process line, for instance, a pipeline, at least at times with a mass flow rate of more than 1000 t/h, for example, more than 1500 t/h; for instance, a medium such as, for example, a gaseous material, a liquid, a powder or other flowable material.

According to a first embodiment of the measuring transducer of the invention, it is, furthermore, provided that each of the four measuring tubes, for example, equally-constructed, measuring tubes, is, at least sectionally, V-shaped or, at least sectionally, circular arc shaped.

According to a second embodiment of the measuring transducer of the invention, it is, furthermore, provided that the first connecting strut is connected with a first strut end with the deformation body and with a second strut end with the first measuring tube, that the second connecting strut is connected with a first strut end with the deformation body and with a second strut end with the second measuring tube, that the third connecting strut is connected with a first strut end with the deformation body and with a second strut end with the third measuring tube, and that fourth connecting strut is connected with a first strut end with the deformation body and with a second strut end with fourth measuring tube.

According to a third embodiment of the measuring transducer of the invention, it is, furthermore, provided that the four connecting struts, for example, equally-constructed, connecting struts, comprise, in each case, metal, especially stainless steel.

According to a fourth embodiment of the measuring transducer of the invention, it is, furthermore, provided that the four connecting struts, for example, equally-constructed, connecting struts, are composed, at least partially, of steel, especially stainless steel.

According to a fifth embodiment of the measuring transducer of the invention, it is, furthermore, provided that each of the four connecting struts, for example, equally-constructed, connecting struts is connected with the respective measuring tube by material bonding. Developing this embodiment of the invention further, it is additionally provided that each of the four connecting struts is hard soldered, or brazed, to the respective measuring tube and/or that each of the four connecting struts is welded to the respective measuring tube According to a sixth embodiment of the measuring transducer of the invention, it is, furthermore, provided that each of the four connecting struts, for example, equally-constructed, connecting struts is affixed to the deformation body by material bonding.

According to a seventh embodiment of the measuring transducer of the invention, it is, furthermore, provided that each of the four connecting struts, for example, equally-constructed, connecting struts, is connected with the deformation body by means of a screwed connection.

According to an eighth embodiment of the measuring transducer of the invention, it is, furthermore, provided that the tube arrangement is mirror symmetrical relative to the first imaginary longitudinal section plane.

According to a ninth embodiment of the measuring transducer of the invention, it is, furthermore, provided that the tube arrangement is mirror symmetrical relative to the second imaginary longitudinal section plane.

According to a tenth embodiment of the measuring transducer of the invention, it is, furthermore, provided that the tube arrangement is mirror symmetrical both relative to the first imaginary longitudinal section plane as well as also relative to the second imaginary longitudinal section plane.

According to an eleventh embodiment of the measuring transducer of the invention, it is, furthermore, provided that the coupling element of first type is so embodied and so arranged that it is mirror symmetrical both relative to the first imaginary longitudinal section plane as well as also relative to the second imaginary longitudinal section plane of the tube arrangement.

According to a twelfth embodiment of the measuring transducer of the invention, it is, furthermore, provided that each of the four measuring tubes has a bending stiffness determined by a modulus of elasticity dependent on a material of the measuring tube, as well as also by an areal moment of inertia dependent on a caliber and a wall thickness, and wherein both the second measuring tube as well as also the third measuring tube and the fourth measuring tube each have a bending stiffness, which, in each case, is equal to the bending stiffness, $E_{18}$, $J_{18}$, of the first measuring tube.

According to a thirteenth embodiment of the measuring transducer of the invention, it is, furthermore, provided that the deformation body is formed by means of a frame construction, especially a frame construction having a plurality of profile struts, bars and/or plates.

According to a fourteenth embodiment of the measuring transducer of the invention, it is, furthermore, provided that inherent to the coupling element of first type is an eigenmode of the first type, in which the deformation body of the coupling element can execute mechanical oscillations with an eigenfrequency in a plane of oscillation parallel to the imaginary cross sectional plane, wherein these oscillations are mirror symmetrical both relative to the first imaginary longitudinal section plane as well as also relative to the second imaginary longitudinal section plane, or which cause the deformation body to appear symmetrical both relative to the first imaginary longitudinal section plane as well as also relative to the second imaginary longitudinal section plane mirror, and also an eigenmode of the second type, in which the deformation body of the coupling element can execute mechanical oscillations in the plane of oscillation parallel to the imaginary cross sectional plane with an eigenfrequency which is, for example, also different from the eigenfrequency of the eigenmode of first type, wherein these oscillations are mirror symmetrical only relative to the second imaginary longitudinal section plane, or the deformation body is temporarily caused to appear mirror symmetrical only relative to the second imaginary longitudinal section plane, and that the deformation body of the coupling element of the first type is embodied in such a manner that an eigenfrequency ratio inherent to the coupling element, which is defined by a ratio of the eigenfrequency of its eigenmode of the first type to the eigenfrequency of its eigenmode of the second type, is greater than one, especially greater than 10.

Developing this embodiment of the invention further, it is additionally provided that inherent in the coupling element of the first type is a natural oscillatory mode of a third type, in which the deformation body, for example, only moving translationally in the direction of a longitudinal axis parallel both to the first imaginary longitudinal section plane as well as also to the second imaginary longitudinal section plane, can oscillate with an eigenfrequency about an associated static rest position, and in such a manner that simultaneous to this, the four connecting struts execute—especially in the same direction and/or uniformly—bending oscillations about a particular static resting position, in the direction of the longitudinal axis, and that the coupling element of the first type is embodied in such a manner that the eigenfrequency of its eigenmode of the third type is not equal to a measurable eigenfrequency of the bending oscillation mode of the first type of the tube arrangement in the case of measuring tubes completely filled with air, and is embodied, for example, in such a manner that the eigenfrequency of the oscillatory mode of the third type of the coupling element of the first type is more than 10 Hz greater than the eigenfrequency of the bending oscillation mode of the first type of the tube arrangement, and/or that the eigenfrequency of the oscillatory mode of the third type of the coupling element of first type amounts to more than 101%, especially more than 105%, of the eigenfrequency of the bending oscillation mode of the first type of the tube arrangement.

Developing this embodiment of the invention further, it is additionally provided that inherent in the coupling element of the first type is a natural oscillatory mode of the fourth type, in which the deformation body, moving only translationally in the plane of oscillation parallel to the imaginary cross sectional plane, can oscillate with an eigenfrequency about its associated static rest position, and in such a manner that the four connecting struts execute—for example, in the same direction and/or uniformly—bending oscillations around its particular static resting position in the coupler plane, and that the coupling element of the first type is embodied in such a manner that the eigenfrequency of its eigenmode of the fourth type is higher than the measurable eigenfrequency of the bending oscillation mode of the second type the tube arrangement in the case of measuring tubes completely filled with air, and embodied, for example, in such a manner that the eigenfrequency of the mode of oscillation of the fourth type of the coupling element of the first type is more than 10 Hz greater than the eigenfrequency of the bending oscillation mode of the second type of the tube arrangement, and/or that the eigenfrequency of the mode of oscillation of the fourth type of the coupling element of the first type amounts to more than 101%, especially more than 105%, of the eigenfrequency, $f_{18X}$, of the bending oscillation mode of the second type of the tube arrangement.

According to a fifteenth embodiment of the measuring transducer of the invention, it is, furthermore, provided that the deformation body has at least two longitudinal struts—for example, equally constructed and/or plate-shaped longitudinal struts—of which a first longitudinal strut, which is, for example, at least sectionally straight, and which extends from the first connecting strut to the third connecting strut, is arranged spaced from the second imaginary longitudinal section plane, exclusively on a side of the longitudinal section plane occupied both by the first as well as also by the third measuring tube, and a second longitudinal strut, which is, for example, at least sectionally straight, and which extends from the second connecting strut to the fourth connecting strut, is arranged spaced from the second imaginary longitudinal section plane, for example by the same distance as the first longitudinal strut, exclusively on a side of the longitudinal section plane occupied both by the second as well as also by the fourth measuring tube. The two longitudinal struts, which especially are equally constructed, can be formed, for example, by means of a flat bar, especially one composed of metal, or can each be composed of the same material, and/or each be composed of steel.

Developing this embodiment of the invention further, it is additionally provided that the first longitudinal strut is at least sectionally straight—for example, predominantly or completely straight—in projection on the imaginary cross sectional plane, wherein the second longitudinal strut is at least sectionally straight—for example, predominantly or completely straight—in projection on the imaginary cross sectional plane; and/or that the first longitudinal strut at least sectionally extends perpendicular to the first imaginary longitudinal section plane, and consequently parallel to the second imaginary longitudinal section plane, wherein the second longitudinal strut at least sectionally extends perpendicular to the first imaginary longitudinal section plane, and consequently parallel to the second imaginary longitudinal section plane.

Alternatively or in supplementation of this, it is, furthermore, provided that the first longitudinal strut has a minimum bending stiffness determined by a modulus of elasticity dependent on a material of the longitudinal strut, as well as also by a minimum areal moment of inertia about an imaginary principal bending axis immanent to the longitudinal strut, and the second longitudinal strut has a minimum bending stiffness, determined by a modulus of elasticity dependent on a material of the longitudinal strut, as well as also by a minimum areal moment of inertia about an imaginary principal bending axis immanent to the longitudinal strut, and that the first longitudinal strut and the second longitudinal strut are arranged in such a manner that both the imaginary principal bending axis of the minimum areal moment of inertia of the first longitudinal strut as well as also the imaginary principal bending axis of the minimum areal moment of inertia of the second longitudinal strut in each case extend parallel both to the first longitudinal section plane as well as also to the second imaginary longitudinal section plane. The first longitudinal strut and the second longitudinal strut are especially additionally embodied and arranged in such a manner that the minimum bending stiffness of the first longitudinal strut is equal to the minimum bending stiffness of the second longitudinal strut.

According to a sixteenth embodiment of the measuring transducer of the invention, it is, furthermore, provided that the deformation body has at least two longitudinal struts—for example, equally constructed and/or plate-shaped longitudinal struts—of which a first longitudinal strut, which is, for example, at least sectionally straight, and which extends from the first connecting strut to the third connecting strut, is arranged spaced from the second imaginary longitudinal section plane, exclusively on a side of the longitudinal section plane occupied both by the first as well as also by the third measuring tube, and a second longitudinal strut, which is, for example, at least sectionally straight, and which extends from the second connecting strut to the fourth connecting strut, is arranged spaced from the second imaginary longitudinal section plane, for example by the same distance as the first longitudinal strut, exclusively on a side of the longitudinal section plane occupied both by the second as well as also by the fourth measuring tube, and that the deformation body has a first cross brace, which, for example, extends from the first longitudinal strut to the second longitudinal strut, and which, for example, is at least sectionally straight and/or sectionally non-parallel to the second imaginary longitudinal section plane. The first cross brace can, for example, extend from the first connecting strut to the second connecting strut; and/or both the first connecting strut as well as also the second connecting strut can in each case be affixed with their respective first strut ends to the first cross brace; and/or the first cross brace, in a region in which it imaginarily intersects the second imaginary longitudinal section plane, can have a smaller cross section than it has in an adjoining, neighboring region extending to the first connecting strut, and a smaller cross section than it has in an adjoining, neighboring region extending to the second connecting strut.

Developing this embodiment further, it is additionally provided that the first cross brace has a minimum bending stiffness determined by a modulus of elasticity dependent on a material of the cross brace, as well as also by a minimum areal moment of inertia about an imaginary principal bending axis immanent to the longitudinal strut, and that the first cross brace is arranged in such a manner that the imaginary principal bending axis of its minimum areal moment of inertia extends parallel both to the first longitudinal section plane as well as also to the second imaginary longitudinal section plane, and also does so, for example, in such a manner that the imaginary principal bending axis lies in the second imaginary longitudinal section plane.

Alternatively or in supplementation of this, it is, furthermore, provided that the deformation body has a second cross brace, which extends from the first longitudinal strut to the second longitudinal strut, and which, for example, is at least sectionally straight and/or sectionally non-parallel to the second imaginary longitudinal section plane, and/or is constructed equally to the first cross brace.

According to a seventeenth embodiment of the measuring transducer of the invention, it is, furthermore, provided that the deformation body has at least two longitudinal struts—for example, equally constructed and/or plate-shaped longitudinal struts—of which a first longitudinal strut, which is, for example, at least sectionally straight, and which extends from the first connecting strut to the third connecting strut, is arranged spaced from the second imaginary longitudinal section plane, exclusively on a side of the longitudinal section plane occupied both by the first as well as also by the third measuring tube, and a second longitudinal strut, which is, for example, at least sectionally straight, and which extends from the second connecting strut to the fourth connecting strut, is arranged spaced from the second imaginary longitudinal section plane, for example by the same distance as the first longitudinal strut, exclusively on a side of the longitudinal section plane occupied both by the second as well as also by the fourth measuring tube, and that the deformation body has a first cross brace, which, for example, extends from the first longitudinal strut to the second longitudinal strut, and which, for example, is at least sectionally straight and/or sectionally non-parallel to the second imaginary longitudinal section plane, as well as a second cross brace, which extends from the first longitudinal strut to the second longitudinal strut, and which, for example, is at least sectionally straight and/or sectionally non-parallel to the second imaginary longitudinal section plane, and/or is constructed equally to the first cross brace. The first cross brace can, for example, extend from the first connecting strut to the second connecting strut; and/or both the first connecting strut as well as also the second connecting strut can in each case be affixed with their respective first strut ends to the first cross brace; and/or the first cross brace, in a region in which it imaginarily intersects the second imaginary longitudinal section plane, can have a smaller cross section than it has in an adjoining, neighboring region extending to the first connecting strut, and a smaller cross section than it has in an adjoining, neighboring region extending to the second connecting strut. Equally, the second cross brace can extend from the third connecting strut to the fourth connecting strut; and/or both the third connecting strut as well as also fourth connecting strut can, in each case, be affixed with their respective first strut ends to the second cross brace; and/or the second cross brace, in a region in which this imaginarily intersects the second imaginary longitudinal section plane, can have a smaller cross section than it has in an adjoining, neighboring region extending to the third connecting strut, and a smaller cross section than it has in an adjoining, neighboring region extending to the fourth connecting strut. Furthermore, the two cross braces can each be formed by means of a flat bar which, for example, is composed of metal, and/or they can each be composed of the same material and/or each be composed of steel.

Developing this embodiment further, it is additionally provided that the first cross brace has a minimum bending stiffness determined by a modulus of elasticity dependent on a material of the cross brace, as well as also by a minimum areal moment of inertia about an imaginary principal bending axis immanent to the longitudinal strut, and that the first cross brace is arranged in such a manner that the imaginary principal bending axis of its minimum areal moment of inertia extends parallel both to the first longitudinal section plane as well as also to the second imaginary longitudinal section plane, and also does so, for example, in such a manner that the imaginary principal bending axis lies in the second imaginary longitudinal section plane, and it is, furthermore, provided that the second cross brace has a minimum bending stiffness determined by a modulus of elasticity dependent on a material of the cross brace, as well as also by a minimum areal moment of inertia about an imaginary principal bending axis immanent to the longitudinal strut, and that the second cross brace is arranged in such a manner that the imaginary principal bending axis of the minimum areal moment of inertia of the first cross brace extends parallel both to the first longitudinal section plane as well as also to the second imaginary longitudinal section plane, and also does so, for example, in such a manner that the imaginary principal bending axis of the minimum areal moment of inertia of the second cross brace lies in the second imaginary longitudinal section plane.

Alternatively or in supplementation, is additionally provided that the deformation body has a third longitudinal strut, which extends with a length from the first cross brace to the second cross brace, which is straight in projection on the imaginary cross sectional plane, and which, for example, is plate-shaped and/or parallel to the second imaginary longitudinal section plane and/or is in each case spaced an equal distance apart from the first longitudinal strut as from the second longitudinal strut.

According to an eighteenth embodiment of the measuring transducer of the invention, it is, furthermore, provided that the deformation body has longitudinal struts—for example, plate-shaped longitudinal struts—of which a first longitudinal strut, which is, for example, at least sectionally straight, and which extends from the first connecting strut to the third connecting strut, is arranged spaced from the second imaginary longitudinal section plane, exclusively on a side of the longitudinal section plane occupied both by the first as well as also by the third measuring tube, and a second longitudinal strut, which is, for example, at least sectionally straight, and which extends from the second connecting strut to the fourth connecting strut, is arranged spaced from the second imaginary longitudinal section plane, for example by the same distance as the first longitudinal strut, exclusively on a side of the longitudinal section plane occupied both by the second as well as also by the fourth measuring tube; that the deformation body has a first cross brace, which, for example, extends from the first longitudinal strut to the second longitudinal strut, and which, for example, is at least sectionally straight and/or sectionally non-parallel to the second imaginary longitudinal section plane, as well as a second cross brace, which extends from the first longitudinal strut to the second longitudinal strut, and which, for example, is at least sectionally straight and/or sectionally non-parallel to the second imaginary longitudinal section plane, and/or is constructed equally to the first cross brace; and that the deformation body has a third longitudinal strut, which extends with a length from the first cross brace to the second cross brace, which is straight in projection on the imaginary cross sectional plane, and which, for example, is plate-shaped and/or parallel to the second imaginary longitudinal section plane and/or is in each case spaced an equal distance apart from the first longitudinal strut as from the second longitudinal strut. Each of the longitudinal struts can in each case be formed, for example, by means of a flat bar, and/or in each case be composed of the same material, and/or in each case be composed of steel.

Developing this embodiment of the invention further, it is additionally provided that the third longitudinal strut is affixed with a first strut end to the first cross brace, especially in a region in which the first cross brace imaginarily intersects the second imaginary longitudinal section plane, and that the third longitudinal strut is affixed with a second strut end to the second cross brace, especially in a region, in which the second cross brace imaginarily intersects the second imaginary longitudinal section plane. Alternatively or in supplementation of this, it is, furthermore, provided that the length of the third longitudinal strut is greater than 10% of the length f the first longitudinal strut and/or smaller than 120% of the length of the first longitudinal strut.

According to a nineteenth embodiment of the measuring transducer of the invention, it is, furthermore, provided that each of the connecting struts of the coupling element of the first type is at least sectionally straight, and especially predominantly or completely straight, in projection on the imaginary cross sectional plane.

According to a twentieth embodiment of the measuring transducer of the invention, it is, furthermore, provided that each of the connecting struts of the coupling element of the first type extends at least sectionally perpendicular to the first imaginary longitudinal section plane, and consequently parallel to the second imaginary longitudinal section plane.

According to a twenty first embodiment of the measuring transducer of the invention, it is, furthermore, provided that each of the connecting struts of the coupling element of the first type has a straight subsection, which extends perpendicular to the first imaginary longitudinal section plane, and consequently parallel to the second imaginary longitudinal section plane. This occurs in such a manner, for example, that each of the connecting struts of the coupling element of the first type imaginarily intersects the first imaginary longitudinal section plane, for example, with its respective straight subsection, and, for example, at an angle of 90°.

According to a twenty second embodiment of the measuring transducer of the invention, it is, furthermore, provided that the first and the third connecting struts are oriented aligned relative to one another, and the second and the fourth connecting struts are oriented aligned relative to one another.

According to a twenty third embodiment of the measuring transducer of the invention, it is, furthermore, provided that the first connecting strut has a maximum bending stiffness determined by a modulus of elasticity dependent on a material of said connecting strut, as well as also by a maximal areal moment of inertia about an imaginary principal bending axis immanent to the connecting strut, the second connecting strut has a maximum bending stiffness determined by a modulus of elasticity dependent on a material of the connecting strut, as well as also by a maximum areal moment of inertia about an imaginary principal bending axis immanent to the connecting strut, the third connecting strut has a maximum bending stiffness determined by a modulus of elasticity dependent on a material of the connecting strut, as well as also by a maximal areal moment of inertia about an imaginary principal bending axis immanent to the connecting strut, and the fourth connecting strut has a maximum bending stiffness determined by a modulus of elasticity dependent on a material of the connecting strut, as well as also by a maximum areal moment of inertia about an imaginary principal bending axis immanent to the connecting strut, and that each of the four connecting struts is in each case arranged in such a manner that the imaginary principal bending axis of its maximal areal moment of inertia extends parallel both to the first longitudinal section plane as well as also to the second imaginary longitudinal section plane. Developing this embodiment of the invention further, it is additionally provided that the maximum areal moment of inertia of the second connecting strut, as well as also the maximum areal moment of inertia of third connecting strut and the maximum areal moment of inertia of fourth connecting strut are in each case equal to the maximal areal moment of inertia the first connecting strut. Alternatively, or in supplementation to this, it is, furthermore, provided that the first connecting strut has a minimum bending stiffness determined by a modulus of elasticity dependent on a material of the connecting strut, as well as also by a minimum areal moment of inertia about an imaginary principal bending axis immanent to the connecting strut, the second connecting strut has a minimum bending stiffness determined by a modulus of elasticity dependent on a material of the connecting strut, as well as also by a minimum areal moment of inertia about an imaginary principal bending axis immanent to the connecting strut, the third connecting strut has a minimum bending stiffness determined by a modulus of elasticity dependent on a material of the connecting strut, as well as also by a minimum areal moment of inertia about an imaginary principal bending axis immanent to the connecting strut, and the fourth connecting strut has a minimum bending stiffness determined by a modulus of elasticity dependent on a material of the connecting strut, as well as also by a minimum areal moment of inertia about an imaginary principal bending axis immanent to the connecting strut, and that each of the four connecting struts is in each case arranged in such a manner that the imaginary principal bending axis of its minimum areal moment of inertia extends parallel to the first longitudinal section plane and is perpendicular to the second imaginary longitudinal section plane.

According to a twenty fourth embodiment of the measuring transducer of the invention, it is, furthermore, provided that each of the connecting struts—which are, for example, equally constructed—are formed by means of a flat bar, which is, for example, at least sectionally curved in an S-shaped, Z-shaped, V-shaped and/or U-shaped manner in projection on the second imaginary longitudinal section plane; and/or that the first connecting strut, the second connecting strut, the third longitudinal strut and the fourth connecting strut are each composed of the same material and/or in each case composed of steel.

According to an twenty fifth embodiment of the measuring transducer of the invention, it is, furthermore, provided that the second measuring tube, the third measuring tube and the fourth measuring tube each have an empty mass, which is equal to an empty mass of the first measuring tube; and/or that the first measuring tube has an empty mass, which is greater than 20 kg, and, for example, is also greater than 30 kg and/or smaller than 50 kg. Developing this embodiment of the invention further, it is additionally provided that the deformation body of the coupling element of the first type has a mass, which amounts to less than 50% of the empty mass of the first measuring tube, and, for example, is also greater than 10% of the empty mass, $M_{18}$, of the first measuring tube.

According to a twenty sixth embodiment of the measuring transducer of the invention, it is, furthermore, provided that each of the four measuring tubes in each case has a tube cross section determined by a caliber of the measuring tube as well as by a wall thickness of the measuring tube, wherein both the second measuring tube as well as also the third measuring tube and the fourth measuring tube each have a caliber, which in each case is equal to a caliber of the first measuring tube, and each also have a wall thickness, which is equal to a wall thickness, his, of the first measuring tube, and consequently both the second measuring tube as well as also the third measuring tube and the fourth measuring tube each have an outer diameter, which is equal to an outer diameter of the first measuring tube, According to a twenty seventh embodiment of the measuring transducer of the invention, it is, furthermore, provided that each of the four connecting struts, in each case, has a strut length defined by a minimum distance between their respective first strut ends and their respective second strut ends, and that both the second connecting strut as well as also the third as well as the fourth connecting strut each have a strut length, which, in each case, is equal to the strut length of the first connecting strut.

According to a twenty eighth embodiment of the measuring transducer of the invention, the exciter mechanism is embodied in such a manner that therewith, each of the four measuring tubes is excitable, for example, also simultaneously, to bending oscillations.

According to a twenty ninth embodiment of the measuring transducer of the invention, the exciter mechanism is embodied in such a manner that the first measuring tube and the second measuring tube are excitable to bending oscillations, which are opposite-equal relative to the second imaginary longitudinal section plane, and thus, for example, symmetrical relative to the second imaginary longitudinal section plane, and the third measuring tube and the fourth measuring tube are excitable to bending oscillations, which are opposite-equal relative to the second imaginary longitudinal section plane, and thus, for example, symmetrical relative to the second imaginary longitudinal section plane.

According to a thirtieth embodiment of the measuring transducer of the invention, the exciter mechanism is embodied in such a manner that the first measuring tube and the third measuring tube are excitable to bending oscillations, which are opposite-equal relative to the second imaginary longitudinal section plane, and thus, for example, symmetrical relative to the second imaginary longitudinal section plane, and the second measuring tube and the fourth measuring tube are excitable to bending oscillations, which are opposite-equal relative to the second imaginary longitudinal section plane, and thus, for example, symmetrical relative to the second imaginary longitudinal section plane.

According to a thirty first embodiment of the measuring transducer of the invention, the exciter mechanism is embodied in such a manner that a natural bending oscillation mode of the first type inherent to the tube arrangement is excitable, wherein, in this bending oscillation mode of the first type, the first measuring tube and the second measuring tube execute bending oscillations—which are opposite-equal relative to the second imaginary longitudinal section plane, and thus, for example, symmetrical relative to the second imaginary longitudinal section plane—and in each case do so about a static rest position associated with the respective measuring tube—for instance, cantilever bending oscillations in each case about an imaginary oscillation axis parallel to at least two of the imaginary connecting axes—and wherein, in this bending oscillation mode of the first type, the third measuring tube and the fourth measuring tube execute bending oscillations which are opposite-equal relative to the second imaginary longitudinal section plane, and thus, for example, symmetrical relative to the second imaginary longitudinal section plane, and in each case do so about a static rest position associated with the respective measuring tube—for instance, cantilever bending oscillations in each case about an imaginary oscillation axis parallel to at least two of the imaginary connecting axes—and do so in such a manner that, relative to the second imaginary longitudinal section plane, the bending oscillations of the first measuring tube are thus opposite-equal to the bending oscillations of the third measuring tube, and that, relative to the second imaginary longitudinal section plane, the bending oscillations of the second measuring tube are thus opposite-equal to the bending oscillations of the fourth measuring tube.

Developing this embodiment of the invention further, the exciter mechanism is embodied in such a manner that a natural bending oscillation mode of the second type inherent to the tube arrangement is excitable—also, for example, simultaneously with the bending oscillation mode of the first type—wherein, in this bending oscillation mode of the second type, the first measuring tube and the second measuring tube execute bending oscillations which are opposite-equal relative to the second imaginary longitudinal section plane, and thus, for example, symmetrical relative to the second imaginary longitudinal section plane, and in each case do so about a static rest position associated with the respective measuring tube—for instance cantilever, bending oscillations in each case about an imaginary oscillation axis parallel to at least two of the imaginary connecting axes—and wherein, in this bending oscillation mode of the second type, and wherein, in this bending oscillation mode of the first type, the third measuring tube and the fourth measuring tube execute bending oscillations which are opposite-equal relative to the second imaginary longitudinal section plane, and thus, for example, symmetrical relative to the second imaginary longitudinal section plane, and in each case do so about a static rest position associated with the respective measuring tube—for instance, cantilever bending oscillations in each case about an imaginary oscillation axis parallel to at least two of the imaginary connecting axes—and do so in such a manner that, relative to the second imaginary longitudinal section plane, the bending oscillations of the first measuring tube are thus opposite-equal to the bending oscillations of the third measuring tube, and that, relative to the second imaginary longitudinal section plane, the bending oscillations of the second measuring tube are thus opposite-equal to the bending oscillations of the fourth measuring tube.

Alternatively, or in supplementation, it is, furthermore, provided that an eigenfrequency of the bending oscillation mode of the first type, for example, such an eigenfrequency as is measurable in the case of a tube arrangement completely filled with water, is different—for example, by more than 10 Hz—from an eigenfrequency of the bending oscillation mode of the second type, for example, such an eigenfrequency as is measurable in the case of a tube arrangement completely filled with water and/or measurable at the same time as the eigenfrequency of the bending oscillation mode of the first type; e.g. in such a manner that the eigenfrequency of the bending oscillation mode of the first type is greater by more than 10 Hz than the eigenfrequency of the bending oscillation mode of the second type, or that the eigenfrequency of the bending oscillation mode of the first type is smaller by more than 10 Hz than the eigenfrequency of the bending oscillation mode of the second type.

According to a thirty third embodiment of the measuring transducer of the invention, a center of mass of the tube arrangement lies in a imaginary cross sectional plane of the tube arrangement, which is in each case perpendicular both to the first imaginary longitudinal section plane as well as also to the second imaginary longitudinal section plane.

According to a thirty third embodiment of the measuring transducer the invention, a center of mass of the tube arrangement lies in a imaginary cross sectional plane of the tube arrangement, which is in each case perpendicular both to the first imaginary longitudinal section plane as well as also to the second imaginary longitudinal section plane.

According to a thirty fourth embodiment of the measuring transducer of the invention, the tube arrangement is mirror symmetrical relative to an imaginary cross sectional plane of the tube arrangement, which is perpendicular both to the first imaginary longitudinal section plane as well as also to the second imaginary longitudinal section plane.

According to a thirty fifth embodiment of the measuring transducer of the invention, each of the four measuring tubes has a measuring tube peak, defined as the greatest perpendicular distance of the respective measuring tube from the first imaginary longitudinal section plane, and an imaginary cross sectional plane of the tube arrangement perpendicular to both the first imaginary longitudinal section plane as well as also the second imaginary longitudinal section plane which intersects each of the four measuring tubes at their respective measuring tube peaks.

According to a thirty sixth embodiment of the measuring transducer of the invention, a middle segment of the transducer housing is at least partially formed by means of a straight—for example, circularly cylindrical, —support tube, for instance, in such a manner that a segment of the first measuring tube extending outwards from the support tube on a first side and a segment of the second measuring tube extending outwards from the support tube on the first side are surrounded by a first housing cap of the transducer housing, and that a segment of the third measuring tube extending outwards from the support tube on a second side lying opposite to the first side and a segment of the fourth measuring tube extending outwards from the support tube on the second side are surrounded by a second housing cap of the transducer housing, for example, a second housing cap constructed equally to the first housing cap.

According to a thirty seventh embodiment of the measuring transducer of the invention, it is, furthermore, provided that the two flow dividers are additionally embodied and arranged in the measuring transducer in such a manner that an imaginary first connecting axis of the measuring transducer imaginarily connecting the first flow opening of the first flow divider with the first flow opening of the second flow divider extends parallel to an imaginary second connecting axis of the measuring transducer imaginarily connecting the second flow opening of the first flow divider with the second flow opening of the second flow divider, that an imaginary third connecting axis of the measuring transducer imaginarily connecting the third flow opening of the first flow divider with the third flow opening of the second flow divider extends parallel to an imaginary fourth connecting axis of the measuring transducer imaginarily connecting the fourth flow opening of the first flow divider with the fourth flow opening of the second flow divider. Developing this embodiment of the invention further, it is additionally provided that a first imaginary longitudinal section plane of the measuring transducer, within which the first imaginary connecting axis and the second imaginary connecting axis extend—for example, parallel to a principal flow axis of the measuring transducer aligning with the pipeline—is parallel to a second imaginary longitudinal section plane of the measuring transducer, within which the imaginary third connecting axis and the imaginary fourth connecting axis extend, for example, in such a manner that the first imaginary longitudinal section plane of the tube arrangement lies between the first and second imaginary longitudinal section planes of the measuring transducer and/or is parallel to the first and second imaginary longitudinal section planes of the measuring transducer.

According to a thirty eighth embodiment of the measuring transducer of the invention, it is, furthermore, provided that the two flow dividers are embodied and arranged in the measuring transducer in such a manner that a third imaginary longitudinal section plane of the measuring transducer, within which the imaginary first connecting axis and the imaginary third connecting axis extend, is parallel to a fourth imaginary longitudinal section plane of the measuring transducer, within which the imaginary second connecting axis and the imaginary fourth connecting axis extend. Developing this embodiment of the invention further, it is additionally provided that the second imaginary longitudinal section plane of the tube arrangement extends between the third imaginary longitudinal section plane of the measuring transducer and fourth imaginary longitudinal section plane of the measuring transducer, for example, in such a manner that the second imaginary longitudinal section plane of the tube arrangement is parallel to the third imaginary longitudinal section plane of the measuring transducer and parallel to the fourth imaginary longitudinal section plane of the measuring transducer.

According to a thirty ninth embodiment of the measuring transducer of the invention, it is, furthermore, provided that the four flow openings of the first flow divider are arranged in such a manner that imaginary areal centers of gravity associated with cross sectional areas—especially circularly shaped cross sectional areas—of the flow openings of the first flow divider form the vertices of an imaginary rectangle or of an imaginary square, wherein the cross sectional areas lie in a shared imaginary cross sectional cutting plane of the first flow divider, for example, perpendicular to the first imaginary longitudinal section plane of the measuring transducer, or to the second imaginary longitudinal section plane of the measuring transducer.

According to a fortieth embodiment of the measuring transducer of the invention, it is, furthermore, provided that the four flow openings of the second flow divider are arranged in such a manner that imaginary areal centers of gravity associated with cross sectional areas of the flow openings of the second flow divider form the vertices of an imaginary rectangle or of an imaginary square, wherein the cross sectional areas lie in a shared imaginary cross sectional cutting plane of the second flow divider, for example, perpendicular to the first imaginary longitudinal section plane of the measuring transducer, or to the second imaginary longitudinal section plane of the measuring transducer.

According to a forty first embodiment of the measuring transducer of the invention, it is, furthermore, provided that each of the four measuring tubes, which are especially of an equal size, has a caliber, which amounts to more than 40 mm, especially more than 60 mm. Developing this embodiment of the invention further, it is additionally provided that the measuring tubes are bent and arranged in such a manner that a caliber to height ratio of the tube arrangement, defined by a ratio of the caliber of the first measuring tube to a maximal lateral expanse of the tube arrangement measured from a peak of the first measuring tube to a peak of the third measuring tube, amounts to more than 0.05, especially more than 0.07 and/or less than 0.35, especially less than 0.2.

According to a forty second embodiment of the measuring transducer of the invention, it is, furthermore, provided that the first flow divider has a flange, especially a flange having a mass of more than 50 kg, for connecting the measuring transducer to a tubular segment of the pipeline serving for supplying medium to the measuring transducer, and that the second flow divider has a flange, especially a flange having a mass of more than 50 kg, for connecting the measuring transducer to a segment of the pipeline serving for removing medium from the measuring transducer. Developing this embodiment of the invention further, each of the flanges has a sealing surface for fluid-tight connecting of the measuring transducer with the respective corresponding tubular segment of the pipeline, wherein a distance between the sealing surfaces of both flanges defines an installed length of the measuring transducer, especially an installed length amounting to more than 1000 mm and/or less than 3000 mm. The measuring transducer is additionally embodied in such a manner that, in such case, a measuring tube length of the first measuring tube corresponding to a length of a section of the deflection curve of the first measuring tube extending between the first flow opening of the first flow divider and the first flow opening of the second flow divider is selected in such a manner that a measuring-tube-length to installed-length ratio of the measuring transducer, as defined by a ratio of the measuring tube length of the first measuring tube to the installed length of the measuring transducer, amounts to more than 0.7, especially more than 0.8 and/or less than 1.2, and/or that a caliber to installed-length ratio of the measuring transducer, as defined by a ratio of a caliber of the first measuring tube to the installed length of the measuring transducer, amounts to more than 0.02, especially more than 0.05 and/or less than 0.09. Alternatively or in supplementation thereof, the measuring transducer is embodied in such a manner that a-nominal-diameter to installed-length ratio of the measuring transducer, as defined by a ratio of the nominal diameter of the measuring transducer to the installed length of the measuring transducer, is smaller than 0.3, especially smaller than 0.2 and/or greater than 0.1, wherein the nominal diameter corresponds to a caliber of the pipeline, in whose course the measuring transducer is to be used.

In a forty third embodiment of the measuring transducer of the invention, it is, furthermore, provided that a measuring tube length of the first measuring tube corresponding to a length of a section of the deflection curve of the first measuring tube extending between the first flow opening of the first flow divider and the first flow opening of the second flow divider amounts to more than 1000 mm, especially more than 1200 mm and/or less than 3000 mm, especially less than 2500.

In a forty fourth embodiment of the measuring transducer of the invention, it is, furthermore, provided that each of the four measuring tubes, for example, four measuring tubes of equal caliber, are arranged in such a manner that a smallest lateral separation of each of the four measuring tubes—for example, measuring tubes of equal length—from a housing side wall of the transducer housing is, in each case, greater than zero, for example, also greater than 3 mm and/or greater than twice a respective tube wall thickness; and/or that a smallest lateral separation between two neighboring measuring tubes in each case amounts to more than 3 mm and/or more than the sum of their respective tube wall thicknesses.

In a forty fifth embodiment of the measuring transducer of the invention, it is, furthermore, provided that each of the flow openings is arranged in such a manner that a smallest lateral separation of each of the flow openings from a housing side wall of the transducer housing in each case amounts to more than zero, for example also more than 3 mm, and/or more than twice a smallest tube wall thickness of the measuring tubes; and/or that a smallest lateral separation between the flow openings amounts to more than 3 mm and/or more than twice a smallest tube wall thickness of the measuring tubes.

According to a forty sixth embodiment of the measuring transducer of the invention, it is, furthermore, provided that the exciter mechanism is embodied in such a manner that the first measuring tube and the second measuring tube are excitable during operation to opposite-equal bending oscillations, and that the third measuring tube and the fourth measuring tube are excitable during operation to opposite-equal bending oscillations.

According to a forty seventh embodiment of the measuring transducer of the invention, it is, furthermore, provided that a mass ratio of an empty mass of the entire measuring transducer to an empty mass of the first measuring tube is greater than 10, especially greater than 15 and smaller than 25.

According to a forty eighth embodiment of the measuring transducer of the invention, it is, furthermore, provided that an empty mass, $M_{18}$, of the first measuring tube, especially each of the measuring tubes, is greater than 20 kg, especially greater than 30 kg and/or smaller than 50 kg.

According to a forty ninth embodiment of the measuring transducer of the invention, it is, furthermore, provided that an empty mass of the measuring transducer is greater than 200 kg, especially greater than 300 kg.

According to a fiftieth embodiment of the measuring transducer of the invention, it is, furthermore, provided that a nominal diameter of the measuring transducer, which corresponds to a caliber of the pipeline in whose course the measuring transducer is to be used, amounts to more than 100 mm, especially more than 300 mm. Advantageously, the measuring transducer is additionally embodied in such a manner that a mass to nominal-diameter ratio of the measuring transducer, as defined by a ratio of the empty mass of the measuring transducer to the nominal diameter of the measuring transducer, is smaller than 2 kg/mm, especially smaller than 1 kg/mm and/or greater than 0.5 kg/mm.

According to a fifty first embodiment of the measuring transducer of the invention, it is, furthermore, provided that the first and the second measuring tubes are of equal construction, at least as regards a material of which their tube walls are in each case composed, and/or as regards their geometrical tube dimensions, especially a tube length, a tube wall thickness, a tube outer diameter and/or a caliber.

According to a fifty second embodiment of the invention, it is, furthermore, provided that the third and the fourth measuring tubes are of equal construction, at least as regards a material of which their tube walls are in each case composed, and/or as regards their geometric tube dimensions, especially a tube length, a tube wall thickness, a tube outer diameter and/or a caliber.

According to a fifty third embodiment of the measuring transducer of the invention, it is, furthermore, provided that all four measuring tubes are of equal construction as regards a material of which their tube walls are composed, and/or as regards their geometric tube dimensions, especially a tube length, a tube wall thickness, a tube outer diameter and/or a caliber.

According to a fifty fourth embodiment of the measuring transducer of the invention, it is, furthermore, provided that a material of which the tube walls of the four measuring tubes are at least partially composed is titanium and/or zirconium and/or, for example, stainless, and/or high strength steel, duplex steel and/or super duplex steel, or Hastelloy.

According to a fifty fifth embodiment of the measuring transducer of the invention, it is, furthermore, provided that the transducer housing, the flow dividers and tube walls of the measuring tubes are in each case composed of steel, for example stainless steel.

According to a fifty sixth embodiment of the measuring transducer of the invention, it is, furthermore, provided that the exciter mechanism is formed by means of a first oscillation exciter, especially an electrodynamic first oscillation exciter and/or a first oscillation exciter differentially exciting oscillations of the first measuring tube relative to the second measuring tube. The exciter mechanism is especially formed by means of a second oscillation exciter, for example, an electrodynamic second oscillation exciter and/or a second oscillation exciter differentially exciting oscillations of the third measuring tube relative to the fourth measuring tube. In such case, it is, furthermore, provided that the first and second oscillation exciters are electrically interconnected in series, and in such a manner that a combined driver signal excites combined oscillations of the first and third measuring tubes relative to the second and the fourth measuring tube. The oscillation exciter of the exciter mechanism can be formed, for example, by means of a permanent magnet held on the first measuring tube and by means of a cylindrical coil permeated by the magnetic field of the permanent magnet and held on the second measuring tube, wherein the second oscillation exciter is formed by means of a permanent magnet held on the third measuring tube and a cylindrical coil permeated by the magnetic field of the permanent magnet and held on fourth measuring tube.

According to a first further development of the invention, the measuring transducer additionally comprises a sensor arrangement reacting to vibrations of the measuring tubes, especially bending oscillations of the measuring tubes excited by means of the exciter mechanism, for example, an electro-dynamic, sensor arrangement and/or one formed by means of oscillation sensors constructed equally to one another, wherein the sensor arrangement serves for producing oscillation signals representing vibrations especially bending oscillations—of the measuring tubes.

According to a first embodiment of the first further development of the invention, it is provided that the sensor arrangement is formed by means of an inlet-side, first oscillation sensor—especially an electrodynamic inlet-side, first oscillation sensor and/or one which differentially registers oscillations of the first measuring tube relative to the second measuring tube—as well as by means of an outlet-side, second oscillation sensor—especially an electrodynamic outlet-side, second oscillation sensor and/or one which differentially registers oscillations of the first measuring tube relative to the second measuring tube—and especially in such a manner that a measuring length of the measuring transducer corresponding to a length of a section of a deflection curve of the first measuring tube extending between the first oscillation sensor and the second oscillation sensor amounts to more than 500 mm, especially more than 600 mm and/or less than 1200 mm, and/or that a caliber to measuring-length ratio of the measuring transducer, defined by a ratio of a caliber of the first measuring tube to the measuring length of the measuring transducer amounts to more than 0.05, especially more than 0.09. Additionally, the first oscillation sensor can be formed by means of a permanent magnet held on the first measuring tube and a cylindrical coil held on the second measuring tube permeated by the permanent magnet's magnetic field, and the second oscillation sensor can be formed by means of a permanent magnet held on the first measuring tube and a cylindrical coil held on the second measuring tube permeated by the permanent magnet's magnetic field.

According to a second embodiment of the first further development of the invention, it is additionally provided that the sensor arrangement is formed by means of an inlet-side, first oscillation sensor—especially an electrodynamic inlet-side, first oscillation sensor and/or one which differentially registers oscillations of the first measuring tube relative to the second measuring tube; by means of an outlet-side, second oscillation sensor—especially an electrodynamic outlet-side, second oscillation sensor and/or one which differentially registers oscillations of the first measuring tube relative to the second measuring tube; by means of an inlet-side, third oscillation sensor—especially an electrodynamic inlet-side, third oscillation sensor and/or one which differentially registers oscillations of the third measuring tube relative to the fourth measuring tube; as well as by means of an outlet-side, fourth oscillation sensor—especially an electrodynamic outlet-side, fourth oscillation sensor and/or one which differentially registers oscillations of the third measuring tube relative to the fourth measuring tube, and especially in such a manner that a measuring length of the measuring transducer corresponding to a length of a section of a deflection curve of the first measuring tube extending between the first oscillation sensor and the second oscillation sensor amounts to more than 500 mm, especially more than 600 mm and/or less than 1200 mm, and/or that a caliber to measuring-length ratio of the measuring transducer, defined by a ratio of a caliber of the first measuring tube to the measuring length of the measuring transducer amounts to more than 0.05, especially more than 0.09. In such case, the first and third oscillation sensors can advantageously be electrically interconnected in series in such a manner that a common oscillatory signal represents shared inlet-side oscillations of the first and third measuring tube relative to the second and the fourth measuring tube, and/or the second and fourth oscillation sensor can be electrically interconnected in series in such a manner that a common oscillatory signal represents shared outlet-side oscillations of the first and third measuring tube relative to the second and the fourth measuring tube. Alternatively or in supplementation, the first oscillation sensor can additionally be formed by means of a permanent magnet held on the first measuring tube and a cylindrical coil held on the second measuring tube and permeated by the permanent magnet's magnetic field, and the second oscillation sensor can be formed by means of a permanent magnet held on the first measuring tube and a cylindrical coil held on the second measuring tube and permeated by the permanent magnet's magnetic field; and/or the third oscillation sensor can be formed by means of a permanent magnet held on the third measuring tube and a cylindrical coil held on fourth measuring tube and permeated by the permanent magnet's magnetic field, and fourth oscillation sensor can be formed by means of a permanent magnet held on the third measuring tube and a cylindrical coil held on fourth measuring tube and permeated by the permanent magnet's magnetic field.

According to a second further development of the measuring transducer of the invention, the measuring transducer further comprises: spaced both from the first flow divider as well as also from the second flow divider, a second coupling element of first type, which is affixed on the outlet side to each of the four measuring tubes, is essentially constructed equally to the first coupling element of first type, and serves for adjusting eigenfrequencies of natural oscillation modes, for example, bending oscillation modes, of the tube arrangement.

According to a first embodiment of the second further development of the measuring transducer of the invention, it is, furthermore, provided that each of the two coupling elements of the first type is symmetrical relative to the first imaginary longitudinal section plane of the tube arrangement.

According to a second embodiment of the second further development of the measuring transducer of the invention, it is, furthermore, provided that each of the two coupling elements of the first type is symmetrical relative to the second imaginary longitudinal section plane of the tube arrangement.

According to a third embodiment of the second further development of the measuring transducer of the invention, it is, furthermore, provided that both coupling elements of the first type are arranged symmetrically in the measuring transducer relative to an imaginary cross sectional plane of the tube arrangement perpendicular both to the first imaginary longitudinal section plane as well as also to the second imaginary longitudinal section plane of the tube arrangement.

According to a fourth embodiment of the second further development of the measuring transducer of the invention, it is, furthermore, provided that the two coupling elements of the first type are arranged equidistantly in the measuring transducer relative to an imaginary cross sectional plane of the tube arrangement perpendicular both to the first imaginary longitudinal section plane, as well as also to the second imaginary longitudinal section plane of the tube arrangement.

According to a fifth embodiment of the second further development of the measuring transducer of the invention, it is, furthermore, provided that the two coupling elements of the first type are arranged extending parallel in the measuring transducer relative to an imaginary cross sectional plane of the tube arrangement perpendicular both to the first imaginary longitudinal section plane as well as also to the second imaginary longitudinal section plane of the tube arrangement.

According to a sixth embodiment of the second further development of the measuring transducer of the invention, it is, furthermore, provided that each of the two coupling elements of the first type is embodied and placed in the measuring transducer in such a manner that they are symmetrical relative to the first imaginary longitudinal section plane of the tube arrangement and/or relative to the second imaginary longitudinal section plane of the tube arrangement.

According to a seventh embodiment of the second further development of the measuring transducer of the invention, it is, furthermore, provided that both the first coupling element of the first type as well as also the second coupling element of the first type are formed by means of plate-shaped elements.

According to an eight embodiment of the second further development of the measuring transducer of the invention, it is, furthermore, provided that each of the two coupling elements of the first type is at least sectionally bulged, for example in such a manner that they are at least sectionally convex relative to an imaginary cross sectional plane of the tube arrangement extending between the first coupling element of the first type and the second coupling element of the first type, and perpendicular both to the first imaginary longitudinal section plane of the tube arrangement as well as also to the second imaginary longitudinal section plane of the tube arrangement.

According to a ninth embodiment of the second further development of the measuring transducer of the invention, it is additionally provided that both the first coupling element of the first type as well as also the second coupling element of the first type, as viewed from an imaginary cross sectional plane of the tube arrangement extending between the first coupling element of the first type and the second coupling element of the first type and perpendicular both to the first imaginary longitudinal section plane of the tube arrangement as well as also to the second imaginary longitudinal section plane of the tube arrangement, are at least sectionally convex relative to this cross sectional plane.

According to a tenth embodiment of the second further development of the measuring transducer the invention, it is additionally provided that the first coupling element of the first type and the second coupling element of the first type are mechanically connected with one another by means of at least one connecting element, especially a connecting element suppressing translational movement of the deformation body of the first coupling element of the first type relative to the second coupling element of the first type in the direction of a longitudinal axis parallel both to the first imaginary longitudinal section plane as well as also to the second imaginary longitudinal section plane and/or a rod- or plate-shaped, connecting element.

According to a third further development of the measuring transducer of the invention, measuring transducer further comprises: 1) A first coupling element of the second type— for example, a plate shaped first coupling element of the second type—which, for the purpose of forming inlet-side oscillation nodes both for vibrations—for example bending oscillations—of the first measuring tube as well as also for vibrations—for example bending oscillations—of the second measuring tube opposite-equal thereto, is affixed on the inlet side to the first measuring tube and to the second measuring tube, for example, both to a tube segment of the first measuring tube extending between the first flow divider and the first coupling element of the first type, as well as also affixed to a tube segment of the second measuring tube extending between the first flow divider and the first coupling element of the first type; 2) a second coupling element of the second type, which is, for example, plate-shaped and/or constructed equally to the first coupling element of the second type and/or parallel to the first coupling element of the second type, and which, for the purpose of forming outlet-side oscillation nodes both for vibrations—for example bending oscillations—of the first measuring tube as well as also for vibrations—for example bending oscillations—of the second measuring tube opposite-equal thereto, is affixed on the outlet side to the first measuring tube and to the second measuring tube, for example, both to a tube segment of the first measuring tube extending between the second flow divider and the second coupling element of the first type as well as also to a tube segment of the second measuring tube extending between the second flow divider and the second coupling element of the first type; 3) a third coupling element of the second type, which is, for example, plate-shaped and/or constructed equally to the first coupling element of the second type and/or parallel to the second coupling element of the second type, and which, for forming inlet-side oscillation nodes both for vibrations—for example bending oscillations—of the third measuring tube as well as also vibrations—for example bending oscillations—of the fourth measuring tube opposite-equal thereto, is affixed on the inlet side, spaced both from the first flow divider as well as also from the second flow divider, to the third measuring tube and to the fourth measuring tube, for example, both to a tube segment of the third measuring tube extending between the first flow divider and the first coupling element of the first type as well as also to a tube segment of the fourth measuring tube extending between the first flow divider and the first coupling element of the first type; as well as 4) a fourth coupling element of the second type, which is, for example, plate shaped and/or constructed equally to the first coupling element of the second type and/or parallel to the first coupling element of second type, and which, for forming outlet-side oscillation nodes both for vibrations—for example bending oscillations—of the third measuring tube as well as also for vibrations—for example bending oscillations—of the fourth measuring tube opposite-equal thereto, is affixed on the outlet side, spaced both from the first flow divider as well as also from the second flow divider, as well as also from the first coupling element, to the third measuring tube and to the fourth measuring tube, for example, affixed both to a tube segment of the third measuring tube extending between the second flow divider and the second coupling element of the first type as well as also to a tube segment of the fourth measuring tube extending between the second flow divider and the second coupling element of the first type. According to this embodiment of the invention, the measuring transducer can be manufactured, for example, by first affixing both the first coupling element of the second type as well as also the second coupling element of the second type in each case to the first measuring tube and to the second measuring tube for producing a first measuring tube package, as well as by affixing both the third coupling element of the second type as well as also fourth coupling element of the second type in each case to the third measuring tube and to the fourth measuring tube for producing a second measuring tube package; and thereafter affixing both the first coupling element of the first type as well as also the second coupling element of the first type in each case to at least one of—also, for example, to each of—the measuring tubes of the first measuring tube package and to at least one of—also for example, to each of—the measuring tubes of the second measuring tube package.

According to a first embodiment of the measuring system of the invention, it is additionally provided that, during operation, the four measuring tubes simultaneously execute bending oscillations, excited by the exciter mechanism, for example, in a bending oscillation fundamental mode of the first type. Developing this embodiment of the invention further, it is additionally provided that the exciter mechanism effects oscillations of the measuring tubes, especially bending oscillations in the first bending oscillation mode of the first type, by providing that an exciter force generated by means of the first oscillation exciter and acting on the first measuring tube is opposite, for example, also opposite-equal, to an exciter force generated at the same time by means of the first oscillation exciter and acting on the second measuring tube.

According to a second embodiment of the measuring system of the invention, it is additionally provided that the exciter mechanism includes at least a first oscillation exciter—for example, a first oscillation exciter acting differentially on the first and second measuring tubes and, for example, affixed thereto, and/or an electro-dynamic, first oscillation exciter—for converting electrical excitation power into the exciter mechanism fed by means of the transmitter electronics into mechanical exciter forces, for example, exciter forces having at least one signal frequency corresponding to an eigenfrequency of a natural mode of oscillation of the tube arrangement, these exciter forces effecting variable and/or periodic bending oscillations of the first measuring tube and bending oscillations of the second measuring tube opposite-equal to the bending oscillations of the first measuring tube relative to the second imaginary longitudinal section plane of the tube arrangement. Developing this embodiment of the invention further, it is additionally provided that the first oscillation exciter is formed by means of a permanent magnet held on the first measuring tube, for example, in the region of a measuring tube peak, and by means of a cylindrical coil permeated by the magnetic field of the permanent magnet and held on the second measuring tube, for example, in the region of a measuring tube peak. Alternatively or in supplementation, the exciter mechanism can also further comprise a second oscillation exciter, for example, one acting differentially on the third and the fourth measuring tubes and, for example, affixed thereto, and/or an electro-dynamic, exciter mechanism and/or one constructed equally to the first oscillation exciter and/or electrically serially connected with the first oscillation exciter, for converting electrical excitation power into the exciter mechanism fed by means of the transmitter electronics into mechanical exciter forces, for example, exciter forces having at least one signal frequency corresponding to an eigenfrequency of a natural mode of oscillation of the tube arrangement, these exciter forces effecting variable and/or periodic bending oscillations of the third measuring tube and bending oscillations of the fourth measuring tube opposite-equal to the bending oscillations of the third measuring tube relative to the second imaginary longitudinal section plane of the tube arrangement. The second oscillation exciter can, in such case, be formed by means of a permanent magnet held on the third measuring tube, for example, in the region of a measuring tube peak, and by means of a cylindrical coil permeated by the magnetic field of the permanent magnet and held on the fourth measuring tube, for example, in the region of a measuring tube peak.

According to a third embodiment of the measuring system of the invention, it is additionally provided that the transmitter electronics feeds electrical excitation power into the exciter mechanism by means of at least one electrical driver signal supplied to the exciter mechanism, for example, a driver signal having a variable maximum voltage level and/or a variable maximum electrical current level, for example, a variable and/or at least at times periodic driver signal having at least one signal frequency corresponding to an eigenfrequency of a natural mode of oscillation of the tube arrangement; and that the exciter mechanism converts the electrical excitation power, especially power dependent on a voltage level and on an electrical current level of the at least one driver signal, at least partially into both bending oscillations of the first measuring tube and bending oscillations of the second measuring tube opposite-equal to bending oscillations of the first measuring tube relative to the second imaginary longitudinal section plane of the tube arrangement, as well as also into bending oscillations of the third measuring tube and bending oscillations of the fourth measuring tube opposite-equal to bending oscillations of the third measuring tube relative to the second imaginary longitudinal section plane of the tube arrangement. Developing this embodiment of the invention further, it is additionally provided that the at least one driver signal is fed to the first oscillation exciter, for instance in such a manner that a first exciter current driven by a variable first exciter voltage provided by means of the first driver signal flows through its cylindrical coil. Alternatively or in supplementation, the at least one driver signal can have a plurality of signal components with signal frequencies different from one another, wherein at least one of the signal components of the first driver signal, for instance, a signal component dominating as regards signal power, has a signal frequency corresponding to an eigenfrequency of a natural mode of oscillation of the tube arrangement, for example, an eigenfrequency of the bending oscillation mode of the first type, in which each of the four measuring tubes executes bending oscillations.

According to a fourth embodiment of the measuring system of the invention, it is additionally provided that the transmitter electronics, based on electrical excitation power converted in the exciter mechanism, generates a viscosity measured value representing viscosity of the flowing medium; and/or that the transmitter electronics, based on oscillation signals delivered by the measuring transducer, generates a mass flow measured value representing the mass flow rate of the flowing medium and/or a density measured value representing density of the flowing medium.

A basic idea of the invention is to provide by means of a deformation body coupled via connecting struts with each of the measuring tubes—for example, a deformation body embodied as a frame construction or interconnection of struts—a coupling element serving for adjusting eigenfrequencies of natural oscillation modes of a tube arrangement of the type being discussed for a measuring transducer of the vibration type, wherein this coupling element has a spring stiffness effective for the V-mode, which is different from a spring stiffness effective for the X-mode to such a degree, that, as a result, a sufficiently high frequency separation between the eigenfrequencies of the V-mode and of the X-mode, and consequently a mutual separation of the V-mode and the X-mode is brought about. This occurs not least of all also in such a manner that the V-mode ultimately serving as the wanted mode is itself influenced as little as possible, that is to say is changed as little as possible with respect to its original eigenfrequency, that is to say its eigenfrequency in the case of the tube arrangement without the coupling element. This is in the present case also achieved by the coupling element being formed in the form of an interconnection of a plurality of spring subelements—for instance, spring subelements embodied in the form of rod, bar or plate springs—which act in the directions of the principal axes of the tube arrangement, namely in the direction of the transverse axis (X-direction), the vertical axis (Y-direction) or the longitudinal axis (Z-direction), or about the principal axes with bending and/or tension stiffnesses which in part differ to a considerable degree.

An advantage of the invention lies, among other things, additionally in the fact that, via use of one or more coupling elements of the type being discussed, the possibilities for use of tube arrangements with four curved measuring tubes in measuring transducers of the vibration type are drastically improved in a simple, as well as very effective manner. By application of curved measuring tubes, lasting mechanical stresses, for example, as a result of thermally related expansion of the measuring tubes or as a result of clamping forces introduced into the measuring transducer because of the tube arrangement, are in turn largely prevented within the tube arrangement, or at least kept very low, and, as a result, the accuracy of measurement, as well as also the structural integrity of the measuring transducer, are safely maintained, even in the case of extremely hot media, or in the case of temperature gradients strongly fluctuating within the tube arrangement as a function of time. Moreover, due to the symmetry characteristics of the tube arrangement, also those transverse forces caused by bending oscillations of curved measuring tubes can largely be neutralized, which—as is discussed, among other things, in the previously mentioned EP-A 1 248 084 and U.S. Pat. No. 7,350,421—act essentially perpendicularly to the longitudinal section planes of the measuring transducer or its tube arrangement, specifically in the Y-direction, and can be quite damaging for the accuracy of measurement of measuring transducers of the vibration type. Additionally, in the case of measuring transducers of the aforementioned type, in comparison to conventional measuring transducers with only one or two bent measuring tubes, an increased oscillation quality factor of the measuring transducer as a whole could be detected, this being especially a result of a significantly lessened dissipation of oscillatory energy from the measuring transducer into the pipeline connected thereto, for instance, as a result of actually undesired deformation of the flow dividers. Moreover, oscillations, especially in the V-mode, of the measuring tubes of the measuring transducers according to the present invention also are, in comparison to conventional measuring transducers, influenced to a significantly lesser degree by pressure jolts and sound.

A further advantage the invention is additionally to be seen in the fact that by application of coupling elements of the type being discussed, for example, coupling elements embodied as an interconnection of individual rod- or plate-shaped spring portions, recourse can also by all means be made to conventional tubular shapes, and, as a result of this, predominantly established structural designs, for instance as regards materials used, joining technology, manufacturing steps, etc., or these need only be slightly modified. As a result of this, the manufacturing costs as a whole can also be kept to a level, which is equal, for instance, to that of conventional measuring transducers of vibration type of an equal nominal diameter. In this regard, a further advantage of the invention is to be found in the fact that, as a result of this, not only is an opportunity created for implementing comparatively compact measuring transducers of vibration type even with large nominal diameters of over 150 mm (and especially with a nominal diameters of more than 250 mm) with manageable geometric dimensions and empty dimensions, but additionally, this can also be accomplished in an economically sensible manner.

The measuring transducer of the invention is consequently suitable not only for measuring mass flows in conventional measuring ranges of some few kilogram/hour up to some 100 t/h, but also for measuring flowable media, which are conveyed in a pipeline with a caliber of greater 150 mm, especially of 300 mm or more. Additionally, the measuring transducer is also suitable for measuring mass flows, which are at least at times greater than 1000 t/h, especially at least at times amounting to more than 1500 t/h, such as can occur, for example, in the case of applications for measuring petroleum, natural gas or other petrochemical materials.

The invention, as well as other advantageous embodiments thereof, will now be explained in greater detail on the basis of examples of embodiments presented in the figures of the drawing. Equal parts are provided in the figures with equal reference characters; when required to avoid clutter or when it otherwise appears sensible, already mentioned reference characters are omitted in subsequent figures. Other advantageous embodiments or further developments, especially also combinations of aspects of the invention first explained only individually, will additionally become evident from the figures of the drawing. In particular, the figures of the drawing show as follows:

DETAILED DISCUSSION IN CONJUNCTION WITH THE DRAWINGS

Figure 1:
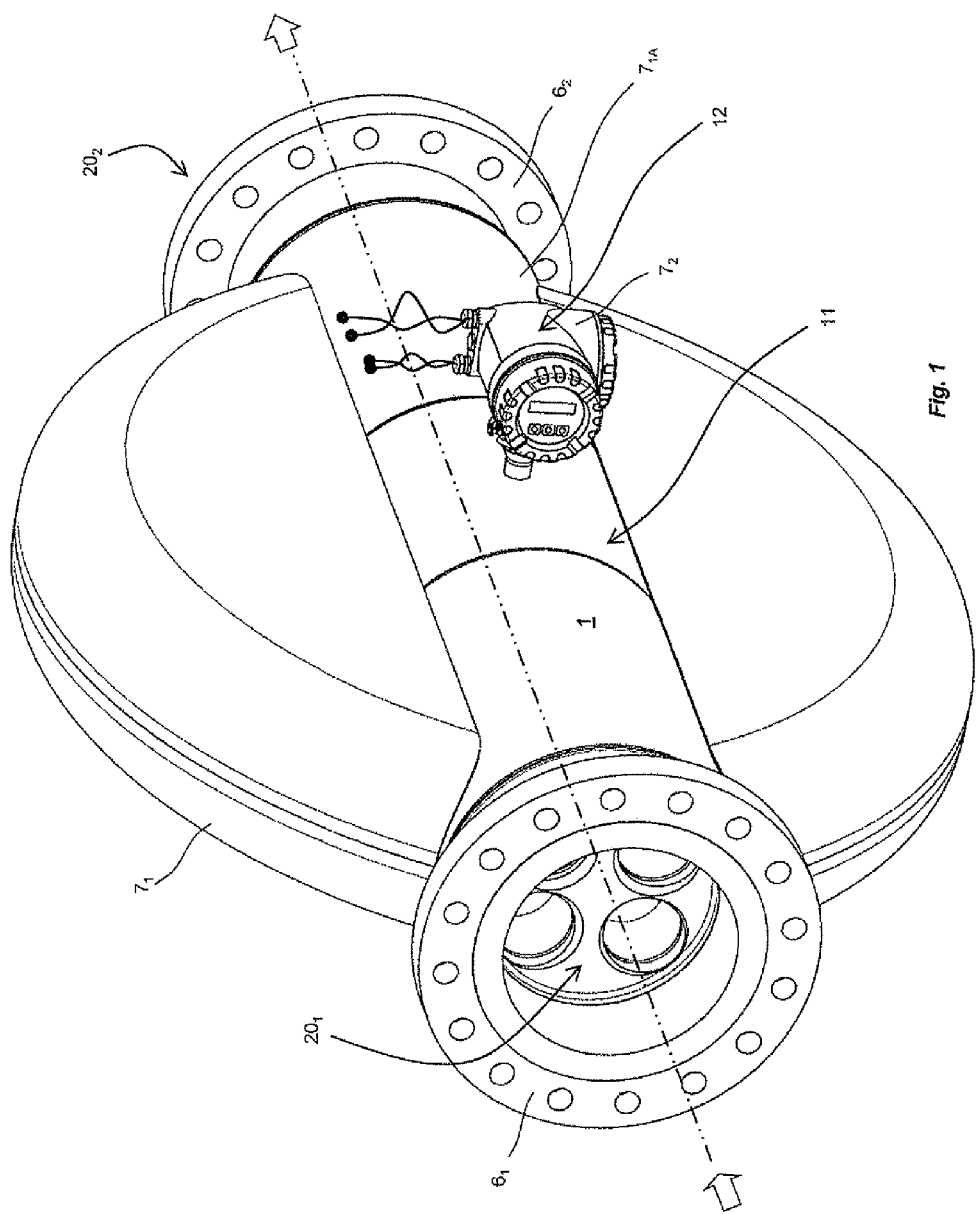
FIGS. 1 and 2 an in-line measuring device, serving, for example, as a Coriolis flow/density/viscosity measuring device, in perspective and also partially sectioned side views.
Figure 2:
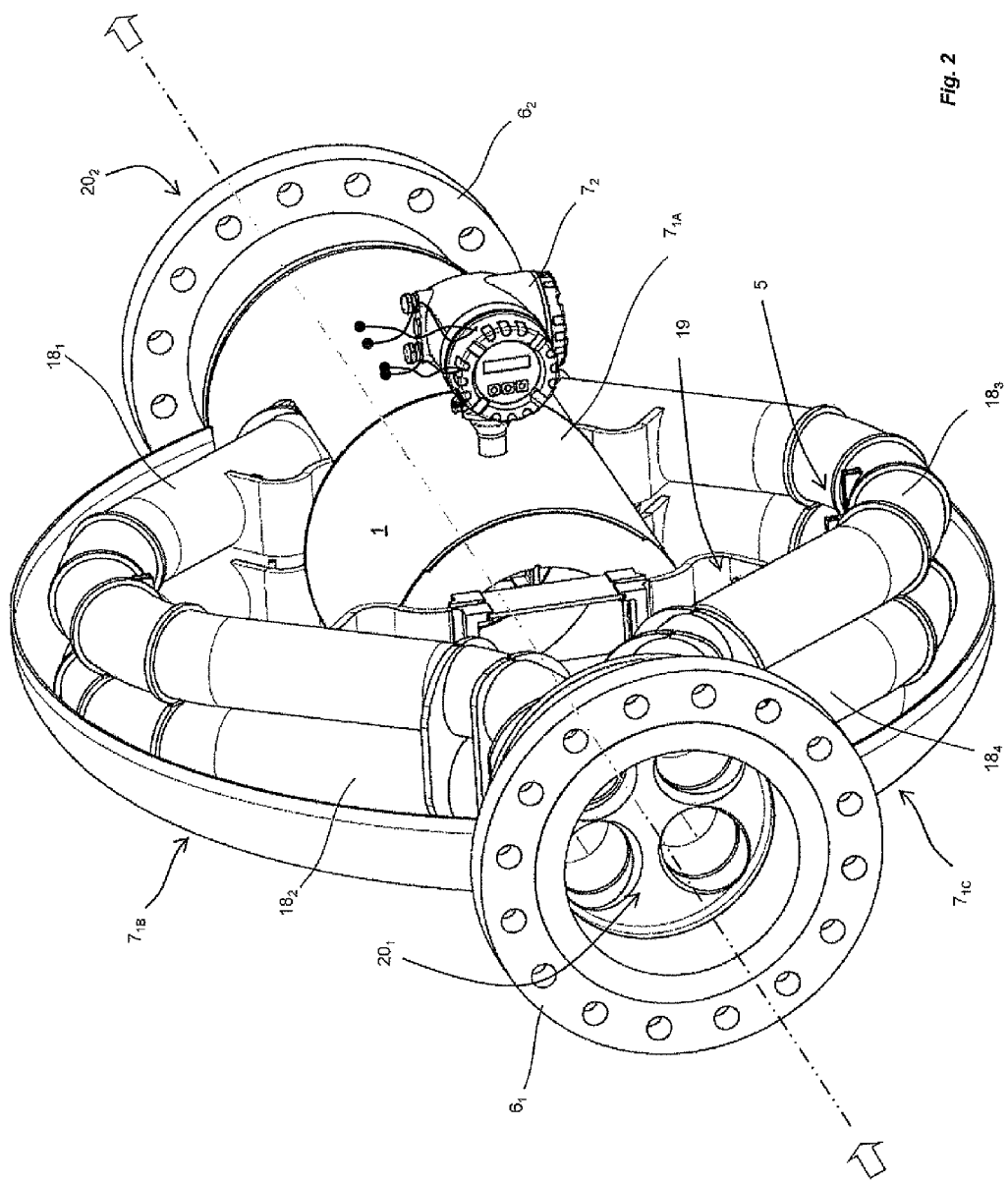

FIGS. 1, 2 schematically show a measuring system 1, especially a measuring system embodied as a Coriolis mass flow and/or density measuring device, which especially serves for registering a mass flow m of a medium flowing in a pipeline (not shown for reasons of perspicuity) and for representing such in a mass flow measured value representing this mass flow instantaneously. The medium can be practically any flowable material, for example, a powder, a liquid, a gas, a vapor, or the like. Alternatively or in supplementation, measuring system 1 can, in given cases, also be used for measuring a density $\rho$ and/or a viscosity $\eta$ of the medium. The measuring system is especially provided for measuring media such as, for example, petroleum, natural gas or other petrochemical materials, which are flowing in a pipeline having a caliber greater than 250 mm, especially a caliber (=nominal diameter of the measuring system) of 300 mm or more. Not least of all, the measuring system is also provided for measuring flowing media of the aforementioned type, which are caused to flow with a mass flow rate of greater than 1000 t/h, especially greater than 1500 t/h; it can, however, also directly be dimensioned in such a manner that it also is suitable for measuring in the case of smaller mass flow rates, for instance, also of less than 10 t/h, or for pipelines with a smaller caliber, for instance, also of less than 100 mm.

Measuring system 1, shown here in the form of an in-line measuring device, namely a measuring device, which can be inserted into the course of a pipeline, comprises, for such purpose: A measuring transducer 11 of the vibration type, through which the medium being measured flows during operation; as well as, electrically connected with measuring transducer 11, a transmitter electronics 12 (which is here not shown in detail) for operating the measuring transducer and for evaluating oscillation signals delivered by the measuring transducer. In an advantageous manner, the transmitter electronics 12, which is formed, for example, by means of one or more microprocessors and/or by means of one or more digital signal processors, can, for example, be designed in such a manner that during operation of the measuring system 1, it can exchange measuring and/or other operating data with a measured value processing unit superordinated to it, for example, a programmable logic controller (PLC), a personal computer and/or a work station, and do so via a data transmission system, for example, a hardwired fieldbus system and/or wirelessly per radio. Furthermore, the transmitter electronics 12 can be designed in such a manner that it can be fed by an external energy supply, for example, also via the aforementioned fieldbus system. For the case, in which the measuring system 1 is provided for coupling to a fieldbus or other communication system, the transmitter electronics 12—for example, also a transmitter electronics, which is programmable on-site and/or via a communication system—can additionally include a corresponding communication interface for data communication, e.g. for sending the measured data to the already mentioned programmable logic controller or a superordinated process control system, and/or for receiving settings data for the measuring system.

FIGS. 4a, 4b, 5a, 5b, 6a, 6b show different representations of an example of an embodiment for a measuring transducer 11 of the vibration type suited for the measuring system 1, especially one serving as a Coriolis mass flow, density and/or viscosity transducer, wherein measuring transducer 11 is applied during operation in the course of a pipeline (not shown), through which a medium to be measured, for example, a powdered, liquid, gaseous or vaporous medium, is flowing. As already mentioned, measuring transducer 11 serves to produce in a medium flowing therethrough such mechanical reaction forces—especially Coriolis forces dependent on the mass flow rate, inertial forces dependent on the density of the medium and/or frictional forces dependent on the viscosity of the medium—which react measurably, especially in a manner registerable via sensor, on the measuring transducer. Derived from these reaction forces describing the medium, by means of evaluating methods correspondingly implemented in the transmitter electronics in the manner known to those skilled in the art, the mass flow rate m (thus the mass flow), for example, and/or the density and/or the viscosity of the medium can be measured.

The measuring transducer 11 includes a transducer housing $7_1$, which is here partially essentially tubular—and thus also externally partially circularly cylindrical,—in which other components of the measuring transducer 11 serving for registering the at least one measured variable are accommodated so as to be protected against external environmental influences, thus dust or water spray or also any other kinds of forces acting externally on the measuring transducer. An inlet-side, first housing end of the transducer housing $7_1$ is formed by means of an inlet-side, first flow divider $20_1$, and an outlet-side, second housing end of the transducer housing $7_1$ is formed by means of outlet-side, second flow divider $20_2$. Each of the two flow dividers $20_1$, $20_2$, which are, in this respect, formed as integral components of the housing, includes four flow openings $20_{1A}$, $20_{1B}$, $20_{1C}$, $20_{1D}$, or $20_{2A}$, $20_{2B}$, $20_{2C}$, $20_{2D}$—for example, circularly cylindrical, or tapered or conical flow openings—each spaced from one another and/or each embodied as an inner cone. Moreover, each of the flow dividers $20_1$, $20_2$, which are, for example, manufactured from steel, is provided with a flange $6_1$ or $6_2$, which is, for example, manufactured of steel, and serves for connecting of the measuring transducer 11 to a tubular segment of the pipeline serving for supplying medium to the measuring transducer, or to a tubular segment of such pipeline serving for removing medium from the measuring transducer. According to an embodiment of the invention, each of the two flanges $6_1$, $6_2$ has a mass of more than 50 kg, especially more than 60 kg and/or less than 100 kg. For leakage-free and especially fluid-tight connecting of the measuring transducer with the respective corresponding tubular segment of the pipeline, each of the flanges additionally in each case includes a corresponding sealing surface $6_{1A}$ or $6_{2A}$, which is as planar as possible. A distance between the two sealing surfaces $6_{1A}$, $6_{2A}$ of both flanges thus for practical purposes defines an installed length, $L_{11}$, of the measuring transducer 11. The flanges are dimensioned, especially as regards their inner diameter, their respective sealing surface as well as the flange bores serving for accommodating corresponding connection bolts, according to the nominal diameter $D_{11}$ provided for the measuring transducer 11, as well as according to the industrial standards in given cases relevant therefor, which correspond to a caliber of the pipeline, in whose course the measuring transducer is to be used. As a result of the large nominal diameter especially desired for the measuring transducer, its installed length $L_{11}$ amounts, according to an embodiment of the invention, to more than 1200 mm. Additionally, it is, however, provided that the installed length of the measuring transducer 11 is kept as small as possible, especially smaller than 3000 mm. The flanges $6_1$, $6_2$ can, as is also directly evident from FIG. 4a and is quite usual in the case of such measuring transducers, be arranged for this purpose as near as possible to the flow openings of the flow dividers $20_1$, $20_2$, in order to thus provide as short as possible an inlet (or outlet, as the case may be) region in the flow dividers, and thus to provide as a whole as short an installed length $L_{11}$ of the measuring transducer as possible, especially an installed length $L_{11}$ of less than 3000 mm. For a measuring transducer which is as compact as possible, and especially also in the case of high desired mass flow rates of over 1000 t/h, according to another embodiment of the invention, the installed length and the nominal diameter of the measuring transducer are dimensioned and matched to one another in such a manner that a nominal-diameter to installed-length ratio $D_{11}/L_{11}$ of the measuring transducer, as defined by a ratio of the nominal diameter $D_{11}$ of the measuring transducer to the installed length $L_{11}$ of the measuring transducer, is smaller than 0.3, especially smaller than 0.2 and/or greater than 0.1. In the example of an embodiment shown here, at least one middle segment $7_{1A}$ of the transducer housing $7_1$ is formed by means of a straight tube—here also a circularly cylindrical, and initially three-part tube so that for manufacturing the transducer housing $7_1$, welded or cast standard tubes, for example, also standardized and consequently cost effective welded or cast standard tubes, can be used, for example, tubes made of cast steel or forged steel. As is additionally directly evident from the combination of FIGS. 1 and 2, the middle segment $7_{1A}$ of the transducer housing $7_1$ can be formed, in such case, also for example by means of a tube having approximately the caliber of the pipeline it is to be connected to, and consequently corresponding to a nominal diameter $D_{11}$ of the measuring transducer, especially a tube corresponding as regards caliber, wall thickness and material to the pipeline it is to be connected to, and, in this respect, also correspondingly matched as regards the allowed operating pressure. Particularly for the case, in which the tubular middle segment as well as also the flow dividers connected with the respective flanges in the inlet and outlet regions each have the same inner diameter, the transducer housing can additionally also be formed in a manner such that the flanges are formed or welded on the ends of the tube forming the middle segment, and that the flow dividers are formed by means of plates having the flow openings, especially plates somewhat spaced from the flanges and welded orbitally to the inner wall and/or by means of laser welding.

For conveying the medium flowing at least at times through pipeline and measuring transducer, the measuring transducer of the invention additionally comprises a tube arrangement having four curved or bent, for example at least sectionally circular arc shaped, and/or—as shown here schematically—at least sectionally V-shaped measuring tubes $18_1$, $18_2$, $18_3$, $18_4$, which are held oscillatably in the transducer housing 10. The four measuring tubes—in this case, measuring tubes of equal length and arranged pairwise in parallel—in each case communicate with the pipeline connected to the measuring transducer and are at least at times and especially also simultaneously caused during operation to vibrate in at least one actively excited oscillatory mode—the so-called wanted mode—suited for ascertaining the physical, measured variable. Of the four measuring tubes, a first measuring tube $18_1$ opens with an inlet-side, first measuring tube end into a first flow opening $20_{1A}$ of the first flow divider $20_1$ and with an outlet-side, second measuring tube end into a first flow opening $20_{2A}$ of the second flow divider $20_2$; a second measuring tube $18_2$ opens with an inlet-side, first measuring tube end into a second flow opening $20_{1B}$ of the first flow divider $20_1$ and with an outlet-side, second measuring tube end into a second flow opening $20_{2B}$ of the second flow divider $20_2$; a third measuring tube $18_3$ opens with an inlet-side, first measuring tube end into a third flow opening $20_{1C}$ of the first flow divider $20_1$ and with an outlet-side, second measuring tube end into a third flow opening $20_{2C}$ of the second flow divider $20_2$; and a fourth measuring tube $18_4$ opens with an inlet-side, first measuring tube end into a fourth flow opening $20_{1D}$ of the first flow divider $20_1$ and with an outlet-side, second measuring tube end into a fourth flow opening $20_{2D}$ of the second flow divider $20_2$. The four measuring tubes $18_1$, $18_2$, $18_3$, $18_4$ are thus connected to the flow dividers $20_1$, $20_2$—which are especially equally constructed flow dividers $20_1$, $20_2$—to form flow paths connected in parallel, and indeed in a manner enabling vibrations, especially bending oscillations, of the measuring tubes relative to one another, as well as also relative to the transducer housing. Additionally, it is provided that the four measuring tubes $18_1$, $18_2$, $18_3$, $18_4$ are held oscillatably in the transducer housing $7_1$—here, namely on its middle segment $7_{1A}$—only by means of said flow dividers $20_1$, $20_2$. Suitable as material for the tube walls of the measuring tubes is, for example, stainless steel (in given cases, also high strength stainless steel), titanium, zirconium or tantalum, or alloys formed therewith or also super alloys, such as, for instance, Hastelloy, Inconel etc. Moreover, the material for the four measuring tubes $18_1$, $18_2$, $18_3$, $18_4$ can also be practically any other material usually used therefor, or at least a material suitable therefor, especially one with as small a thermal expansion coefficient as possible and as high a yield point as possible.

Alternatively or in supplementation, according to an additional embodiment of the invention, at least the first and second measuring tubes $18_1$, $18_2$ are of equal construction as regards the material of their tube walls and/or as regards their geometric tube dimensions, especially a measuring tube length, a tube outer diameter, a tube wall thickness and/or a caliber, and consequently as regards a tube cross section in each case determined by a caliber and wall thickness each of the measuring tube. Additionally, also at least the third and the fourth measuring tube $18_3$, $18_4$ are of equal construction as regards the material of their tube walls, and/or as regards their geometric tube dimensions, especially as regards a measuring tube length, a tube outer diameter, a tube wall thickness and/or a caliber, so that, as a result, the four measuring tubes $18_1$, $18_2$, $18_3$, $18_4$ are, at least pairwise, essentially of equal construction. Preferably, the four measuring tubes $18_1$, $18_2$, $18_3$, $18_4$ are of equal construction as regards the material of their tube walls, and/or as regards their geometric tube dimensions, especially a measuring tube length, a tube wall thickness, a tube outer diameter, a form of their bending lines and/or a caliber, especially in such a manner that the four measuring tubes each have the same tube cross section, namely that both the second measuring tube as well as also the third measuring tube and the fourth measuring tube each have a caliber, which in each case is equal to a caliber, $D_{18}$, of the first measuring tube, as well as each have a wall thickness, which is equal to a wall thickness, $h_{18}$, of the first measuring tube, and consequently both the second measuring tube as well as also the third measuring tube and the fourth measuring tube each have an outer diameter, which is equal to an outer diameter, $D_{18}+2\cdot h_{18}$, of the first measuring tube, so that also an areal moment of inertia of each of the measuring tubes dependent on caliber and wall thickness, and—in the case of use also of the same materials for all four measuring tubes—both the second measuring tube as well as also the third measuring tube and the fourth measuring tube each have a bending stiffness dependent on the modulus of elasticity determined by the material of the respective measuring tube as well as on the respective areal moment of inertia, this bending stiffness in each case being equal to the bending stiffness, $E_{18} \cdot J_{18}$, of the first measuring tube, or have an empty mass, which is equal to an empty mass, $M_{18}$, of the first measuring tube. As a result of this, for this case, also at least one minimum bending oscillation resonance frequency of each of the four measuring tubes $18_1$, $18_2$, $18_3$, $18_4$ (empty or uniformly flowed-through by a homogeneous medium) essentially equals the respective minimum bending oscillation resonance frequencies of the remaining other measuring tubes.

Figure 4A:
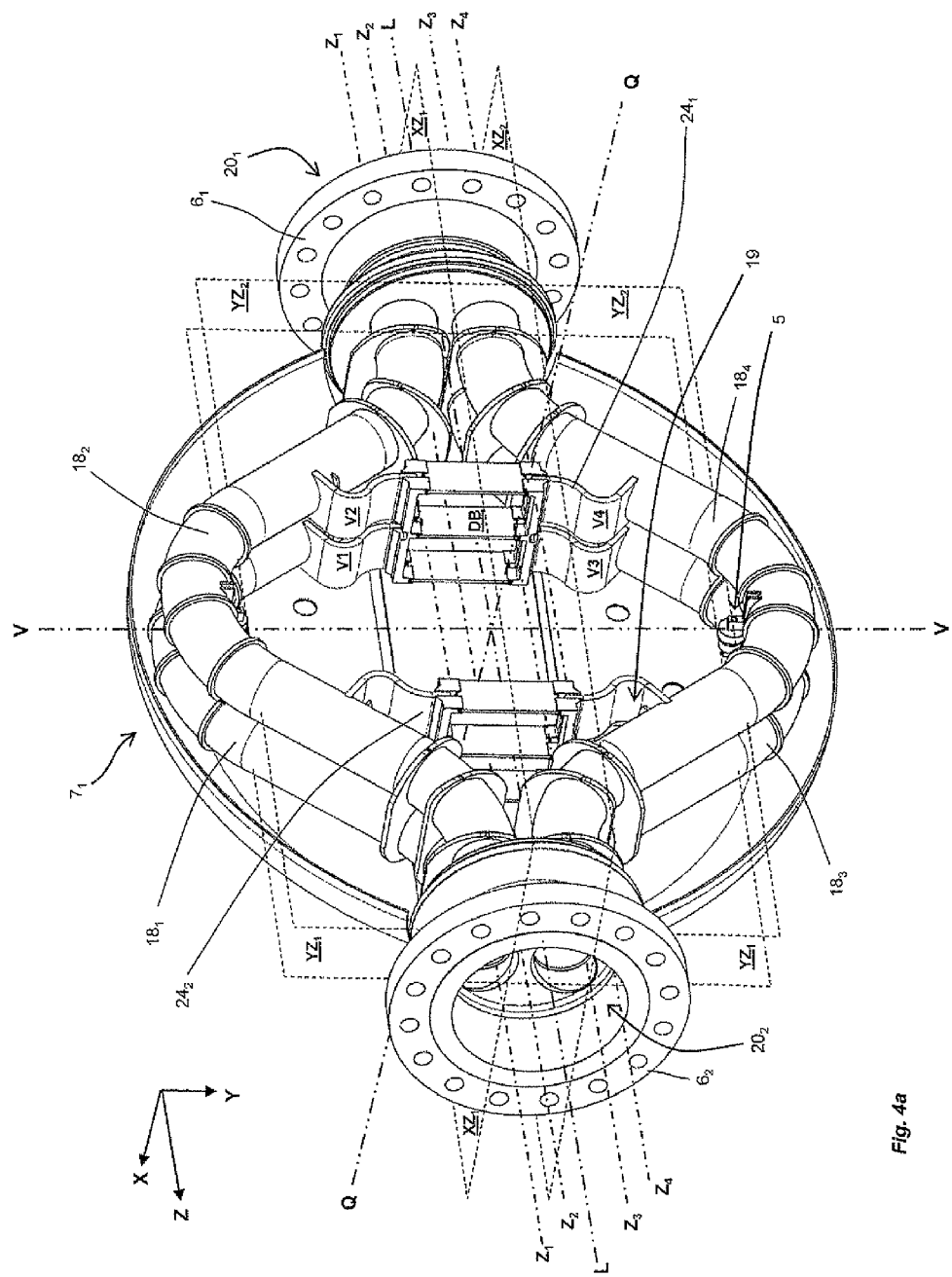
FIG. 4a in perspective side view, a measuring transducer of vibration type having a tube arrangement formed by means of four bent measuring tubes as well as at least one coupling element serving for adjusting the eigenfrequencies of the tube arrangement, installed in an in-line measuring device of FIG. 1.
Figure 4B:
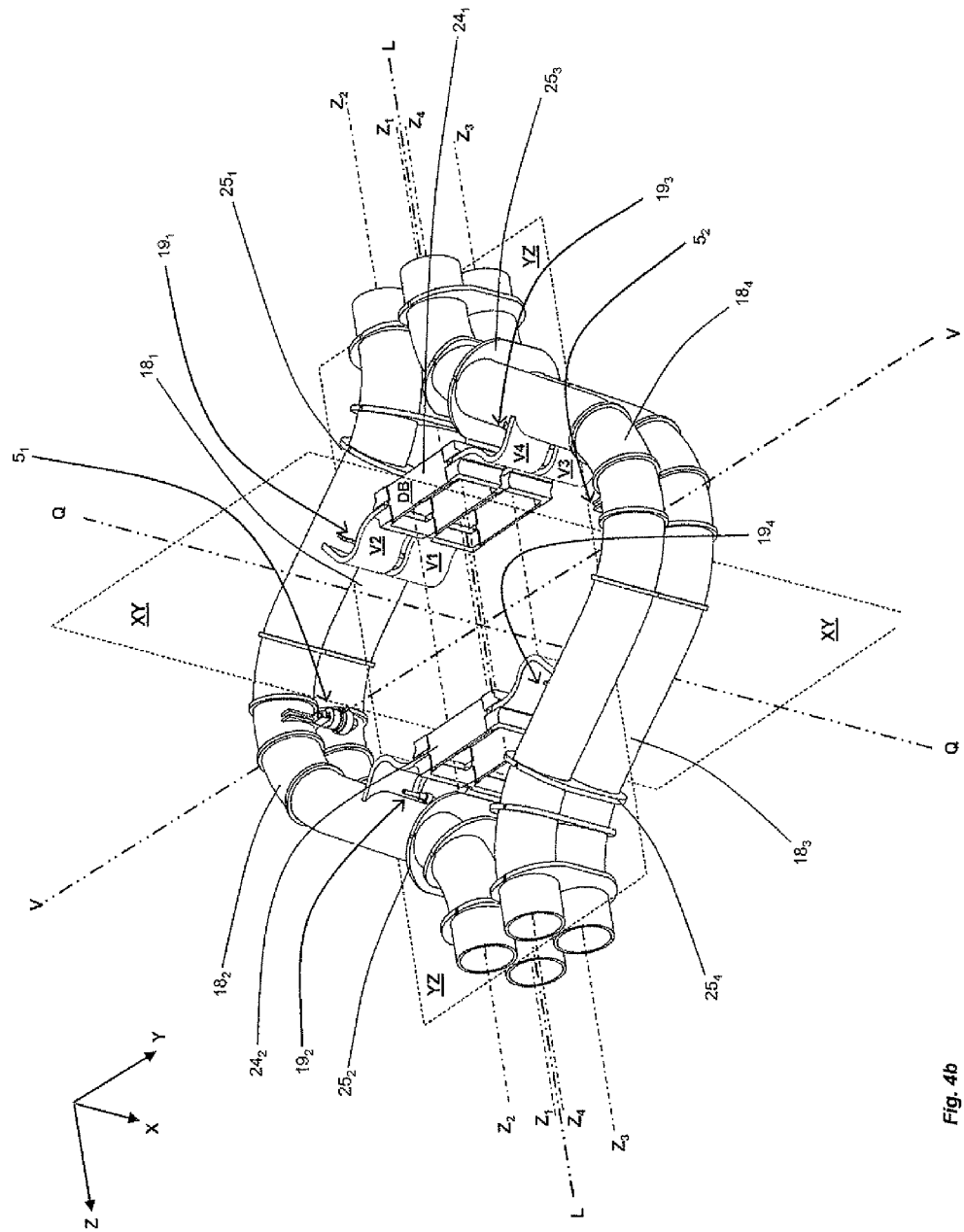
FIG. 4b the tube arrangement of FIG. 4a in perspective side view.
Figure 4C:
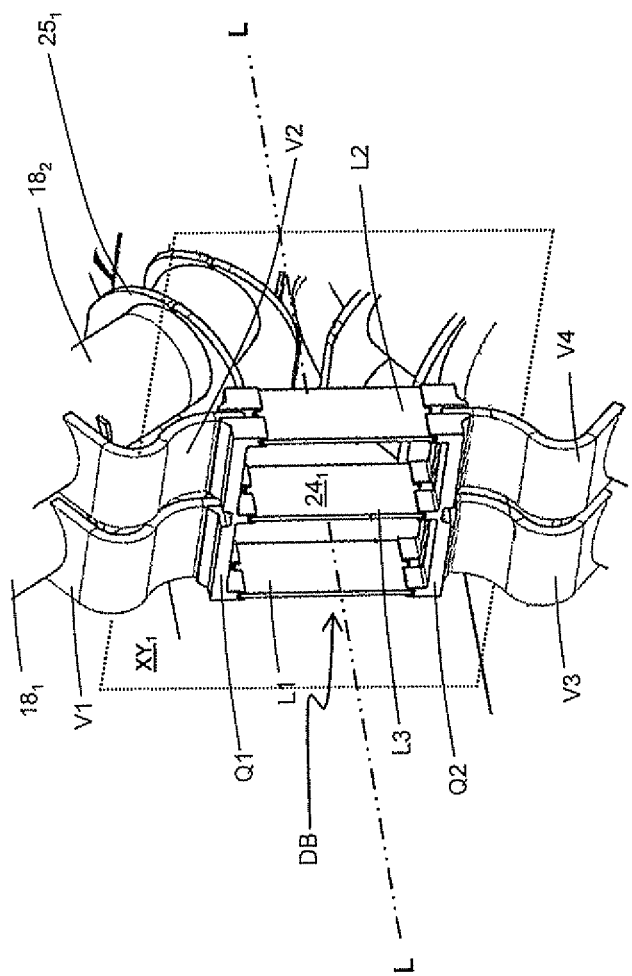
FIG. 4c in an enlarged perspective side view, the coupling element of the tube arrangement according to FIG. 4a or 4b.

In the case of the measuring transducer of the invention, the measuring tubes are, as is also directly evident from the combination of FIGS. 2, 4a and 4b, additionally embodied and arranged in the measuring transducer in such a manner that the tube arrangement has, lying both between the first measuring tube $18_1$ and the third measuring tube $18_3$ as well as also between the second measuring tube $18_2$ and the fourth measuring tube $18_4$, a first imaginary longitudinal-section plane XZ, with respect to which the tube arrangement is mirror symmetric, and in such a manner that the tube arrangement furthermore has, perpendicular to its imaginary first longitudinal-section plane XZ, and extending both between the first measuring tube $18_1$ and second measuring tube $18_2$ as well as also between the third measuring tube $18_3$ and the fourth measuring tube $18_4$, a second imaginary longitudinal-section plane YZ, with respect to which the tube arrangement likewise is mirror symmetric. As a result of this, not only are stresses generated by possible thermally related expansion of the measuring tubes within the tube arrangement minimized, but also transverse forces possibly induced by the bending oscillations of the bent measuring tubes within the tube arrangement and acting essentially perpendicularly to the line of intersection of the two aforementioned imaginary longitudinal section planes can be largely neutralized, and not least of all also those transverse forces mentioned, among other things, also in the previously mentioned EP-A 1 248 084 and U.S. Pat. No. 7,350,421, are directed essentially perpendicular to the first imaginary longitudinal-section plane XZ. As is especially also evident from FIGS. 4a, 4b, 5a, 5b, in the example of an embodiment shown here, each of the four measuring tubes has a measuring tube peak, defined as the greatest perpendicular distance of the respective measuring tube from the first imaginary longitudinal, section plane XZ. Apart from this, the tube arrangement has, as is also directly evident from the combination of FIGS. 4a-6b, an imaginary cross sectional plane XY perpendicular both to the first imaginary longitudinal section plane XZ as well as also to the second imaginary longitudinal section plane YZ. In an advantageous embodiment of the invention, the tube arrangement is additionally embodied in such a manner that a center of mass of the tube arrangement lies in the imaginary cross sectional plane XY, or that the tube arrangement is mirror symmetric relative to the imaginary cross sectional plane XY, for instance, in such a manner that the imaginary cross sectional plane XY intersects each of the four measuring tubes in its respective measuring tube peak.

For additional symmetrization of the measuring transducer and, thus, also for additional simplifying of its construction, the two flow dividers $20_1$, $20_2$ are, according to an additional embodiment of the invention, additionally embodied in such a manner and arranged in the measuring transducer in such a manner that, as is also schematically presented in FIGS. 4a and 4b, an imaginary first connecting axis $Z_1$ of the measuring transducer imaginarily connecting the first flow opening $20_{1A}$ of the first flow divider $20_1$ with the first flow opening $20_{2A}$ of the second flow divider $20_2$ extends parallel to an imaginary second connecting axis $Z_2$ of the measuring transducer imaginarily connecting the second flow opening $20_{1B}$ of the first flow divider $20_1$ with the second flow opening $20_{2B}$ of the second flow divider $20_2$, and that an imaginary third connecting axis $Z_3$ of the measuring transducer imaginarily connecting the third flow opening $20_{1C}$ of the first flow divider $20_1$ with the third flow opening $20_{2C}$ of the second flow divider $20_2$ extends parallel to an imaginary fourth connecting axis $Z_4$ of the measuring transducer imaginarily connecting fourth flow opening $20_{1D}$ of the first flow divider $20_1$ with fourth flow opening $20_{2B}$ of the second flow divider $20_2$. As shown in FIGS. 4a and 4b, the flow dividers are additionally embodied in such a manner and arranged in the measuring transducer in such a manner that the connecting axes $Z_1$, $Z_2$, $Z_3$, $Z_4$ also are parallel to a principal flow axis L of the measuring transducer essentially aligning with the pipeline and/or coincident with the aforementioned line of intersection of the two imaginary longitudinal section planes XZ, YZ of the tube arrangement. Furthermore, the two flow dividers $20_1$, $20_2$ can additionally also be embodied in such a manner and arranged in the measuring transducer in such a manner that a first imaginary longitudinal-section plane $XZ_1$ of the measuring transducer, within which the first imaginary connecting axis $Z_1$ and the second imaginary connecting axis $Z_2$ extend, is parallel to a second imaginary longitudinal section plane $XZ_2$ of the measuring transducer, within which the imaginary third connecting axis $Z_3$ and the imaginary fourth connecting axis $Z_4$ extend. Additionally, the measuring tubes are advantageously arranged in such a manner that the tube arrangement has a minimum distance between the second measuring tube and the fourth measuring tube, ultimately also determined by a minimum distance between the second and fourth flow opening of the first flow dividers, or the second and fourth flow opening of the second flow divider, wherein this minimum distance is equal to a minimum distance, $A_{18}$, between the first measuring tube and the third measuring tube, ultimately determined by a minimum distance between the first and third flow openings of the first flow divider, or the first and third flow openings of the second flow divider.

Figure 3A:
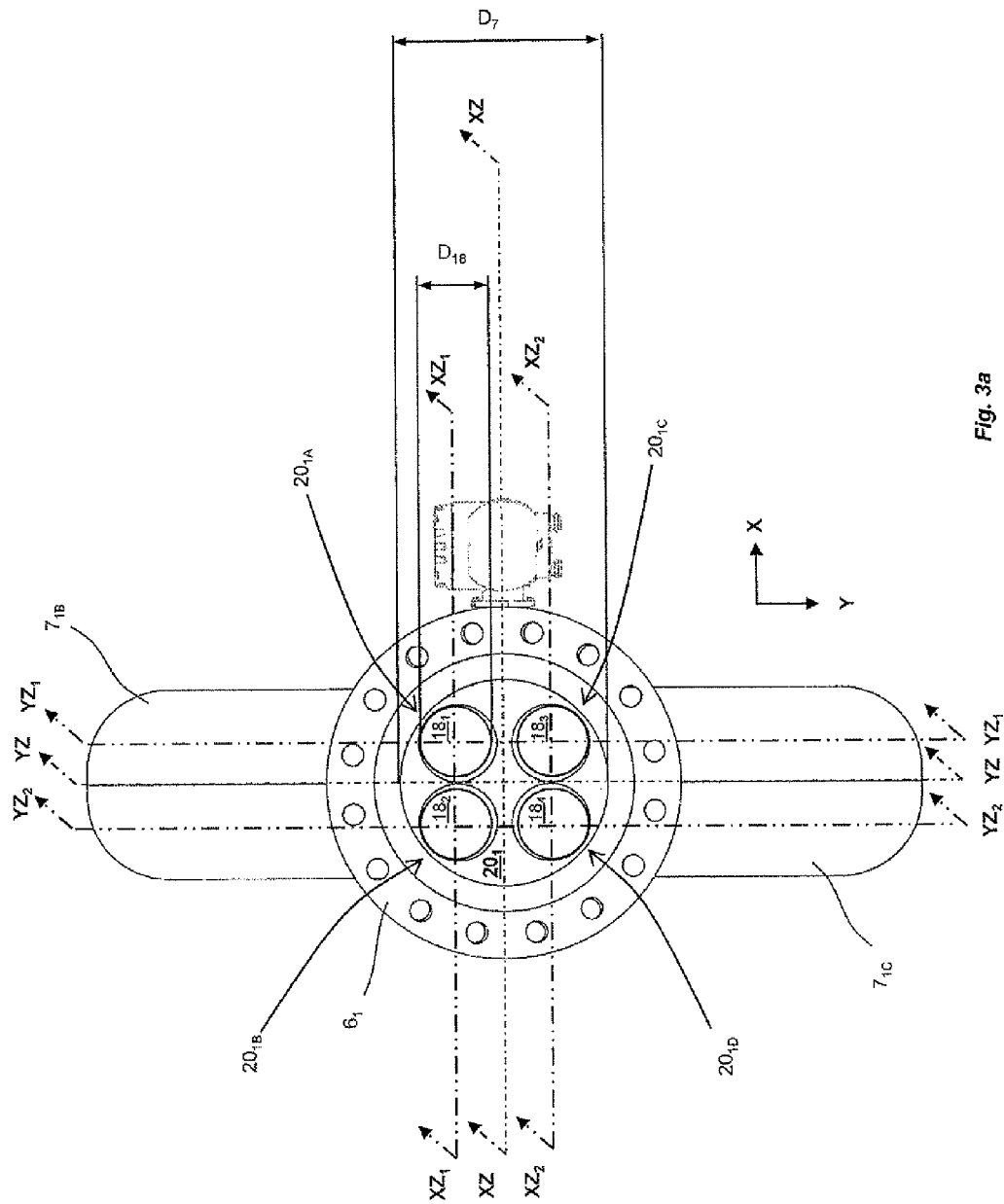
FIGS. 3a and 3b a projection of the in-line measuring device of FIG. 1 in two different side views.
Figure 3B:
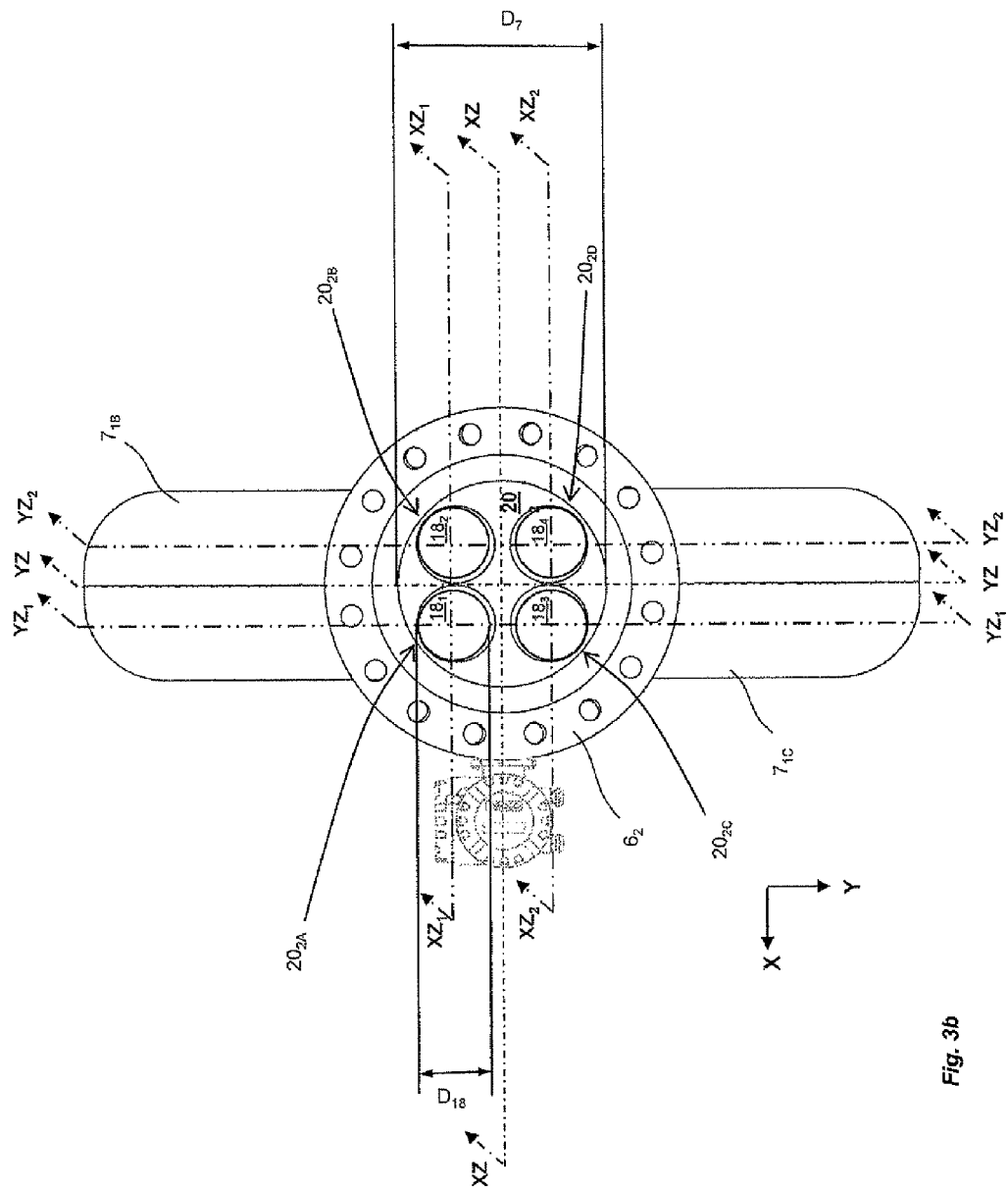

Moreover, the measuring tubes are, according to an additional embodiment of the invention, additionally embodied in such a manner and arranged in the measuring transducer in such a manner that the imaginary first longitudinal section plane XZ of the tube arrangement—as is, among other things, also evident from the combination of FIGS. 3a and 4a—lies between the aforementioned first imaginary longitudinal section plane $XZ_1$ of the measuring transducer and the aforementioned second imaginary longitudinal section plane $XZ_2$ of the measuring transducer, for example, also such that the first longitudinal section plane XZ of the tube arrangement is parallel to the first and second longitudinal section planes $XZ_1$, $XZ_2$ of the measuring transducer. Additionally, the measuring tubes are embodied and arranged in the measuring transducer in such a manner that likewise, also the second imaginary longitudinal section plane YZ of the tube arrangement extends between the third imaginary longitudinal section plane $YZ_1$ of the measuring transducer and fourth imaginary longitudinal section plane $YZ_2$ of the measuring transducer, for instance in such a manner that the second imaginary longitudinal section plane YZ of the tube arrangement is parallel to the third imaginary longitudinal section plane $YZ_1$ of the measuring transducer and parallel to fourth imaginary longitudinal section plane $YZ_2$ of the measuring transducer. In the example of an embodiment shown here, the tube arrangement is, as is directly evident from the combination of FIGS. 4a, 4b, 5a, 5b and 6a, additionally embodied in such a manner and placed in the transducer housing in such a manner that, as a result, not only the shared line of intersection of the first and second imaginary longitudinal section planes XZ, YZ of the tube arrangement is parallel or coincident with the longitudinal axis L, but also a shared line of intersection of the first longitudinal section plane XZ and the cross sectional plane XY is parallel to an imaginary transverse axis Q of the measuring transducer perpendicular to the longitudinal axis L, and a shared line of intersection of the second longitudinal section plane YZ and the cross sectional plane XY is parallel to an imaginary vertical axis V of the measuring transducer perpendicular to the longitudinal axis L.

In an additional advantageous embodiment of the invention, the flow openings of the first flow divider $20_1$ are additionally arranged in such a manner that those imaginary areal centers of gravity, which belong to the—here circularly shaped—cross sectional areas of the flow openings of the first flow divider form the vertices of an imaginary rectangle or of an imaginary square, wherein said cross sectional areas lie, in turn, in a shared imaginary, cross sectional plane of the first flow divider extending perpendicular to a longitudinal axis L of the measuring transducer—for example, a longitudinal axis extending within the first longitudinal section plane XZ of the tube arrangement, or parallel to or even coincident with the mentioned principal flow axis of the measuring transducer—or perpendicular to the longitudinal section planes of the measuring transducer. Additionally, the flow openings of the second flow divider $20_2$ also are arranged in such a manner that imaginary areal centers of gravity associated with—here likewise circularly shaped—cross sectional areas of the flow openings of the second flow divider $20_2$ form the vertices of an imaginary rectangle or square, wherein said cross sectional areas lie, in turn, in a shared imaginary, cross sectional plane of the second flow divider extending perpendicular to the mentioned main flow axis or also longitudinal axis L of the measuring transducer, or perpendicular to the longitudinal section planes of the measuring transducer. In an additional embodiment of the invention, the measuring tubes are bent in such a manner and arranged in the measuring transducer in such a manner that a caliber to height ratio $D_{18}/Q_{18}$ of the tube arrangement, defined by a ratio of the caliber, $D_{18}$, of the first measuring tube to a maximal lateral expanse of the tube arrangement $Q_{18}$, measured from a peak of the first measuring tube to a peak of the third measuring tube, or measured from a peak of the second measuring tube to a peak of the fourth measuring tube, amounts to more than 0.05, especially more than 0.07 and/or less than 0.35, especially less than 0.2.

For the purpose of implementing as compact a measuring transducer as possible, especially also for the mentioned case, in which such should have a comparatively large nominal diameter of 250 mm or more, and/or that the measuring tubes are comparatively spread out in a lateral direction, the transducer housing $7_1$ can advantageously—as is additionally directly evident from the combination of FIGS. 1 and 2—additionally be formed by providing that the transducer housing $7_1$ is formed by means of a tube and housing caps. The tube is here, for the purpose of simplified treatment, for example, initially three-part, thus three individual segments joined together, and has corresponding lateral openings for the caps. The tube has, for instance—as already indicated—the caliber of the pipeline it is to be connected to, thus a caliber corresponding to a nominal diameter $D_{11}$ of the measuring transducer. The housing caps $7_{1B}$, $7_{1C}$, especially equally-constructed housing caps, are affixed laterally, for instance via welding, to the tube ultimately forming the middle segment of the transducer housing, and extend laterally from the middle segment to encase the segments of the measuring tubes. Of the two housing caps $7_{1B}$, $7_{1C}$—as is evident from the combination of FIGS. 1-4a—a first housing cap $7_{1B}$, for example, caps a segment of the first measuring tube extending outwards on a first side from the middle segment—especially a middle segment serving also as a support frame for the tube arrangement, and consequently formed as a support tube—and a segment of the second measuring tube extending outwards on the first side from the middle segment, and a second housing cap $7_{1C}$, for instance, a second housing cap constructed equally to the first housing cap, caps a segment of the third measuring tube extending outwards from the middle segment on a second side lying opposite the first side, and a segment of the fourth measuring tube extending outwards from the middle segment on the second side. As a result of this, the measuring tubes $18_1$, $18_2$, $18_3$, $18_4$, or the tube arrangement of the measuring transducer 11 formed therewith, are, as is directly evident from the combination of FIGS. 1, 2 and 4a, completely encased by the transducer housing $7_1$—formed here by means of the middle segment serving especially also as a support tube, as well as by the two housing caps laterally affixed thereto. For the aforementioned case, in which the transducer housing is formed by means of the tubular middle segment and the housing caps laterally affixed thereto, the four measuring tubes $18_1$, $18_2$, $18_3$, $18_4$ and the transducer housing $7_1$ are, in an additional embodiment of the invention—especially also for the purpose of minimizing the installed mass of the total measuring transducer—matched to one another, and furthermore dimensioned in such a manner that a support-tube to measuring-tube-inner-diameter ratio of the measuring transducer, defined by a ratio of the largest inner diameter of the middle segment of the transducer housing formed as a support tube to a caliber $D_{18}$ of the first measuring tube, is greater than 3 and/or smaller than 5, especially smaller than 4.

Moreover, as material for the transducer housing $7_1$, steels can be used, such as, for instance, structural steel or stainless steel, or also other high-strength materials suitable or usually suitable for such purpose. For most applications of industrial measurements technology, especially also in the petrochemical industry, measuring tubes of stainless steel, for example, also duplex steel, super duplex steel or another (high-strength) stainless steel, can additionally also satisfy the requirements regarding mechanical strength, chemical resistance as well as thermal requirements, so that in numerous cases of application, the transducer housing $7_1$, the flow dividers $20_1$, $20_2$, as well as also the tube walls of the measuring tubes $18_1$, $18_2$, $18_3$, $18_4$ can in each case be made of steel of in each case of sufficiently high quality, which, especially with respect to the material costs and manufacturing costs, as well as also to the thermally related dilation behavior of the measuring transducer 11 during operation, can be advantageous. Moreover, the transducer housing $7_1$ can advantageously additionally also be embodied in such a manner and dimensioned in such a manner that, in the case of possible damages to one or a number of the measuring tubes, e.g. through crack formation or bursting, outflowing medium can be completely retained in the interior of the transducer housing $7_1$ up to a required maximal positive pressure and for as long as desired, wherein such a critical state can—as, for example, is also mentioned in the previously cited U.S. Pat. No. 7,392,709—be registered and signaled as early as possible by means of corresponding pressure sensors and/or based on operating parameters internally produced during operation by the mentioned transmitter electronics 12. For simplifying transport of the measuring transducer or of the entire in-line measuring device formed therewith—as is, for example, also provided in the previously mentioned U.S. Pat. No. 7,350,421—transport eyes can be provided on the inlet side and outlet sides, affixed externally on the transducer housing.

As already previously mentioned, the reaction forces required for the measuring are effected in the measuring transducer 11 in the medium to be measured by causing the measuring tubes $18_1$, $18_2$, $18_3$, $18_4$ to oscillate, for example, simultaneously, in an actively excited oscillatory mode: The so-called wanted mode. For exciting oscillations of the measuring tubes, especially also those in the wanted mode, the measuring transducer further comprises an exciter mechanism 5 formed by means of at least one electro-mechanical— for example, electro-dynamic, —oscillation exciter acting on the measuring tubes $18_1$, $18_2$, $18_3$, $18_4$. Exciter mechanism 5 serves to cause each of the measuring tubes operationally at least at times to execute oscillations, especially bending oscillations, in the wanted mode, and to maintain these wanted oscillations oscillations with oscillation amplitudes sufficiently large for producing in the medium—and for registering—the above named reaction forces suitable for the particular measuring. The at least one oscillation exciter, and thus the exciter mechanism formed therewith, serves, in such case, especially for converting an electrical excitation power $P_{exc}$ fed from the transmitter electronics—for instance, by means of at least one electrical driver signal—into such exciter forces $F_{exc}$, e.g. pulsating or harmonic exciter forces $F_{exc}$, which act as simultaneously as possible, and uniformly, but in opposite directions, on at least two of the measuring tubes (for instance, the first and second measuring tubes) and, in given cases, are also coupled mechanically from the two measuring tubes further onto the other two measuring tubes, and thus effect oscillations in the wanted mode. The exciter forces $F_{exc}$ generated by converting electrical excitation power $P_{exc}$ fed into the exciter mechanism can, in the manner known to those skilled in the art, e.g. by means of an operating circuit provided in the transmitter electronics 12 and ultimately delivering the driver signal, be adjusted as regards their amplitude, for instance, by means of electrical current and/or voltage controllers implemented in the operating circuit; and can be adjusted as regards their frequency, for example, by means of an in operating circuit likewise provided phase control loop (PLL); also compare to this, for example, U.S. Pat. No. 4,801,897 or U.S. Pat. No. 6,311,136. In an additional embodiment of the invention, it is, consequently, additionally provided that, for generating the exciter forces, the transmitter electronics feeds required electrical excitation power into the exciter mechanism by means of at least one electrical driver signal—for example, an at least at times periodic driver signal—supplied to the oscillation exciter, and thus to the exciter mechanism, for example, via connecting lines. The driver signal is variable, with at least one signal frequency corresponding to an eigenfrequency of a natural mode of oscillation of the tube arrangement, for instance, one in which each of the four measuring tubes, as is quite usual in the case of measuring transducers of vibration type with curved measuring tubes, executes bending oscillations about a particular static rest position, in the manner of a cantilever clamped at one end. For example, the at least one driver signal can also have a plurality of signal components with signal frequencies differing from one another, of which at least one signal component (for instance, one dominating as regards signal power) has a signal frequency corresponding to an eigenfrequency of a natural mode of oscillation of the tube arrangement, in which each of the four measuring tubes executes bending oscillations, thus, for example, the mentioned bending oscillation mode of first type. Moreover, it can additionally be advantageous—for instance, for the purpose of matching the fed-in excitation power to that amount instantaneously actually necessary for a sufficient oscillation amplitude—to make the at least one driver signal variable relative to a maximal voltage level (voltage amplitude) and/or a maximal electrical current level (electrical current amplitude)—for instance, in such a manner that, for example, exciter current flows through the cylindrical coil of the at least one oscillation exciter driven by a variable exciter voltage provided by means of said driver signal.

An aim of the active excitation of the measuring tubes to oscillations is, in particular—especially also for the case, in which the measuring system ultimately formed by means of the measuring transducer should be used for measuring mass flow—to induce by means of the measuring tubes vibrating in the wanted mode sufficiently strong Coriolis forces in the flowing medium such that, as a result, additional deformations, and consequently deformations corresponding to an oscillatory mode of the tube arrangement of a higher order—the so-called Coriolis mode—of each of the measuring tubes can be effected with oscillation amplitudes sufficient for the measuring. For example, the measuring tubes $18_1$, $18_2$, $18_3$, $18_4$ can, by means of the electro-mechanical exciter mechanism held thereon, be excited to bending oscillations—especially simultaneous bending oscillations—especially at an instantaneous mechanical eigenfrequency of the tube arrangement formed by means of the four measuring tubes $18_1$, $18_2$, $18_3$, $18_4$, in the case of which the measuring tubes are—at least predominantly—laterally deflected, and, as directly evident to those skilled in the art from the combination of FIGS. 3a, 3b, 6a, 6b, 7a, 7b, caused to oscillate pairwise essentially opposite-equally relative to one another. This occurs especially in such a manner that, during operation, each of the measuring tubes $18_1$, $18_2$, $18_3$, $18_4$ in each case at the same time executes vibrations at least at times and/or at least partially formed as bending oscillations about an imaginary oscillatory axis connecting the first and the particular associated second measuring tube end of the respective measuring tube, this oscillatory axis being parallel to each of the mentioned connecting axes $Z_1$, $Z_2$, $Z_3$, $Z_4$, wherein the four oscillatory axes are, in the example of an embodiment shown here, parallel to one another, as well as also to the imaginary longitudinal axis L of the entire measuring transducer, this longitudinal axis L imaginarily connecting the two flow dividers and passing through a center of mass of the measuring transducer. In other words, the measuring tubes can, as is quite usual in the case of measuring transducers of vibration type having one or more bent measuring tubes, be in each case caused to oscillate at least sectionally in the manner of a cantilever clamped at its ends—and consequently thus with cantilever-type, bending oscillations—in each case about an imaginary oscillation axis parallel to at least two of the imaginary connecting axes $Z_1$, $Z_2$, $Z_3$, $Z_4$. In an embodiment of the invention, the exciter mechanism is additionally embodied in such a manner that, therewith, the first measuring tube $18_1$ and the second measuring tube $18_2$ are excitable to execute bending oscillations, which are opposite-equal relative to the second imaginary longitudinal section plane YZ, and especially also symmetric relative to the second imaginary longitudinal section plane YZ, and the third measuring tube $18_3$ and the fourth measuring tube $18_4$ are excitable to execute bending oscillations, which are opposite-equal relative to the second imaginary longitudinal section plane YZ, and especially also symmetric relative to the second imaginary longitudinal section plane YZ. As an alternative thereto or in supplementation thereof, the exciter mechanism is, according to an additional embodiment of the invention, additionally embodied in such a manner that therewith, the first measuring tube $18_1$ and the third measuring tube $18_3$ are excitable to execute bending oscillations which are opposite-equal relative to the second imaginary longitudinal section plane YZ, and, for example, also symmetric relative to the second imaginary longitudinal section plane YZ, and the second measuring tube $18_2$ and the fourth measuring tube $18_4$ are excitable to execute bending oscillations which are opposite-equal relative to the second imaginary longitudinal section plane YZ, and, for example, symmetric relative to the second imaginary longitudinal section plane YZ.

In an additional embodiment of the invention, the measuring tubes $18_1$, $18_2$, $18_3$, $18_4$ are additionally excited during operation by means of the exciter mechanism 5 at least partially, and especially predominantly, to wanted mode bending oscillations, which have a bending oscillation frequency, which, for instance, equals an instantaneous mechanical resonance frequency of the tube arrangement comprising the four measuring tubes $18_1$, $18_2$, $18_3$, $18_4$, and consequently corresponds to an instantaneous eigenfrequency of a bending oscillation mode of the tube arrangement, or which lies at least in the vicinity of such an eigenfrequency or resonance frequency. The instantaneous mechanical resonance frequencies of bending oscillations are, in such case, as is known, dependent to an especial degree on the size, shape and material of the measuring tubes $18_1$, $18_2$, $18_3$, $18_4$, as well as also on an instantaneous density of the medium flowing through the measuring tubes, and can thus vary during operation of the measuring transducer within a wanted frequency band of a width of quite some number of kilohertz. Thus, in the case of exciting the measuring tubes at an instantaneous resonance frequency, based on the instantaneously excited oscillation frequency, an average density of the medium flowing through the four measuring tubes can, on the one hand, instantaneously be easily ascertained. On the other hand, the electrical power instantaneously required for maintaining the oscillations excited in the wanted mode can thus also be minimized. The four measuring tubes $18_1$, $18_2$, $18_3$, $18_4$, driven by the exciter mechanism, are especially additionally caused to oscillate at least at times with essentially equal oscillation frequency, especially in each case with one and the same natural mechanical eigenfrequency, and thus with a shared, natural mechanical eigenfrequency. In advantageous manner, the oscillatory behavior of the tube arrangement formed by means of the four measuring tubes $18_1$, $18_2$, $18_3$, $18_4$, as well as also the driver signals controlling the exciter mechanism, are additionally matched to one another in such a manner that at least the oscillations of the four measuring tubes $18_1$, $18_2$, $18_3$, $18_4$ excited in the wanted mode are developed in such a manner that the first and second measuring tubes $18_1$, $18_2$ oscillate—for instance, in the manner of two tuning fork tines—essentially opposite-equally to one another, and consequently at least in the imaginary cross sectional plane XY with an opposing phase shift of, for instance, 180°, and the third and the fourth measuring tube $18_3$, $18_4$ likewise also oscillate essentially opposite-equally to one another.

Figure 7B:
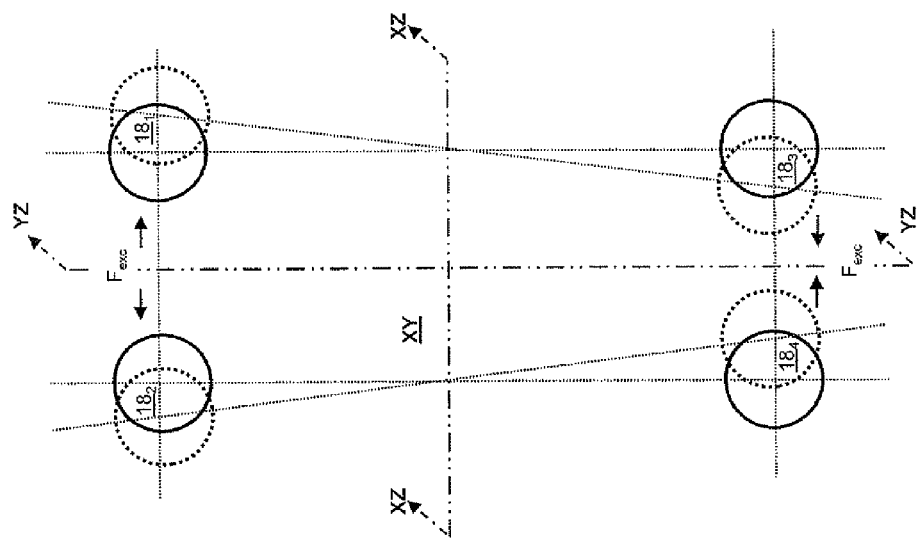
FIGS. 7a and 7b schematically, oscillation modes (V-mode; X-mode) of a tube arrangement of FIG. 4a, 4b, in each case in projection onto an imaginary cross sectional plane of said tube arrangement.
Figure 7A:
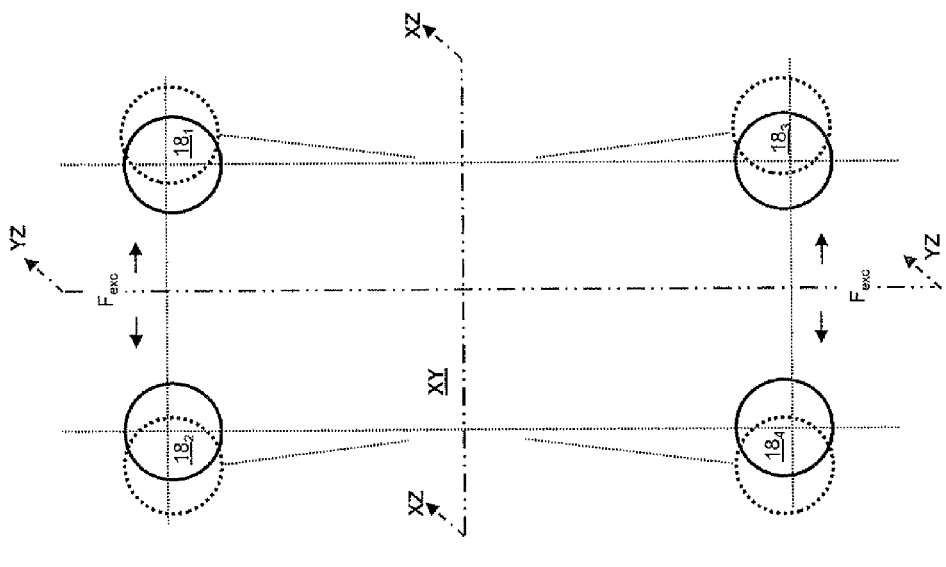
Figure 8B:
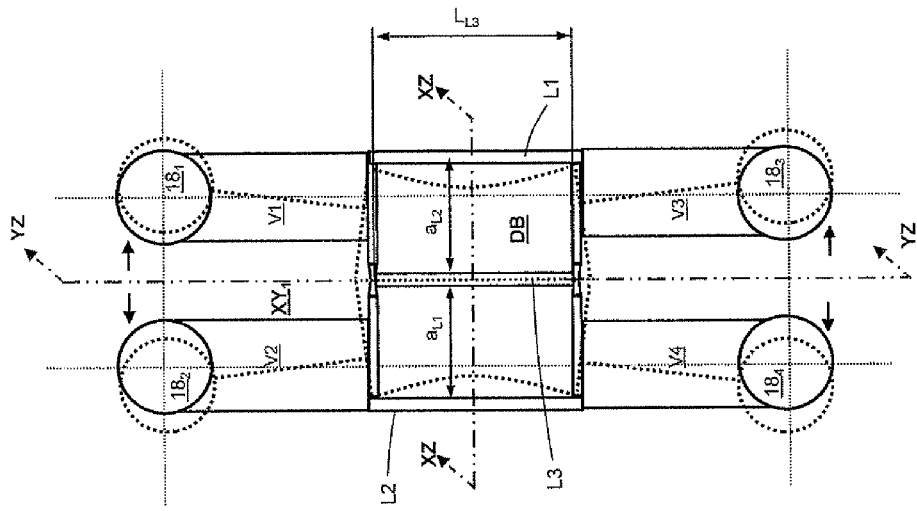
FIGS. 8a and 8b schematically, oscillation modes (V-mode; X-mode) of a coupling element according to FIG. 4a, 4b, serving for adjusting eigenfrequencies of the tube arrangement, in each case in projection on an imaginary cross sectional plane of said tube arrangement.
Figure 8A:
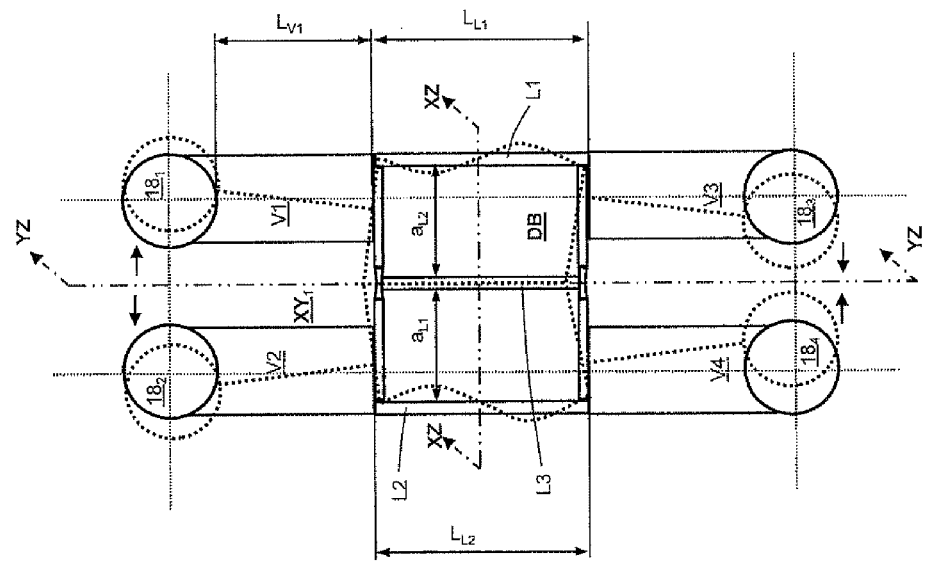
Figure 9:
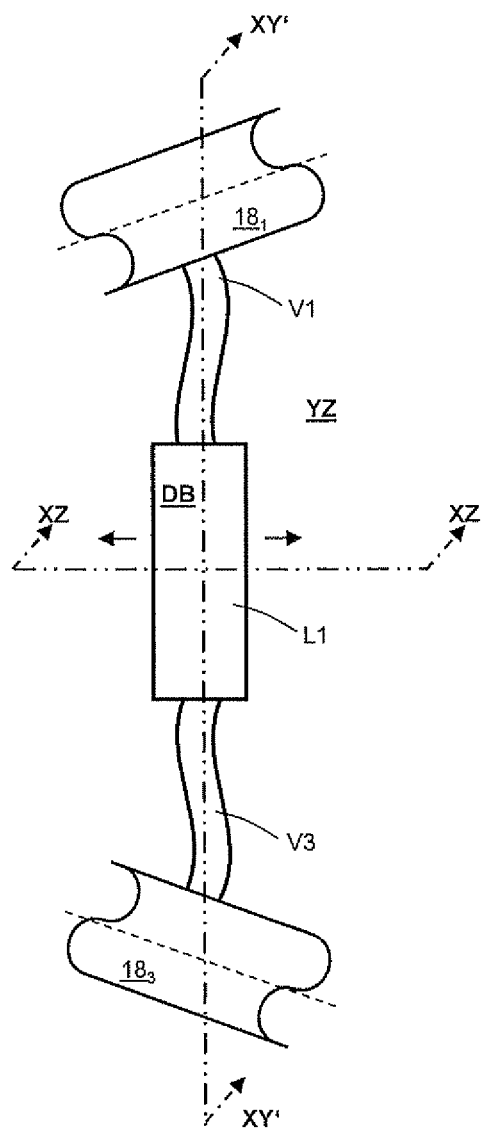
FIG. 9 schematically, the coupling element according to FIG. 4a, 4b, or 8a, 8b, serving for adjusting eigenfrequencies of the tube arrangement, in projection on an imaginary longitudinal section plane of said tube arrangement.

Investigations on measuring systems with a measuring transducer of the type being discussed have additionally surprisingly shown that suited as the wanted mode, especially also for ascertaining the mass flow rate as well as the density of the medium conveyed in the measuring transducer, is especially that natural oscillatory mode inherent to the tube arrangement—in the following referred to as the bending oscillation fundamental mode of first type, or also as the V-mode oscillation—in which, as is also shown schematically in FIG. 7a, the first measuring tube and the second measuring tube execute bending oscillations which are opposite-equal relative to the second imaginary longitudinal section plane YZ, in each case about a static rest position associated with the respective measuring tube, and in which the third measuring tube and the fourth measuring tube execute bending oscillations which are likewise opposite-equal relative to the second imaginary longitudinal section plane, in each case about a static rest position associated with the respective measuring tube, and, indeed, in such a manner that—relative to the second imaginary longitudinal section plane YZ—said bending oscillations of the first measuring tube are also opposite-equal to said bending oscillations of the third measuring tube, and that—relative to the second imaginary longitudinal section plane YZ—said bending oscillations of the second measuring tube are also opposite-equal to said bending oscillations of the fourth measuring tube. The opposite-equal bending oscillations of the first and second measuring tubes or of third and the fourth measuring tubes in the V-mode—here likewise formed as cantilever, bending oscillations in each case about an imaginary oscillation axis parallel to at least two of the imaginary connecting axes and causing the tube arrangement to appear in projection on the cross sectional plane XY at times V-shaped (compare FIG. 7a))—are, in the case of a symmetrically constructed tube arrangement and a uniformly flowed-through tube arrangement, additionally symmetrically formed relative to the second imaginary longitudinal section plane YZ. The special suitability of the V-mode as the wanted mode for measuring transducers with four bent measuring tubes could, in such case, especially also be attributed especially to the resulting stress distribution in the measuring transducer (especially also in the region of the two flow dividers), which, in such case, is, as a whole, very favorable for the oscillatory behavior of the measuring transducer, considered both spatially as well as also in time, and can also be attributed to the equally favorable, and consequently very small, oscillation related deformations of the measuring transducer in general, as well as also of the flow dividers in particular.

Besides the aforementioned V-mode, the tube arrangement additionally also has a natural bending oscillation mode of second type—referred to in the following as the X-mode—in which, as shown schematically in FIG. 7b, the first measuring tube and the second measuring tube execute bending oscillations which are opposite-equal relative to the second imaginary longitudinal section plane YZ about their respective associated static rest positions, and in which the third measuring tube and the fourth measuring tube execute bending oscillations which are opposite-equal relative to the second imaginary longitudinal section plane YZ about their respective associated static rest positions, this contrasting with the bending oscillations in the V-mode, but in the manner that, relative to the second imaginary longitudinal section plane YZ, said bending oscillations of the first measuring tube are also opposite-equal to said bending oscillations of the fourth measuring tube, and that, relative to the second imaginary longitudinal section plane YZ, said bending oscillations of the second measuring tube are also opposite-equal to said bending oscillations of the third measuring tube. In the case of symmetrically constructed and uniformly flowed through tube arrangements, moreover, also the bending oscillations in the X-mode (here, in turn, formed as cantilever, bending oscillations in each case about an imaginary oscillation axis parallel to at least two of the imaginary connecting axes and causing the tube arrangement to appear in projection on the cross sectional plane XY at times X-shaped (compare FIG. 7b)) are likewise symmetric relative to the second imaginary longitudinal section plane YZ. In order to assure a separate, and especially also defined, exciting of the V-mode or of the X-mode over as broad as possible an operating range of the measuring transducer (characterized during operation by, among other things, fluctuating densities, mass flow rates, temperature distributions in the measuring transducer, etc.), according to an additional embodiment of the invention, the tube arrangement formed by means of the four measuring tubes, and consequently the measuring transducer formed therewith, is dimensioned in such a manner that an eigenfrequency $f_{18V,Ref}$ of the bending oscillation mode of first type (V-mode), measurable, for example, in the case of a tube arrangement filled completely with air as a reference medium, is different from an eigenfrequency $f_{18X,Ref}$ of the bending oscillation mode of second type (X-mode) measurable especially in the case of a tube arrangement filled completely with air, or measurable at the same time as the eigenfrequency $f_{18V,Ref}$ of the bending oscillation mode of first type (V-mode), for example, such that the eigenfrequencies $f_{18V,Ref}$, $f_{18X,Ref}$ of the two mentioned bending oscillation modes (V-mode, X-mode) under the aforementioned reference conditions deviate from one another by 10 Hz or more. Especially also for the case of large nominal diameters of more than 150 mm, the tube arrangement is embodied in such a manner that said eigenfrequency $f_{18V,Ref}$ of the bending oscillation mode of first type is more than 10 Hz greater than said eigenfrequency $f_{18X,Ref}$ of the bending oscillation mode of second type. The exciter mechanism is, according to an additional embodiment of the invention, consequently embodied in such a manner that, therewith, the first measuring tube $18_1$ and the second measuring tube $18_2$ are excitable during operation to opposite-equal bending oscillations, and the third measuring tube $18_3$ and the fourth measuring tube $18_4$ are excitable during operation to opposite-equal bending oscillations, especially also bending oscillations corresponding to the bending oscillation mode of first type (V-mode) at its instantaneous eigenfrequency $f_{18V}$, and bending oscillations corresponding to the bending oscillation mode of second type (X-mode) at its instantaneous eigenfrequency $f_{18V}$, the latter bending oscillations, in given cases, also occurring simultaneously with the bending oscillations corresponding to the bending oscillation mode of first type (V-mode).

In an additional embodiment of the invention, the exciter mechanism 5 is formed by means of a first oscillation exciter $5_1$ acting—especially differentially—on the first measuring tube $18_1$, and by means of the second measuring tube $18_2$, especially also for the purpose of exciting opposite-equal bending oscillations of the first and second measuring tube and/or of third and the fourth measuring tube. Additionally, it is provided that serving as first oscillation exciter $5_1$ is an oscillation exciter of electrodynamic type, acting, especially differentially, on at least two of the measuring tubes $18_1$, $18_2$, $18_3$, $18_4$. Accordingly, the first oscillation exciter $5_1$ is formed additionally by means of a permanent magnet held on the first measuring tube, and by means of a cylindrical coil held on the second measuring tube and permeated by the magnetic field of the permanent magnet, especially in the manner of a coil plunging arrangement, in the case of which the cylindrical coil is arranged coaxially with the permanent magnet, and the permanent magnet is embodied as an armature moving within the coil.

For the purpose of increasing the efficiency of the exciter mechanism and for the purpose of increasing the exciter forces generated therewith while simultaneously achieving a construction which is as symmetric as possible, in a further development of the invention, the exciter mechanism additionally comprises a second oscillation exciter $5_2$ acting—especially electrodynamically and/or differentially—on the third measuring tube $18_3$ and the fourth measuring tube $18_4$. The second oscillation exciter $5_2$ is advantageously embodied with equal construction to the first oscillation exciter $5_1$, at least insofar as it works analogously to the latter's principle of action; thus, for example, it likewise is of electrodynamic type. In an additional embodiment, the second oscillation exciter $5_2$ is consequently formed by means of a permanent magnet held on the third measuring tube, and a cylindrical coil held on fourth measuring tube and permeated by the magnetic field of the permanent magnet. The two oscillation exciters $5_1$, $5_2$ of the exciter mechanism 5 can, in advantageous manner, be electrically interconnected in series, especially in such a manner that a common driver signal consequently excites simultaneous oscillations of the measuring tubes $18_1$, $18_3$, $18_2$, $18_4$; for instance, bending oscillations in the V-mode and/or in the X-mode. Particularly for the earlier mentioned case, in which both bending oscillations in the V-mode as well as also bending oscillations in the X-mode should be actively excited by means of the two oscillation exciters $5_1$, $5_2$, it can be of advantage to dimension the oscillation exciters $5_1$, $5_2$ in such a manner and to so place them on the tube arrangement in such a manner that, as a result, a transmission factor of the first oscillation exciter $5_1$, defined by a ratio of electrical excitation power fed thereinto to an exciter force effecting oscillations of the measuring tubes produced therewith, is different, at least within a frequency band including the V-mode and the X-mode, from a transmission factor of the second oscillation exciter $5_2$, defined by a ratio of electrical excitation power fed thereinto to an exciter force effecting oscillations of the measuring tubes produced therewith, for instance, in such a manner that said transmission factors deviate from one another by 10% or more. This enables, for example, also a separate exciting of V- and X-modes, especially also in the case of serial switching of the two oscillation exciter $5_1$, $5_2$ and/or supplying the two oscillation exciters $5_1$, $5_2$ with a single, shared driver signal, and can be achieved in the case of electrodynamic oscillation exciters $5_1$, $5_2$ in a very simple manner, e.g. by application of cylindrical coils with different impedances, or different numbers of windings and/or by differently dimensioned permanent magnets, or permanent magnets of different magnetic materials. It should here additionally be mentioned that, although the oscillation exciter or the oscillation exciters of the exciter mechanism shown here in the example of an embodiment in each case act, for instance, centrally on the respective measuring tubes, as an alternative to this or in supplementation thereof, oscillation exciters acting instead on the inlet and on the outlet sides of the particular measuring tube can also be used, for instance, in the manner of the exciter mechanisms proposed in U.S. Pat. No. 4,823,614, U.S. Pat. No. 4,831,885, or the US-A 2003/0070495.

As evident from FIGS. 2, 4a, 4b, 5a and 5b, and as is usual in the case of measuring transducers of the type being discussed, additionally provided in the measuring transducer 11 is a sensor arrangement 19, for example, an electrodynamic sensor arrangement, which reacts to vibrations of the measuring tubes $18_1$, $18_2$, $18_3$, or $18_4$, especially inlet and outlet-side vibrations, and especially bending oscillations excited by means of the exciter mechanism 5, this sensor arrangement serving for producing oscillation signals representing vibrations, especially bending oscillations, of the measuring tubes, and influenced—for example as regards a frequency, a signal amplitude and/or a phase position relative to one another and/or relative to the driver signal—by the measured variable to be registered, such as, for instance, the mass flow rate and/or the density and a viscosity of the medium, respectively.

In an additional embodiment of the invention, the sensor arrangement is formed by means of an inlet-side, first oscillation sensor $19_1$—especially an electrodynamic, first oscillation sensor and/or a first oscillation sensor differentially registering at least oscillations of the first measuring tube $18_1$ relative to the second measuring tube $18_2$—as well as an outlet-side, second oscillation sensor $19_2$—especially an electrodynamic, second oscillation sensor and/or a second oscillation sensor differentially registering at least oscillations of the first measuring tube $18_1$ relative to the second measuring tube $18_2$—wherein these two oscillation sensors respectively deliver a first and a second oscillation signal reacting to movements of the measuring tubes $18_1$, $18_2$, $18_3$, $18_4$, especially their lateral deflections and/or deformations. This especially occurs in such a manner that at least two of the oscillation signals delivered by the sensor arrangement 19 have a phase shift relative to one another, which corresponds to or depends on the instantaneous mass flow rate of the medium flowing through the measuring tubes, as well as, in each case, a signal frequency, which depends on an instantaneous density of the medium flowing in the measuring tubes. The two oscillation sensors $19_1$, $19_2$, which are, for example, equal to one another, can, for such purpose—as is quite usual in the case of measuring transducers of the type being discussed—be placed in the measuring transducer 11 essentially equidistantly from the first oscillation exciter $5_1$. Moreover, the oscillation sensors of the sensor arrangement 19 can, at least insofar as they are of equal construction to the at least one oscillation exciter of the exciter mechanism 5, work analogously to the latter's principle of action, for example, thus likewise be of electrodynamic type. In a further development of the invention, the sensor arrangement 19 is additionally formed also by means of an inlet-side, third oscillation sensor $19_3$—especially an electrodynamic oscillation sensor and/or an oscillation sensor differentially registering oscillations of the third measuring tube $18_3$ relative to the fourth measuring tube $18_4$—as well as an outlet-side, fourth oscillation sensor $19_4$—especially an electrodynamic, fourth oscillation sensor $19_4$ and/or an electrodynamic oscillation sensor differentially registering oscillations of the third measuring tube $18_3$ relative to the fourth measuring tube $18_4$. For additional improving of the signal quality, as well as also for simplifying the transmitter electronics 12 receiving the measurement signals, the first and third oscillation sensors $19_1$, $19_3$ can furthermore be electrically interconnected in series, for example, in such a manner that a combined oscillation signal represents combined inlet-side oscillations of the first and third measuring tubes $18_1$, $18_3$ relative to the second and the fourth measuring tubes $18_2$, $18_4$. Alternatively or in supplementation, the second and fourth oscillation sensors $19_2$, $19_4$ can also be electrically interconnected in series in such a manner that a combined oscillation signal of both oscillation sensors $19_2$, $19_4$ represents combined outlet-side oscillations of the first and third measuring tubes $18_1$, $18_3$ relative to the second and the fourth measuring tubes $18_2$, $18_4$.

For the aforementioned case, in which the oscillation sensors of the sensor arrangement 19, especially oscillation sensors constructed equally to one another, should differentially and electrodynamically register oscillations of the measuring tubes, the first oscillation sensor $19_1$ is formed by means of a permanent magnet held to the first measuring tube—here in the region of oscillations to be registered on the inlet side—and a cylindrical coil permeated by the magnetic field of the permanent magnet and held to the second measuring tube—here correspondingly likewise in the region of oscillations to be registered on the inlet side; and the second oscillation sensor $19_2$ is formed by means of a permanent magnet held—in the region of oscillations to be registered on the outlet side—to the first measuring tube and a cylindrical coil permeated by the magnetic field of the permanent magnet and held to the second measuring tube—here correspondingly likewise in the region of oscillations to be registered on the outlet side. Equally, additionally also the third oscillation sensor $19_3$ in given cases provided can correspondingly be formed by means of a permanent magnet held to the third measuring tube and a cylindrical coil permeated by the magnetic field of the permanent magnet and held to the fourth measuring tube, and fourth oscillation sensor $19_4$ in given cases provided can be formed by means of a permanent magnet held to the third measuring tube and a cylindrical coil permeated by the magnetic field of the permanent magnet and held to the fourth measuring tube.

It is additionally to be noted here that, although, in the case of the oscillation sensors of the sensor arrangement 19 illustrated in the example of an embodiment, the oscillation sensor is, in each case, of electrodynamic type, and thus in each case formed by means of a cylindrical magnet coil affixed to one of the measuring tubes and a permanent magnet plunging therein and correspondingly affixed to an oppositely lying measuring tube, other oscillation sensors known to those skilled in the art, such as, for example, optoelectronic sensors, can additionally also be used for forming the sensor arrangement. Furthermore, as is quite usual in the case of measuring transducers of the type being discussed, in addition to the oscillation sensors, other sensors, especially auxiliary sensors or sensors registering disturbance variables, can be provided in the measuring transducer, such as, for example, acceleration sensors for registering movements of the total measuring system caused by external forces and/or asymmetries in the tube arrangement, strain gages for registering expansions of one or more of the measuring tubes and/or the transducer housing, pressure sensors for registering a static pressure reigning in the transducer housing and/or temperature sensors for registering temperatures of one or more of the measuring tubes and/or the transducer housing; by means of which, for example, the ability of the measuring transducer to function and/or changes in the sensitivity of the measuring transducer to the measured variables primarily to be registered (especially the mass flow rate and/or the density) as a result of cross sensitivities or external disturbances, can be monitored and, in given cases, correspondingly compensated for. For assuring as high as possible a sensitivity of the measuring transducer to the mass flow, according to an additional embodiment of the invention, the measuring tubes and the oscillation sensors are arranged in the measuring transducer in such a manner that a measuring length, $L_{19}$, of the measuring transducer, corresponding to a separation between the first oscillation sensor $19_1$ and the second oscillation sensor $19_2$ measured along a deflection curve of the first measuring tube, amounts to more than 500 mm, especially more than 600 mm. Particularly for creating a measuring transducer which is as compact as possible, but nevertheless as sensitive as possible to the mass flow, according to an additional embodiment of the invention, the oscillation sensors $19_1$, $19_2$, matched to the installed length of the measuring transducer, are arranged in the measuring transducer in such a manner that a measuring-length to installed-length ratio $L_{19}/L_{11}$ of the measuring transducer, which is defined by a ratio of the measuring length of the measuring transducer to the installed length, amounts to more than 0.3, especially more than 0.4 and/or less than 0.7. Alternatively or in supplementation, according to an additional embodiment of the invention, the oscillation sensors, matched to the measuring tubes, are placed in the measuring transducer in such a manner that a caliber to measuring-length ratio $D_{18}/L_{19}$ of the measuring transducer, which is defined by a ratio of the caliber $D_{18}$ of the first measuring tube to the mentioned measuring length $L_{19}$ of the measuring transducer, amounts to more than 0.05, especially more than 0.09.

The sensor arrangement 19 is additionally, as is usual in the case of such measuring transducers, coupled in a suitable manner—for example, hardwired via connecting lines—with a measuring circuit correspondingly provided in the transmitter electronics; for example, a measuring circuit formed by means of at least one microprocessor and/or by means of at least one digital signal processor. The measuring circuit receives the oscillation signals of the sensor arrangement 19 and generates therefrom—in given cases also taking into consideration electrical excitation power fed by means of the at least one driver signal into the exciter mechanism, and consequently also converted therein—the previously mentioned measured values, which can represent, for example, a mass flow rate, a totaled mass flow and/or a density and/or a viscosity of the medium to be measured, and which, in given cases, can be displayed on-site and/or also sent in the form of digital measured data to a data processing system superordinated to the measuring system, and correspondingly further processed there. The measuring circuit, and consequently the transmitter electronics formed therewith, are especially additionally provided and designed to generate, based on electrical excitation power converted in the exciter mechanism, and, for example, in periodically recurring manner and/or on demand, a viscosity measured value representing the viscosity of the flowing medium, and/or, based on oscillation signals delivered by the measuring transducer, to generate, for example, in periodically recurring manner and/or on demand, a mass flow measured value representing the mass flow rate of the flowing medium, and/or, for example, in a periodically recurring manner and/or on demand, a density measured value representing the density of the flowing medium.

The above mentioned application of differentially acting oscillation exciters or oscillation sensors introduces, among other things, also the advantage, that for operating the measuring transducer of the invention, also such established measuring and operating circuits can be used as have already found broad application, for example, in conventional Coriolis mass flow and/or density measuring devices.

The transmitter electronics 12, including the measuring and operating circuits implemented therein, can furthermore be accommodated, for example, in a separate electronics housing $7_2$, which is arranged removed from the measuring transducer, or, such as shown in FIG. 1, is affixed directly on the measuring transducer 1, for example, externally on the transducer housing $7_1$, in order to form a single compact device. In the case of the example of an embodiment illustrated here, a neck-like transition piece serving for holding the electronics housing $7_2$ is consequently additionally placed on the transducer housing $7_1$. Within the transition piece can additionally be arranged a feedthrough for the electrical connecting lines between measuring transducer 11, especially the oscillation exciters and sensors placed therein, and the mentioned transmitter electronics 12. The feedthrough is manufactured so as to be hermetically sealed and/or pressure resistant, for example, by means of glass, and/or plastic potting compound.

As already mentioned several times, the measuring system, and thus also the measuring transducer 11, is provided especially also for measurements of high mass flows of more than 1000 t/h in a pipeline of large caliber of more than 250 mm. Taking this into consideration, according to an additional embodiment of the invention, the nominal diameter of the measuring transducer 11, which, as already mentioned, corresponds to a caliber of the pipeline, in whose course the measuring transducer 11 is to be used, is selected in such a manner that it amounts to more than 50 mm, especially more than 100 mm. Additionally, according to a further embodiment of the measuring transducer, it is provided that each of the measuring tubes $18_1$, $18_2$, $18_3$, $18_4$ in each case has a caliber $D_{18}$ corresponding to a particular tube inner diameter, which amounts to more than 40 mm. The measuring tubes $18_1$, $18_2$, $18_3$, $18_4$ are especially additionally embodied in such a manner that each has a caliber $D_{18}$ of more than 60 mm. Alternatively or in supplementation thereof, the measuring tubes $18_1$, $18_2$, $18_3$, $18_4$ are, according to another embodiment of the invention, additionally dimensioned in such a manner that they each have a measuring tube length $L_{18}$ of at least 1000 mm. In the example of an embodiment illustrated here with equal-length measuring tubes $18_1$, $18_2$, $18_3$, $18_4$, the measuring tube length $L_{18}$ in each case corresponds to a length of a section of the deflection curve of the first measuring tube extending between the first flow opening of the first flow divider and the first flow opening of the second flow divider. The measuring tubes $18_1$, $18_2$, $18_3$, $18_4$ are, in such case, especially designed in such a manner that their measuring tube length $L_{18}$ is in each case greater than 1200 mm. At least for the mentioned case in which the measuring tubes $18_1$, $18_2$, $18_3$, $18_4$ are composed of steel, in the case of the usually used wall thicknesses of over 1 mm, there accordingly in each case results an empty mass $M_{18}$, of at least 20 kg, especially more than 30 kg. It is, however, desired that the empty mass of each of the measuring tubes $18_1$, $18_2$, $18_3$, $18_4$ be kept smaller than 50 kg.

In consideration of the fact that, as already mentioned, in the case of the measuring transducer of the invention, each of the measuring tubes $18_1$, $18_2$, $18_3$, $18_4$, weighs well over 20 kg, and, in such case, as is directly evident from the above dimensional specifications, can easily have a capacity of 10 l or more, the tube arrangement comprising the four measuring tubes $18_1$, $18_2$, $18_3$, $18_4$ can then, at least in the case of a medium with high density flowing through, reach a total mass of far over 80 kg. Especially in the case of the application of measuring tubes with comparatively large caliber $D_{18}$, large wall thickness and large measuring tube length $L_{18}$, the mass of the tube arrangement formed by the measuring tubes $18_1$, $18_2$, $18_3$, $18_4$ can easily also be greater than 100 kg, or, at least with medium flowing through, e.g. oil or water, be more than 120 kg. As a result of this, an empty mass $M_{11}$ of the measuring transducer amounts, in total, also to far more than 200 kg, and, in the case of nominal diameters $D_{11}$ of significantly greater than 250 mm, even more than 300 kg. As a result, the measuring transducer of the invention can have a mass ratio $M_{11}/M_{18}$ of an empty mass $M_{11}$ of the total measuring transducer to an empty mass $M_{18}$ of the first measuring tube of easily greater than 10, especially greater than 15. In order, in the case of the mentioned high empty mass $M_{11}$ of the measuring transducer, to employ the total material used therefor as optimally as possible, and thus to utilize the—most often also very expensive—material as a whole as efficiently as possible, according to an additional embodiment, the nominal diameter $D_{11}$ of the measuring transducer is dimensioned relative to its empty mass $M_{11}$ in such a manner that a mass to nominal-diameter ratio $M_{11}/D_{11}$ of the measuring transducer 11, as defined by a ratio of the empty mass $M_{11}$ of the measuring transducer 11 to the nominal diameter $D_{11}$ of the measuring transducer 11, is smaller than 2 kg/mm, and especially—to the greatest degree possible—smaller than 1 kg/mm. In order to assure a sufficiently high stability of the measuring transducer 11, the mass to nominal-diameter ratio $M_{11}/D_{11}$ of the measuring transducer 11 is, however, at least in the case of use of the above mentioned conventional materials, to be chosen so as to be to the greatest degree possible greater than 0.5 kg/mm. Additionally, according to an additional embodiment of the invention, for additional improvement of the efficiency of the installed material, the mentioned mass ratio $M_{11}/M_{18}$ is kept smaller than 25. For creation of a measuring transducer of sufficiently high oscillation quality factor which is nevertheless as compact as possible and has as little pressure drop as possible, according to an additional embodiment of the invention, the measuring tubes are dimensioned relative to the above mentioned installed length $L_{11}$ of the measuring transducer 11 in such a manner that a caliber to installed-length ratio $D_{11}/L_{11}$ of the measuring transducer, as defined by a ratio of the caliber $D_{18}$ at least of the first measuring tube to the installed length $L_{11}$ of the measuring transducer 11, amounts to more than 0.02, especially more than 0.05 and/or less than 0.09, especially less than 0.07. Alternatively or in supplementation, the measuring tubes $18_1$, $18_2$, $18_3$, $18_4$ are dimensioned relative to the above mentioned installed length $L_{11}$ of the measuring transducer in such a manner that a measuring-tube-length to installed-length ratio $L_{18}/L_{11}$ of the measuring transducer, as defined by a ratio of the above-referenced measuring tube length $L_{11}$ at least of the first measuring tube to the installed length $L_{11}$ of the measuring transducer, amounts to more than 0.7, especially more than 0.8 and/or less than 1.2.

For the purpose of, on the one hand, improving the mechanical coupling of the four measuring tubes, along with an equalizing of the oscillations in the wanted mode simultaneously executed by the four measuring tubes also in the case of inequalities possibly caused by component tolerances, as well as, on the other hand, also for the purpose of an as simple as possible as well as effective implementing of a sufficient separating of the mentioned V-mode from the X-mode as regards their eigenfrequencies $f_{18V}$, $f_{18X}$—thus, for example, in the mentioned order of magnitude of 10 Hz or more—the tube arrangement of the invention and consequently the measuring transducer formed therewith additionally comprises at least one first coupling element $24_1$ of first type for the adjusting the eigenfrequencies of natural oscillation modes the tube arrangement. The operation of said coupling element $24_1$ of first type can be explained in a simplified manner by stating that, in addition to bending stiffnesses, $c_{18}$, which are in each case inherent to the measuring tubes, and the eigenfrequencies of the oscillation modes the tube arrangement, especially also the of the V- and X-mode, other decisively co-determining bending or spring stiffnesses, $c_{24V}$, $c_{24X}$, which are namely inherent to the coupling element, have an effect within the tube arrangement. In such case, in an interesting aspect, said coupling element includes a decisively co-determining bending or spring stiffness, $c_{24V}$, predominantly effective for the V-mode, and consequently for its eigenfrequency, $f_{18V}$, wherein this bending or spring stiffness, $c_{24V}$, is different from a decisively co-determining bending or spring stiffness, $c_{24X}$, predominantly effective for the X-mode, and consequently its eigenfrequency, flax, so that the coupling element thus adds mode-specific bending or spring stiffnesses, $c_{24V}$, $C_{24X}$, to the bending stiffnesses, $c_{18}$, of the measuring tubes, which are rather non-specific for the V- and the X-mode, and indeed almost the same, whereby, as a result, for the V- and the X-mode, equally specific bending or spring stiffnesses, $4c_{18}+c_{24V}$, $4c_{18}+c_{24X}$, are inherent to the tube arrangement as a whole.

The coupling element $24_1$ of first type is as is also schematically presented in FIGS. 4a through 9 affixed to each of the four measuring tubes spaced from both the first flow divider as well as also from the second flow divider, and, in the case of the measuring transducer of the invention, especially serves to set eigenfrequencies of such natural oscillation modes of the tube arrangement, in which each of the four measuring tubes in each case simultaneously executes or can execute bending oscillations about a particular static resting position. The coupling element $24_1$ of first type is, according to an additional embodiment of the invention, additionally embodied and placed on the measuring tubes in such a manner that it—as is also evident from the combination of FIGS. 4a, 4b, and 5a, 5b—is essentially symmetrical relative to the mentioned first imaginary longitudinal section plane XZ of the measuring transducer, or relative to the mentioned second imaginary longitudinal section plane YZ of the measuring transducer, and consequently the first imaginary longitudinal section plane XZ and/or the second imaginary longitudinal section plane YZ is thus in each case also a symmetry plane of the coupling element $24_1$ of first type.

The first coupling element of first type includes a deformation body DB—in the example of an embodiment shown here, an essentially box-shaped deformation body DB formed by means of a frame construction having a plurality of profile struts or plates—as well as four connecting struts—which are here in each case formed by means of a bent rod, bar or plate element, above all at least pairwise, or also all, essentially equally constructed—of which a first connecting strut V1 is connected with the deformation body and with the first measuring tube $18_1$, a second connecting strut V2 is connected with the deformation body and with the second measuring tube, a third connecting strut V3 is connected with the deformation body and with the first measuring tube, and a fourth connecting strut V4 is connected with the deformation body and with fourth measuring tube.

That region of each connecting strut V1, V2, V3, respectively V4, at which each is connected with the deformation body DB, forms, thus, in each case, a first strut end of the respective connecting strut, while the other region of each connecting strut, which, in each case, is connected with a respective one of the measuring tubes forms, in each case, a second strut end of the respective connecting strut. In this regard, each of the four connecting struts V1, V2, V3, V4 thus in each case has, defined by a minimum distance between its respective first strut end and its respective second strut end, a strut length, which ultimately corresponds also to an effective length of a segment of the respective connecting strut acting as lever arm transmitting forces and/or moments from the deformation body DB to the respectively connected measuring tube (and vice versa). In such case, according to an additional embodiment of the invention, it is additionally provided to construct the connecting struts in such a manner that both the second connecting strut as well as also the third, as well as the fourth connecting strut each have a strut length, which, in each case, is equal to the strut length, $L_{V1}$, of the first connecting strut. Although in the example of an embodiment of the connecting struts shown here, in each case, an end face associated with the first strut end is affixed flushly to and against the deformation body and with a thereto, in each case, distal end face associated with the respective second strut end is affixed flushly to and against the respective measuring tube, it is, of course, also an option that the connecting struts extend beyond their first strut ends and/or their second strut ends, for instance, in order, in each case, to provide a bore for accommodating the respective measuring tube and/or in order to be able to affix thereto possibly required terminal balancing masses, namely balancing masses effecting balancing moments.

The four connecting struts V1, V2, V3, respectively V4, especially equally-constructed connecting struts V1, V2, V3, respectively V4, can, for example, in each case, be of the same or a similar material as the deformation body and/or of the same or a similar material as the measuring tubes, consequently of a metal, for example, stainless steel, duplex steel, super duplex steel, free-machining steel, titanium, zirconium or tantalum, or therewith formed alloys or also super alloys, such as, for instance, Hastelloy, Inconel etc., and be connected with the respective measuring tube by material bonding, for example, by hard solder, or braze, or by welding. Alternatively or supplementally to a material bonded connection, the connecting struts V1, V2, V3, respectively V4 can, however, also be connected with the respective measuring tubes, for example, by means of shrink and/or press, force-, or frictional fits with the respective measuring tube, for instance, analogously to the method proposed in the initially mentioned U.S. Pat. No. 6,047,457. In very simple and cost effective manner, the connecting struts V1, V2, V3, respectively V4 can e.g. be produced from a simple, in given cases, also, at least sectionally, bent, flat bar. Furthermore, the four connecting struts V1, V2, V3, respectively V4 can likewise be connected with the deformation body DB by material bonding, for example, thus by hard soldering, or brazing, or by welding, or, however, also by means of a screwed connection.

Each of the four connecting struts V1, V2, V3, respectively V4 has, among other things, a maximum bending stiffness, $E_{V1} \cdot J_{V1,max}$, $E_{V2} \cdot J_{V2,max}$, $E_{V3} \cdot J_{V3,max}$, respectively $E_{V4} \cdot J_{V4,max}$, about an imaginary principal bending axis, in each case, immanent to said longitudinal strut, respectively each of the four connecting struts V1, V2, V3, respectively V4 contributes (according to rules known to those skilled in the art for parallel, respectively series, connected, spring elements) partially to the total spring stiffness of the coupling element 241 of first type. The maximum bending stiffness of the particular connecting strut V1, V2, V3, respectively V4, is, in each case, determined by a modulus of elasticity, $E_{V1}$, $E_{V2}$, $E_{V3}$, respectively $E_{V4}$ dependent on the material of said connecting strut, as well as also on a respective minimum areal moment of inertia, $J_{V1,max}$ $J_{V2,max}$, $J_{V3,max}$, respectively $J_{V4,max}$, wherein, according to an additional embodiment of the invention, both the maximum areal moment of inertia of the second connecting strut as well as also the maximum areal moment of inertia of third connecting strut and the maximum areal moment of inertia of fourth connecting strut are in each case equal to the maximal areal moment of inertia, $J_{V1,max}$, of the first connecting strut. Additionally, according to another embodiment of the invention, each of the four connecting struts V1, V2, V3, V4 is in each case arranged in such a manner that the imaginary principal bending axis of their respective maximal areal moments of inertia in each case extends parallel both to the first longitudinal section plane XZ as well as also to the second imaginary longitudinal section plane YZ, and consequently, a contribution of the maximal bending stiffnesses of the connecting struts, at least to the bending or spring stiffnesses, $4c_{18}+c_{24V}$, $4c_{18}+c_{24X}$, of the coupling element $24_1$ of first type in each case effective for the eigenfrequencies of the V-mode and of the X-mode, is thus as large as possible.

Besides the maximal bending stiffness, each of the four connecting struts naturally in each case also has a minimum bending stiffness, $E_{V1} \cdot J_{V1,min}$, $E_{V2} \cdot J_{V2,min}$, $E_{V3} \cdot J_{V3,min}$, respectively $E_{V4} \cdot J_{V4,min}$, determined by the modulus of elasticity dependent on the respective material of said connecting strut, as well as also by a respective minimum areal moment of inertia, $J_{V1,min}$, $J_{V2,min}$, $J_{V3,min}$, respectively $J_{V4,min}$, about a imaginary principal bending axis in each case immanent to said connecting strut, wherein, according to an additional embodiment of the invention, each of the four connecting struts is in each case arranged in such a manner that the imaginary principal bending axis of their respective minimum areal moments of inertia extends parallel to the first longitudinal section plane XZ and is perpendicular to the second imaginary longitudinal section plane YZ, and consequently, a contribution of the minimum bending stiffnesses of the connecting struts, at least to the bending or spring stiffnesses in each case effective for the eigenfrequencies of the V-mode and of the X-mode, $4c_{18}+c_{24V}$, $4c_{18}+c_{24X}$, of the coupling element $24_1$ of first type is thus in each case negligibly small.

It is especially provided, as is also directly evident from the combination of FIGS. 4a, 4b, 4c, 8a, and 8b, that each of the (especially equally constructed) connecting struts of the coupling element $24_1$ of first type is at least sectionally straight and, for example, also predominantly straight, or, as is schematically presented in the FIGS. 4a, 4b, 4c, 8a, and 8b, completely straight—in projection on the imaginary cross sectional plane XY, and/or that each of the connecting struts of the coupling element of first type extends at least sectionally perpendicular to the first imaginary longitudinal section plane XZ, and consequently parallel to the second imaginary longitudinal section plane YZ. For the mentioned case, in which each of the connecting struts of the coupling element of first type has a straight subsection, which extends perpendicular to the first imaginary longitudinal section plane XZ, and consequently parallel to the second imaginary longitudinal section plane YZ, according to an additional embodiment of the invention, it is additionally provided that—as is also evident from the combination the FIGS. 4a, 4b, 4c, 8a, and 8b—the first and the third connecting struts are aligned flush with one another and the second and the fourth connecting strut aligned flush with one another, and/or that each of the connecting struts of the coupling element of first type imaginarily intersects the first imaginary longitudinal section plane XZ, especially with the mentioned respective straight subsection, and for example, at an angle of as close to exactly 90° as possible.

According to an additional embodiment of the invention, the deformation body of the coupling element—in the example of an embodiment shown here, formed virtually as a box or frame construction, or as an interconnection of struts—has at least two longitudinal struts—here equally constructed, plate-shaped longitudinal struts—of which a first longitudinal strut L1 extending from the first connecting strut to the third connecting strut, especially an at least sectionally straight first longitudinal strut L1, as well as a second longitudinal strut L2 extending from the second connecting strut to the fourth connecting strut, especially an at least sectionally straight second longitudinal strut L2, or one constructed equally to the first longitudinal strut. The first longitudinal strut L1 is in such case arranged spaced from the second imaginary longitudinal section plane YZ, exclusively on a side of said longitudinal section plane YZ occupied both by the first as well as also by the third measuring tube, while the second longitudinal strut L2 is arranged spaced from the second imaginary longitudinal section plane YZ, especially by the same distance as the first longitudinal strut, exclusively on a side of said longitudinal section plane YZ occupied both by the second as well as also by the fourth measuring tube.

Each of the two longitudinal struts in each case contributes to the total spring stiffness of the coupling element $24_1$ of first type, among other things, a minimum bending stiffness, $E_{L1} \cdot J_{L1,min}$ respectively $E_{L1} \cdot J_{L1,min}$, about an imaginary principal bending axis in each case immanent to said longitudinal strut, as well as a spring stiffness, $c_{L1}$, or $c_{L12}$, for a tension or compressive force in each case acting on said longitudinal strut, in each case, directed perpendicularly to the first imaginary longitudinal section plane XZ. The minimum bending stiffness of the particular longitudinal strut is, in each case, determined by an modulus of elasticity, $E_{L1}$, respectively $E_{L2}$, dependent on a material of said longitudinal strut, as well as also by a particular minimum areal moment of inertia, $J_{L1,min}$, respectively $J_{L2,min}$, while the spring stiffness is determined by the particular modulus of elasticity, $E_{L1}$, respectively $E_{L2}$, as well as also by the particular strut length, $l_{L1}$ or $l_{L2}$, as well as a particular surface area, $A_{L1}$, or $A_{L2}$, of a cross sectional area of the particular longitudinal strut in each case coincident with the first imaginary longitudinal section plane XZ, especially in such a manner that the spring stiffness, $c_{L1}$, of the first longitudinal strut is proportional to $E_{L1} \cdot A_{L1}/l_{L1}$, and the spring stiffness, $c_{L2}$, of the second longitudinal strut is proportional to $E_{L2} \cdot A_{L2}/l_{L2}$. According to an additional embodiment of the invention, the first longitudinal strut and the second longitudinal strut are additionally embodied and arranged in such a manner that the minimum bending stiffness, $E_{L1} \cdot J_{L1,min}$, of the first longitudinal strut is equal to the minimum bending stiffness, $E_{L2} \cdot J_{L2,min}$, of the second longitudinal strut, or that the spring stiffness, $c_{L1}$, of the first longitudinal strut is equal to the spring stiffness, $c_{L2}$, of the second longitudinal strut.

For the purpose of implementing as simple a construction of the coupling element as possible, each of the two longitudinal struts is additionally in each case advantageously embodied in such a manner that it is at least sectionally straight—and especially predominantly or completely straight—in projection on the mentioned imaginary cross sectional plane XY of the tube arrangement, and/or that it at least sectionally extends perpendicular to the mentioned first imaginary longitudinal section plane XZ, and consequently parallel to the mentioned second imaginary longitudinal section plane YZ. According to an additional embodiment of the invention, each of the two longitudinal struts L1 consequently in each case has a subsection, which is straight at least in projection on the imaginary cross sectional plane XY, wherein this subsection, in projection on said cross sectional plane XY, in the case of the first longitudinal strut, extends with a length, $l_{L1}$, extending between the first and third connecting struts, or in the case of the second longitudinal strut, with a length, $l_{L2}$, extending between the second and the fourth connecting struts, perpendicular to the first imaginary longitudinal section plane XZ at least in projection on the imaginary cross sectional plane XY, and extends—in the case of the first longitudinal strut at a distance of am, or in the case of the second longitudinal strut at a distance of $a_{L2}$—parallel to the second imaginary longitudinal section plane YZ. In such case, it has additionally been shown that, for the purpose of achieving a contribution of the longitudinal struts to the total spring stiffness of the coupling element $24_1$ of first type sufficient for the desired separating of the eigenfrequencies of the V- and X-modes of the tube arrangement, the distance, $a_{L1}$, of first longitudinal strut L1, respectively the distance, $a_{L2}$, of second longitudinal strut from the second imaginary longitudinal section plane YZ, should in each case amount to more than 50% of the outer diameter, $D_{18}+2 \cdot h_{18}$, of the first measuring tube, respectively of the four measuring tubes, but can, however, amount to less than 200% of said outer diameter, $D_{18}+2 \cdot h_{18}$.

As is evident from the combination of FIGS. 4a, 4b, 4c, 8a, 8b, in the example of an embodiment shown here, the two longitudinal struts L1, L2 are additionally embodied in such a manner that in each case, practically the entire longitudinal strut is straight at least in projection on the imaginary cross sectional plane XY, that the straight subsection of the first longitudinal strut thus extends from the first connecting strut up to the third connecting strut, and consequently its length, $l_{L1}$, corresponds to a minimum distance between the first strut end of the first connecting strut and the first strut end of third connecting strut, respectively the straight subsection of the second longitudinal strut extends from the second connecting strut up to the fourth connecting strut, and consequently its length, $l_{L2}$, corresponds to a minimum distance between the first strut end of the first second connecting strut and the first strut end of fourth connecting strut. Furthermore, in the example of an embodiment shown here, the straight subsection of the first longitudinal strut L1 is the same distance from the first imaginary longitudinal section plane XZ as the straight subsection of the second longitudinal strut L1 is, so that the distance, $a_{L1}$, with which the first longitudinal strut extends parallel to the second imaginary longitudinal section plane YZ is equal to the distance, $a_{L2}$, with which the second longitudinal strut extends parallel to said longitudinal section plane YZ, respectively the straight subsection of the first longitudinal strut is the same length as the straight subsection of the second longitudinal strut, so that the length, $l_{L1}$, with which the straight subsection of the first longitudinal strut extends between the first and third connecting strut, is equal to the length, $l_{L2}$, with which the straight subsection of the second longitudinal strut extends between the first and third connecting strut. Further investigations have additionally shown that a strut length for the connecting struts or for the longitudinal struts optimal for the desired separating of the V-mode from the X-mode with respect to their eigenfrequencies $f_{18V}$, $f_{18X}$, lies in a region, in which the specification:

$$\frac{1_{V1}}{1_{V1}+0.5 \cdot 1_{L1}} > 0.3,$$

as well as also the specification:

$$\frac{1_{V1}}{1_{V1}+0.5 \cdot 1_{L1}} < 0.7$$

are fulfilled. Moreover, for the coupling element $24_1$ of first type, especially good results can be achieved, both as regards the separating of the V-mode from the X-mode as well as also as regards an effective mechanical coupling of the four measuring tubes, when the coupling element $24_1$ is dimensioned with respect to the measuring tubes in such a manner that, as a result, the tube arrangement, as a whole, fulfills both the specification:

$$\frac{1_{V1}+0.5 \cdot 1_{L1}}{0.5 \cdot Q_{18} - (D_{18}+2 \cdot h_{18})} > 0.2$$

as well as also the specification or $$\frac{1_{V1}+0.5 \cdot 1_{L1}}{0.5 \cdot Q_{18} - (D_{18}+2 \cdot h_{18})} < 0.9,$$

or when the deformation body DB of the coupling element $24_1$ is dimensioned with respect to the measuring tubes in such a manner that the tube arrangement, as a result, fulfills both the specification:

$$\frac{0.5 \cdot 1_{L1}}{0.5 \cdot Q_{18} - (D_{18}+2 \cdot h_{18})} > 0.1$$

as well as also the specification:

$$\frac{0.5 \cdot 1_{L1}}{0.5 \cdot Q_{18} - (D_{18}+2 \cdot h_{18})} > 0.5.$$

In such case, the two longitudinal struts L1, L2, which are especially equally constructed, can, for example, be formed from the same material as or a similar material to the measuring tubes or the connecting struts—consequently from a metal, for example steel—and, for example, can be produced from a simple flat bar. Moreover, the two longitudinal struts are advantageously arranged and oriented in the measuring transducer in such a manner that they in each case imaginarily intersect—for example, with the mentioned straight subsection—the first imaginary longitudinal section plane XZ, for instance, in the manner shown in FIG. 4a, 4b, 4c, or 8a, 8b, namely in each case at an angle of 90°.

Particularly also for the mentioned case, in which the eigenfrequency, $f_{18V}$, of the V-mode should be set lower than the eigenfrequency, $f_{18X}$, of the X-mode, according to an additional embodiment of the invention, the first longitudinal strut and the second longitudinal strut are arranged in such a manner that both the mentioned imaginary principal bending axis of the minimum areal moment of inertia, $J_{L1,min}$, of the first longitudinal strut, as well as also the imaginary principal bending axis of the minimum areal moment of inertia, $J_{L2,min}$, of the second longitudinal strut in each case extend parallel both to the first longitudinal section plane XZ as well as also to the second imaginary longitudinal section plane YZ, and consequently a contribution of the minimum bending stiffnesses of the longitudinal struts at least to the bending or spring stiffnesses, $4c_{18}+c_{24V}$, $4c_{18}+c_{24X}$, of the coupling element $24_1$ of first type in each case effective for the eigenfrequencies of the V-mode and of the X-mode, is in each case as large as possible. Moreover, a high effectiveness of the coupling element 241 of first type in the sense of the desired separating of the eigenfrequencies, $f_{18V}$, $f_{18X}$, of the V and X-modes can be achieved when the maximum bending stiffness, $E_{V1} \cdot J_{V1,max}$, of the first connecting strut V1, and consequently also that of the second, third and the fourth connecting struts V2, V3, respectively V4, is in each case selected so as to be greater than the minimum bending stiffness, $E_{L1} \cdot J_{L1,min}$, of the first longitudinal strut, especially, when the first coupling element or the tube arrangement formed therewith, fulfills, as a result, the specification $$\frac{E_{V1} \cdot J_{V1,max}}{E_{L1} \cdot J_{L1,min}} > 5.$$

Alternatively or in supplementation, as is furthermore evident from the combination of FIGS. 4a, 4b, 4c, 8a, 8b, and 9, the two longitudinal struts are, in the shown example of an embodiment, additionally arranged in such a manner that an imaginary principal bending axis, which is in each case immanent to each of the longitudinal struts, and is associated with a maximal bending stiffness, $E_{L1} \cdot J_{L1,max}$, respectively $E_{L1} \cdot J_{L1,max}$, of the particular longitudinal strut, in each case extends parallel to the first imaginary longitudinal section plane XZ and perpendicular to the second imaginary longitudinal section plane YZ, and consequently, a contribution of the maximal bending stiffnesses of the longitudinal struts at least to the bending or spring stiffnesses, $4c_{18}+c_{24V}$, $4c_{18}+c_{24X}$, of the coupling element $24_1$ of first type in each case effective for the eigenfrequencies of the V-mode and of the X-mode is in each case negligibly small. The maximum bending stiffness, $E_{L1} \cdot J_{L1,max}$, respectively $E_{L1} \cdot J_{L1,max}$, is in each case determined by a maximal areal moment of inertia, $J_{L1,max}$, respectively $J_{L2,max}$, of the particular longitudinal strut about the respective associated imaginary principal bending axis, as well as, in turn, by the modulus of elasticity, $E_{L1}$, respectively $E_{L2}$. In advantageous manner, the maximal bending stiffnesses, $E_{L1} \cdot J_{L1,max}$ respectively $E_{L1} \cdot J_{L2,max}$, for each of the two longitudinal struts L1, L2, are, in each case, additionally dimensioned in such a manner so as to be equally large.

According to an additional embodiment of the invention, the deformation body DB further includes a first cross brace Q1, especially an at least sectionally straight first cross brace Q1 and/or one sectionally extending non-parallel to the second imaginary longitudinal section plane YZ, here, for example, extending perpendicular. As is directly evident from the combination of FIGS. 4a, 4b, 4c, 8a, and 8b, the first cross brace Q1, which is, for example, manufactured from the same material as connecting struts V1, V2, V3, V4 and/or longitudinal struts L1, L2, extends, in such case, from the first connecting strut to the second connecting strut, here, for example, in such a manner that it also reaches from the first longitudinal strut L1 to the second longitudinal strut L2. In such case, in the example of an embodiment shown here, both the first connecting strut and also the second connecting strut are in each case affixed with their respective first strut ends directly to the first cross brace Q1. Like the connecting struts or the longitudinal struts, the first cross brace can also be formed, for example, by means of a flat bar, which, for instance, is made of metal, and consequently composed of the same material as or a similar material to the connecting struts or the longitudinal struts. Like the two longitudinal struts L1, L2, the cross brace Q1 also produces a bending stiffness corresponding to the total spring stiffness of the coupling element $24_1$ of first type, and especially a minimum bending stiffness, $E_{Q1} \cdot J_{Q1,min}$, about an imaginary principal bending axis immanent to said cross brace Q1, wherein said minimum bending stiffness, $E_{Q1} \cdot J_{Q1,min}$, in turn, is determined by a modulus of elasticity, $E_{Q1}$, dependent on the material of said cross brace Q1, as well as also by a respective minimum areal moment of inertia, $J_{Q1,min}$, of said cross brace Q1. According to an additional embodiment of the invention, the cross brace Q1 is, in such case, additionally arranged in such a manner that the imaginary principal bending axis of its minimum areal moment of inertia, $J_{Q1,min}$, extends parallel both to the first longitudinal section plane XZ as well as also to the second imaginary longitudinal section plane YZ, for example in such a manner that (as is shown in FIG. 4a, 4b, 4c, 8a, or 8b) said imaginary principal bending axis lies in the second imaginary longitudinal section plane YZ. Moreover, cross brace Q1 is also additionally oriented in such a manner that an imaginary principal bending axis associated with a maximum bending stiffness, $E_{Q1} \cdot J_{Q1,max}$, of the cross brace Q1 extends perpendicular to the first imaginary longitudinal section plane XZ and extends parallel to the second imaginary longitudinal section plane YZ, wherein the maximum bending stiffness, $E_{Q1} \cdot J_{Q1,max}$, is determined by a maximal areal moment of inertia, $J_{Q1,max}$, about said imaginary principal bending axis, and, in turn, by the modulus of elasticity, $E_{Q1}$. As a result of this, a contribution of the maximal bending stiffness of the cross strut Q1 at least to the bending or spring stiffnesses, $4c_{18}+c_{24V}$, $4c_{18}+c_{24X}$, of the coupling element $24_1$ of first type in each case effective for the eigenfrequencies of the V-mode and of the X-mode, is thus, in turn, negligibly small.

In the case of the example of an embodiment shown here with a coupling element $24_1$ of first type having a rather box-shaped deformation body, said deformation body furthermore includes a second cross brace Q2, extending—here in a manner equivalent to the first cross brace Q1—from the first longitudinal strut to the second longitudinal strut, and, consequently, for example, at least sectionally straight and/or sectionally non-parallel to the second imaginary longitudinal section plane YZ and/or constructed equally to the first cross brace, wherein this second cross brace Q2, like the first cross brace Q1, can likewise be formed by means of a flat bar—for instance, one made from metal—and wherein this second cross brace Q2 namely likewise contributes to the total spring stiffness of the coupling element $24_1$, especially to a degree equivalent to the first cross brace Q1 of first type, a minimum bending stiffness, $E_{Q2} \cdot J_{Q1,min}$, about an imaginary principal bending axis immanent to said cross brace Q2, wherein said minimum bending stiffness, $E_{Q2} \cdot J_{Q2,min}$, is in turn determined by the modulus of elasticity, $E_{L1}$, as well as also of a respective minimum areal moment of inertia, $J_{Q2,min}$, of said cross brace Q1. According to an additional embodiment of the invention, the first and second cross braces are additionally in each case arranged in such a manner that, in each case, the imaginary principal bending axis of their respective minimum areal moments of inertia, $J_{Q1,min}$ respectively $J_{Q2,min}$, respectively, in each case extend parallel both to the first longitudinal section plane XZ as well as also to the second imaginary longitudinal section plane YZ, and consequently, a contribution of the minimum bending stiffnesses of the cross braces Q1, Q2 at least to the bending or spring stiffnesses, $4c_{18}+c_{24V}$, $4c_{18}+c_{24X}$, of the coupling element $24_1$ of first type in each case effective for the eigenfrequencies of the V-mode and of the X-mode, is thus in each case as large as possible. The cross struts can, in such case, also be arranged, for example, in such a manner that, as is shown in FIG. 4a, 4b, 4c, 8a, or 8b, each of the two imaginary bending principal axes in each case lies in the second imaginary longitudinal section plane YZ. Advantageously, the first cross brace Q1 and the second cross brace Q2 can furthermore each be composed of the same material and/or each be composed of steel.

For the purpose of an additional improving of the effectiveness of the separating of the eigenfrequency of the V-mode of the tube arrangement from that of the X-mode desired by the invention, according to an additional embodiment of the invention, the deformation body includes, in addition to the first and second longitudinal struts, also at least one other longitudinal strut, which extends from the first cross brace to the second cross brace with a length, $l_{L3}$, and is straight in projection on the imaginary cross sectional plane XY, namely a third longitudinal strut L3. The third longitudinal strut, as is schematically presented in FIG. 4a, 4b, or 4c or 8a, 8b, is affixed with a first strut end on the first cross brace, as well as with a second strut end lying opposite the first on the second cross brace, and, in the example of an embodiment shown here, in a region in which the first cross brace Q1 or the second cross brace in each case imaginarily intersects the second imaginary longitudinal section plane YZ. The third longitudinal strut L3 can, for example, also be plate-shaped, or be formed by means of a corresponding flat bar, for instance, one made of the same material as the two other longitudinal struts L1, L2 and/or the two cross braces Q1, Q1, for example, made of steel. In a further embodiment of the invention, the length, $l_{L3}$, of the third longitudinal strut L3 is additionally selected so as to be greater than 10% of the length, $l_{L1}$, of the first longitudinal strut L1, or smaller than 120% of the length, $l_{L1}$, of first longitudinal strut L1. For example, the longitudinal strut L3—as is also evident from the combination of FIGS. 4a, 4b, 4c, 8a, 8b—can, for instance, be embodied so as to have a length equal to that of the two other longitudinal struts L1, L2.

For the case shown here, in which the deformation body is formed by means of an uneven number of longitudinal struts, said third longitudinal strut L3 is additionally arranged in such a manner that it is in each case spaced equally far apart from the first longitudinal strut L1 and from the second longitudinal strut L2. As a result of this, in the present example of an embodiment, the third longitudinal strut L3 contributes a further spring stiffness, $c_{L3}$, for a tension or compressive force acting on said longitudinal strut L3 and directed perpendicular to the first imaginary longitudinal section plane XZ, wherein this spring stiffness, $c_{L3,min}$, behaves essentially proportional to a specification $E_{L3}$ $A_{L3}/l_{L3}$, and consequently is determined by a modulus of elasticity, $E_{L3}$, dependent on the material of said longitudinal strut L3, as well as also by its length, $l_{L3}$, as well as by a surface area, $A_{L3}$, of a cross sectional area coincident with the first imaginary longitudinal section plane XZ. Additionally, also the third longitudinal strut L3 can advantageously be arranged in such a manner that an imaginary principal bending axis associated with a minimum bending stiffness, $E_{L3} \cdot J_{L3,min}$, inherent to said longitudinal strut L3 extends parallel both to the first imaginary longitudinal section plane XZ as well as also to the second imaginary longitudinal section plane YZ, or that an imaginary principal bending axis associated with a maximal areal moment of inertia, $J_{L3,max}$, inherent to said longitudinal strut L3 extends parallel to the first imaginary longitudinal section plane XZ and perpendicular to the second imaginary longitudinal section plane YZ. In such case, the minimum bending stiffness, $E_{L3} \cdot J_{L3,min}$, of the third longitudinal strut L3 is, in turn, dependent on the modulus of elasticity, $E_{L3}$, predetermined by its material, as well as also dependent on a minimum areal moment of inertia, $J_{L3,min}$, about the imaginary principal bending axis associated with this, while, in addition to the modulus of elasticity, $E_{L3}$, a maximum areal moment of inertia, $J_{L3,max}$, about said imaginary principal bending axis associated with the maximal bending stiffness, $E_{L3} \cdot J_{L3,max}$, determines the maximum bending stiffness, $E_{L3} \cdot J_{L3,max}$.

Particularly also for the mentioned case, in which the eigenfrequency, $f_{18V}$, of the V-mode should be set lower than the eigenfrequency, $f_{18X}$, of the X-mode, according to an additional embodiment of the invention, the first, second and third longitudinal struts are additionally each dimensioned in such a manner and arranged relative to one another in such a manner that, as a result, the deformation body DB, and consequently the coupling element, $24_1$, of first type formed therewith, or the tube arrangement formed therewith, fulfills the specification:

$$\frac{\left(\frac{a_{L1}}{2}\right)^2 \cdot \frac{E_{L1} \cdot A_{L1}}{l_{L1}} + \left(\frac{a_{L1}}{2}\right)^2 \cdot \frac{E_{L3} \cdot A_{L3}}{l_{L3}}}{6 \cdot \frac{E_{L1} \cdot J_{L1,min}}{l_{L1}}} > 1,$$

or the specification:

$$\frac{\left(\frac{a_{L2}}{2}\right)^2 \cdot \frac{E_{L2} \cdot A_{L2}}{l_{L2}} + \left(\frac{a_{L2}}{2}\right)^2 \cdot \frac{E_{L3} \cdot A_{L3}}{l_{L3}}}{6 \cdot \frac{E_{L2} \cdot J_{L2,min}}{l_{L2}}} > 1.$$

Additionally, the deformation body should, in comparison to the connecting struts, be dimensioned in such a manner that, as a result, the coupling element $24_1$ of first type fulfills the specification:

$$\frac{\left(\frac{a_{L1}}{2}\right)^2 \cdot \left(\frac{E_{L1} \cdot A_{L1}}{l_{L1}} + \frac{E_{L3} \cdot A_{L3}}{l_{L3}}\right)}{3 \cdot \frac{E_{V1} \cdot J_{V1,max}}{l_{V1}}} > 2.$$

As a result of further investigations, it has additionally been shown that the coupling element $24_1$ of first type is optimal for the desired separating of the eigenfrequency, $f_{18V}$, of the V-mode from the eigenfrequency, flax, of the X-mode, when it fulfills the specification $$\frac{\frac{1}{l_{V1}^2} \cdot \left[\frac{1}{3 \cdot \frac{(E_{V1} \cdot J_{V1,max})}{l_{V1}}} + \left(\frac{a_{L1}}{2}\right)^2 \cdot \left(\frac{E_{L1} \cdot A_{L1}}{l_{L1}} + \frac{E_{L3} \cdot A_{L3}}{l_{L3}}\right)\right]}{\frac{1}{l_{V1}^2} \cdot \left[\frac{1}{3 \cdot \frac{E_{V1} \cdot J_{V1,max}}{l_{V1}}} + \frac{1}{6 \cdot \frac{E_{L1} \cdot J_{L1,min}}{l_{L1}}}\right]} > 1.$$

Moreover, further investigations have shown it to be very advantageous, when—as indicated in FIG. 4a, 4b, or 4c, or 8a, 8b—the first cross brace Q1 has a smaller cross section, and consequently a smaller—here also minimum—areal moment of inertia, $J_{Q1,min}$, in a region, in which this first cross brace Q1 imaginarily intersects the second imaginary longitudinal section plane YZ, than it has in an adjoining, neighboring region extending to the first connecting strut V1, and than it has in an adjoining, neighboring region extending to the second connecting strut V2; or the second cross brace Q2 has a smaller cross section, and consequently smaller—here namely also minimum—areal moment of inertia, $J_{Q2,min}$, in a region in which this imaginarily intersects the second imaginary longitudinal section plane YZ, than it has in an adjoining, neighboring region extending to the third connecting strut V3, and than it has in an adjoining, neighboring region extending to the fourth connecting strut V4; and when—in the mentioned case of the use of an uneven number of longitudinal struts of the aforementioned type for forming the coupling element $24_1$—the third longitudinal strut L3 is affixed at its first strut end to the first cross brace Q1 in said region of the latter's minimum areal moment of inertia, $J_{Q1,min}$, and is affixed with its second strut end to the second cross brace Q2 in the region of the latter's minimum areal moment of inertia, $J_{Q2,min}$. As a result of this, the contribution of the two cross braces Q1, Q2 to the spring stiffness, $c_{24V}$, of the coupling element $24_1$ of first type predominantly effective for the V-mode, and consequently to the spring stiffness, $4c_{18}+c_{24V}$, determining the eigenfrequency of the V-mode of the tube arrangement as a whole, can, for example, be lessened relative to the contribution, which the two cross braces Q1, Q2 make to the spring stiffness, $c_{24X}$, of the coupling element $24_1$ of first type predominantly effective for the X-mode, and consequently to the spring stiffness, $4c_{18}+c_{24X}$, determining the eigenfrequency of the X-mode of the tube arrangement as a whole.

Naturally inherent to the coupling element $24_1$ of first type are a plurality of natural eigenmodes, some of which can also exhibit a certain meaning for a dimensioning of the coupling element, which is optimal as regards the desired separating of the eigenfrequencies of the V-mode and of the X-mode of the tube arrangement. For example, the coupling element $24_1$ of first type shown in each of FIG. 4a, 4b, 4c, or 8a, 8b—which is embodied as a frame construction—can have an eigenmode of first type, in which the deformation body of said coupling element executes mechanical oscillations in a coupler plane or plane of oscillation $XY_1$ parallel to the imaginary cross sectional plane XY with an eigenfrequency, $f_{24X}$, wherein these oscillations—as is also schematically presented in FIG. 8a—are mirror symmetrical both relative to the first imaginary longitudinal section plane YZ as well as also relative to the second imaginary longitudinal section plane YZ, or which allow the deformation body to appear mirror symmetrical both relative to the first imaginary longitudinal section plane YZ as well as also relative to the second imaginary longitudinal section plane YZ. Additionally, said coupling element $24_1$ can additionally have an additional eigenmode, namely an eigenmode of second type, in which the deformation body of said coupling element can execute mechanical oscillations in said coupler plane $XY_1$ parallel to the imaginary cross sectional plane XY with an eigenfrequency, $f_{24V}$, —most often different from the eigenfrequency, $f_{24X}$, of the eigenmode of first type—wherein these oscillations—as is schematically presented in FIG. 8b—are mirror symmetrical only relative to the second imaginary longitudinal section plane YZ, or allow the deformation body temporarily to appear mirror symmetrical only relative to the second imaginary longitudinal section plane YZ.

In such case, as is evident from the combination of FIGS. 7a, 7b, 8a, 8b, the eigenmode of first type inherent to the coupling element $24_1$ corresponds to the X-mode of the tube arrangement, and the eigenmode of second type inherent to the coupling element $24_1$ corresponds to the V-mode of the tube arrangement as regards their respective oscillatory movements. Recognizing this, according to an additional embodiment of the invention, the deformation body, and consequently the coupling element formed therewith, is additionally dimensioned in such a manner that an eigenfrequency ratio, $f_{24X}/f_{24V}$, inherent to said coupling element, this eigenfrequency ratio being defined by a ratio of the eigenfrequency of its eigenmode of first type to the eigenfrequency of its eigenmode of second type, is greater than one, and, to the greatest degree possible, also greater than 10. As a result of this, a spring stiffness ratio inherent to the coupling element $24_1$, this spring stiffness ratio being defined by a ratio of a spring stiffness, $c_{24X}$, co-determining the eigenfrequency, $f_{24X}$, of its eigenmode of first type, and consequently also co-determining the eigenfrequency of the X-mode of the entire tube arrangement, to a spring stiffness, $C_{24V}$, co-determining the eigenfrequency, $f_{24V}$, of its eigenmode of second type, and consequently also co-determining the eigenfrequency of the V-mode of the entire tube arrangement, is greater than one, or ideally also greater than 10.

For the case, in which the coupling element $24_1$ of first type essentially corresponds to a combination of previously individually described detail solutions, not least of all, however, also the construction resulting from the combination of FIGS. 4a, 4b, 4c, 5a, 5b as well as 8a, 8b, the spring stiffness, $c_{24X}$, predominantly effective for the X-mode can be estimated, moreover with quite good accuracy, via the relationship $$\frac{1}{l_{V1}^2} \cdot \left[ \frac{1}{3 \cdot \frac{E_{V1} \cdot J_{V1,max}}{l_{V1}}} + \frac{1}{\left(\frac{a_{L1}}{2}\right)^2 \cdot \left(\frac{E_{L1} \cdot A_{L1}}{l_{L1}} + \frac{E_{L3} \cdot A_{L3}}{l_{L3}}\right)} \right] \approx c_{24x},$$

while the spring stiffness, $c_{24V}$, of the coupling element $24_1$ of first type predominantly effective for the V-mode corresponds in good approximation to the relationship:

$$\frac{1}{l_{V1}^2} \cdot \left[ \frac{1}{3 \cdot \frac{E_{V1} \cdot J_{V1,max}}{l_{V1}}} + \frac{1}{6 \cdot \frac{E_{L1} \cdot J_{L1,min}}{l_{L1}}} \right] \approx c_{24v}.$$

Further investigations on tube arrangements according to the present invention have additionally yielded the result that other natural oscillation modes of the coupling element of importance for operation of a measuring transducer of the invention can be such an eigenmode of the coupling element $24_1$, in which the deformation body can oscillate with a respective eigenfrequency about an associated static rest position in such a manner that simultaneously thereto, also the four connecting struts execute bending oscillations about a particular static resting position, in the direction of the longitudinal axis. Of particular interest in such case, is, for example, also that eigenmode of the coupling element $24_1$— here designated the eigenmode of third type—in which the deformation body, moving essentially only translationally in the direction of a longitudinal axis parallel both to the first imaginary longitudinal section plane as well as also to the second imaginary longitudinal section plane—here thus also the longitudinal axis L—can oscillate with an eigenfrequency, $f_{24Z}$, about an associated static rest position, and namely can do so in such a manner that the four connecting struts essentially uniformly (or essentially in the same direction) execute bending oscillations about a particular static resting position in the direction the said longitudinal axis. Recognizing this, according to an additional embodiment of the invention, the coupling element of first type is additionally embodied in such a manner that the eigenfrequency, $f_{24Z}$, of its eigenmode of third type is not equal to the mentioned eigenfrequency, $f_{18V,Ref}$, of the bending oscillation mode of first type of the tube arrangement measurable in the case of measuring tubes completely filled with air. In such case, it has, for example, proved especially advantageous when—not least of all for the purpose of preventing oscillations of the coupling element of first type in resonance to the bending oscillations in the V-mode—said eigenfrequency, $f_{24Z}$, of the coupling element of first type is greater than said eigenfrequency, $f_{18V,Ref}$, of the V-mode of the tube arrangement by more than 10 Hz, or when said eigenfrequency, $f_{24Z}$, of the coupling element of first type amounts to more than 101%— and, to the greatest degree possible, more than 105%—of said eigenfrequency, $f_{18V,Ref}$, of the V-mode the tube arrangement. Of further interest can additionally, for example, also be that eigenmode of the coupling element $24_1$—here designated the eigenmode of fourth type—in which the deformation body, moving only translationally in the mentioned coupler plane or plane of oscillation $XY_1$, can oscillate with an eigenfrequency, $f_{24XY}$, about its associated static rest position, and can do so in such a manner that the four connecting struts uniformly (and/or in the same direction) execute bending oscillations about their respective static resting positions in the coupler plane $XY_1$. For preventing undesired disturbing influences, also that eigenfrequency, $f_{24XY}$, of the eigenmode of fourth type of the coupling element $24_1$ should, in turn, be set so as to be higher than the eigenfrequency, $f_{18X}$, of the bending oscillation mode of second type of the tube arrangement, and, to the greatest degree possible in such a manner that said eigenfrequency, $f_{24XY}$, of the mode of oscillation of fourth type of the coupling element of first type is greater than said eigenfrequency, $f_{18X}$, of the X-mode of the tube arrangement by more than 10 Hz, and/or that said eigenfrequency, $f_{24XY}$, of the mode of oscillation of fourth type of the coupling element of first type amounts to more than 101%—and, to the greatest degree possible, more than 105%—of said eigenfrequency, $f_{18X}$, of the X-mode the tube arrangement.

For the purpose of preventing disturbing influences potentially generated on the part of the coupling element of first type—for instance, in one of the aforementioned eigenmodes of the coupling element of first type at an eigenfrequency of the actively excited wanted mode, and consequently of the V-mode—the deformation body DB of the coupling element of first type—formed here, for example, by means of three longitudinal struts L1, L2, L3 and two cross braces Q1, Q2—is, according to an additional embodiment of the invention, dimensioned in such a manner that it has a mass, $M_{DB}$, which amounts to less than 50% of the empty mass, $M_{18}$, of first measuring tube. Additionally, the connecting struts, which are especially equally-constructed, as well as the deformation body DB affixed thereto, which in given cases, also has a mass, $M_{DB}$, amounting to more than 10% of the empty mass, $M_{18}$, of the first measuring tube, is, according to an additional embodiment of the invention, dimensioned in such a manner that said coupling element $24_1$ also fulfills the specification:

$$\frac{\sqrt{\frac{1}{M_{DB}} \cdot \frac{E_{V1} \cdot J_{V1,min}}{1_{V1}^3}}}{f_{18V,ref}} > 1.05,$$

i.e. that a frequency value, $$\sqrt{\frac{1}{M_{DB}} \cdot \frac{E_{V1} \cdot J_{V1,min}}{1_{V1}^3}},$$

at least approximately corresponding to an eigenfrequency of the coupling element $24_1$, thus amounts to more than 105% of the above mentioned eigenfrequency, $f_{18X,Ref}$, of the V-mode, measurable in the case of a tube arrangement completely filled with air.

If required—for example, because the measuring transducer is provided for measuring extremely hot media or for measuring in applications with operating temperatures fluctuating over a broad range, for instance, as a result of cleaning procedures of the measuring transducer recurringly performed in-situ ("cleaning in process", "sterilizing in process" etc.), and, in this respect, notable thermal excursions of the measuring tubes are to be expected—the coupling element $24_1$ of first type can additionally be embodied in such a manner that it can expand in a manner essentially equal to that of the measuring tubes in each case coupled thereby, and/or that it is sufficiently flexible at least relative to forces, which extend in the direction of a line of action through the peaks of the two measuring tubes connected with one another by the particular coupling elements of second type; for instance, coincident with or parallel to the mentioned imaginary vertical axis V. This can, as investigations on tube arrangements of the invention have shown, be achieved directly by the tube arrangement as a whole fulfilling the specification:

$$\frac{\frac{E_{V1} \cdot A_{V1}}{1_{V1}}}{3 \cdot \frac{E_{18} \cdot J_{18}}{a_k^3 \cdot \left(1 - 1.5 \cdot \frac{a_k}{L_{18x}}\right)}} < 20.$$

As a result of this, a temperature working range for a measuring transducer according to the present invention, and consequently the measuring system formed therewith, quite sufficient for a large number of industrial applications, namely a temperature working range extending over more than 50 K (Kelvin), can be provided. The flexibility of the coupling element in the direction of the vertical axis V can—alternatively or in supplementation to the implementation of the aforementioned specification with the tube arrangement—be provided, respectively improved, in a simple as well as very effective manner, for example, via the already mentioned application of a curved flat bar for the connecting struts, which, in projection on the second imaginary longitudinal section plane YZ, is, for example, at least sectionally S-shaped, Z-shaped, V-shaped, and/or—as is schematically presented in FIG. 5a, 5b—decidedly V-shaped. In such case, it can additionally nevertheless be quite advantageous, not least of all also for the purpose of implementing a coupling element sufficiently effective for the desired separating of the eigenfrequencies of the V-mode and of the X-mode of the tube arrangement, to construct the connecting struts—as is also evident from the combination of FIGS. 4a, 4b, 4c, 5a, 5b—so as to be curved only in projection on the second imaginary longitudinal section plane YZ, but not, however, in projection on the cross sectional plane XY, or on the first imaginary longitudinal section plane XZ. Thus, on the one hand, a small change in the relative separation, for instance as a result of thermally caused strain, between measuring tubes can be accommodated, and indeed in a manner largely preventing increases of mechanical stresses within the tube arrangement negatively influencing the oscillatory behavior of the tube arrangement; however, on the other hand, a sufficient separating of the eigenfrequencies of the V-mode and of the X-mode of the tube arrangement can also be achieved. The aforementioned curvature of the connecting struts visible in projection on the second imaginary longitudinal section plane YZ can additionally advantageously be embodied in such a manner that each of the connecting struts, as is also indicated in FIGS. 4a, 4b, 5a, 5b, are in each case at least sectionally convex relative to the imaginary cross sectional plane XY, namely as viewed from the cross sectional plane XY.

Figure 10:
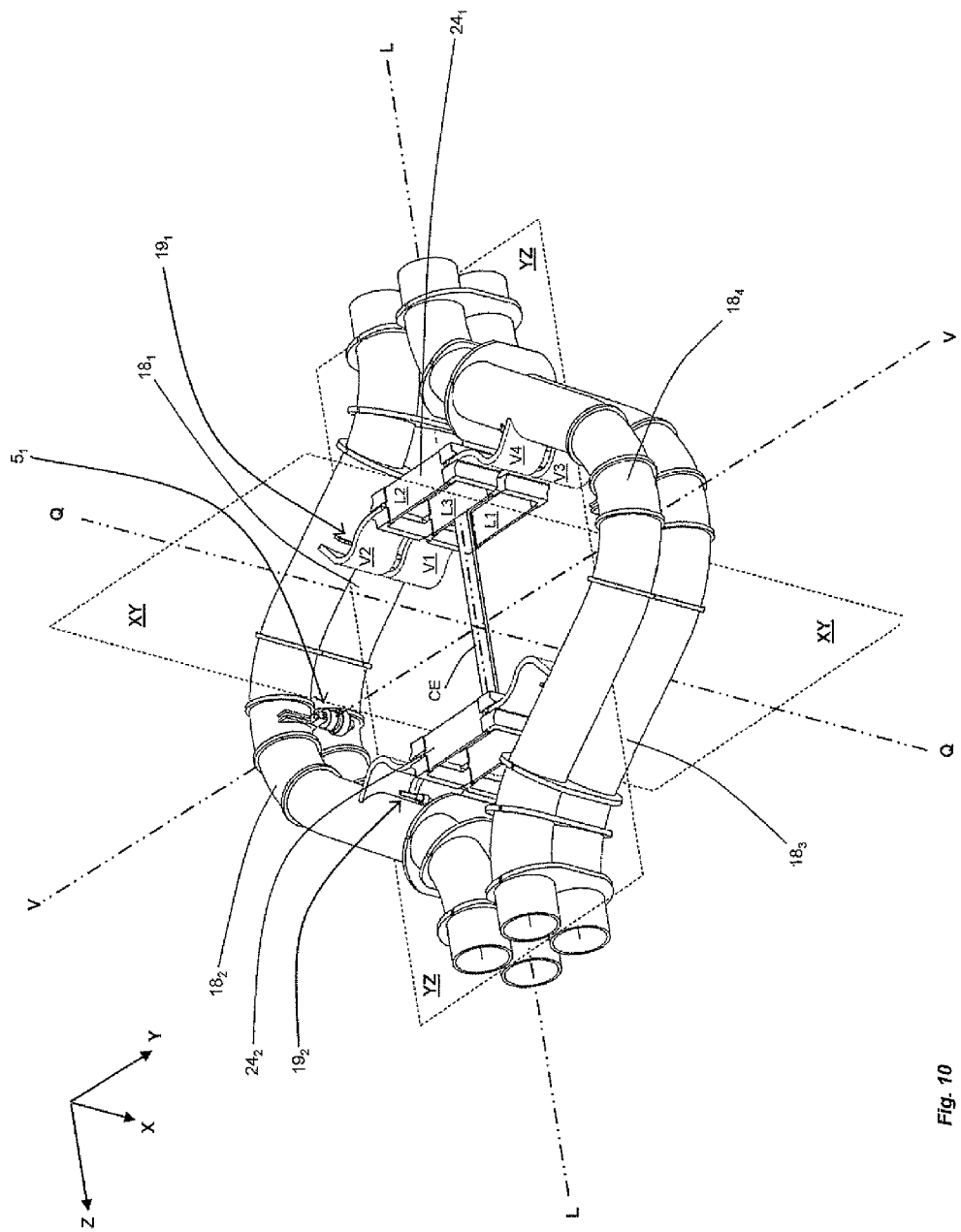
FIG. 10 in perspective side view, another variant of a tube arrangement suitable for forming an in-line measuring device according to FIG. 1.

Particularly for the mentioned case, and consequently that shown by way of example in FIGS. 4a, 4b, 4c, 5a, 5b, as well as also in FIG. 10, in which the first coupling element $24_1$, of first type is arranged spaced from the cross sectional plane XY, here namely on the inlet side in the measuring transducer, according to a further development, the tube arrangement moreover comprises a second coupling element $24_2$ of first type for setting eigenfrequencies of natural oscillation modes of the tube arrangement, not least of all also the eigenfrequencies of the V-mode and of the X-mode of the tube arrangement, wherein this second coupling element $24_2$ of first type is affixed—here on the outlet side—on each of the four measuring tubes, spaced both from the first flow divider as well as also from the second flow divider, as well as also from the first coupling element $24_1$, of first type, and is especially essentially constructed equally to the first coupling element $24_1$ of first type. For the already mentioned case, in which the first coupling element $24_1$, of first type is placed in the measuring transducer on the inlet side, and the second coupling element $24_2$ of first type is placed in the measuring transducer on the outlet side, the two mentioned coupling elements $24_1$, $24_2$ of first type are, according to an additional embodiment of the invention, additionally also arranged in the measuring transducer symmetrically relative to the mentioned imaginary cross sectional plane XY of the measuring transducer, and consequently equidistantly relative to said cross sectional plane XY, and extending parallel relative to said cross sectional plane XY at least with their respective deformation bodies.

For achieving an as large as possible frequency separation between the eigenfrequency of the first coupling element of first type, consequently also of the eigenmode of third type inherent to the second coupling element of first type, on the one hand, and the eigen-, or resonant, frequency of the V-mode of the tube arrangement, on the other hand, it can, in such case, furthermore, be advantageous to connect the two coupling elements $24_1$, $24_2$ of first type, as well as also schematically presented in FIG. 10, by means of at least one connecting element CE, for example, at least one rod, plate or bar shaped, connecting element CE, mechanically with one another, which, in such case, especially serves, at least significantly, to suppress, or, as much as possible, completely to avoid, a translational movement of the deformation body DB of the first coupling element 241 of first type relative to the second coupling element $24_2$ of first type in the direction of a longitudinal axis parallel both to the first imaginary longitudinal section plane as well as also to the second imaginary longitudinal section plane—here thus also in the direction of the longitudinal axis L—, respectively a translational relative movement of the two coupling elements $24_1$, $24_2$ of first type in said direction. The at least one connecting element CE can for this, as well as also in FIG. 10 schematically presented, be affixed to the third longitudinal strut L3 of the coupling element $24_1$, consequently in the case of second coupling element $24_2$ of first type equally constructed to said coupling element $24_1$, to its corresponding—here thus central—longitudinal strut. Alternatively thereto or in supplementation thereof, the mechanical coupling of the two coupling elements $24_1$, $24_2$ of first type serving for preventing translational relative movements can, however, for example, also be implemented by means of connecting elements affixed to the outer longitudinal struts L1, L2 and their respective mates of the second coupler element $24_2$ of first type. The at least one connecting element CE can, for example, again, be plate shaped, or formed by means of a corresponding flat bar, for instance, of the same material as the longitudinal struts L1, L2, or L3 and/or the two cross braces Q1, Q1, for example, thus, a steel. Furthermore, the two longitudinal struts and the at least one connecting element can be embodied, for example, also as a monolithic component, consequently a joint free component. Through the application of the at least one connecting element CE mechanically coupling the two coupling elements $24_1$, $24_2$, the desired frequency separation between the respective eigenmode of third type of each of the coupling elements and the eigen-, or resonant frequency of the V-mode of the tube arrangement can, thus, also be achieved with connecting struts V1, V2, V3, V4 of comparatively low minimum bending stiffness, $E_{V1} \cdot J_{V1,max}$, $E_{V2} \cdot J_{V2,max}$, $E_{V3} \cdot J_{V3,max}$, respectively $E_{V4} \cdot J_{V4,max}$, consequently of high flexibility in the direction of the imaginary vertical axis V. This can be quite advantageous, not least of all for measuring systems with smaller nominal diameter, especially of less than 100 mm, and/or for measuring systems, which are provided for applications with medium-, respectively operating, temperature fluctuating over a broad range and/or comparatively high medium-, respectively operating, temperature.

Furthermore, if required, mechanical stresses and/or vibrations possibly or at least potentially caused at the inlet side or at the outlet side in the transducer housing by the relatively large-dimensioned measuring tubes vibrating especially in the mentioned manner can, for example, be minimized by mechanically connecting the four measuring tubes $18_1$, $18_2$, $18_3$, $18_4$ with one another at least pairwise on the inlet side and on the outlet side, in each case by means of coupling elements serving as so-called node plates, in the following referred to as coupling elements of second type. Moreover, by means of such coupling elements of first type, be it through their dimensioning and/or their positioning on the measuring tubes, mechanical eigenfrequencies of the measuring tubes, and thus also mechanical eigenfrequencies of the tube arrangement formed by means of the four measuring tubes (including additional components of the measuring transducer placed thereon), and consequently also the natural eigenfrequencies of its V-mode and its X-mode, respectively, and thus also the oscillatory behavior of the measuring transducer as a whole, can be targetedly influenced. The coupling elements of second type serving as node plates can be, for example, thin plates or washers, manufactured especially of the same material as, or similar material to, the measuring tubes, which, in each case, corresponding to the number and the outer dimensions of the measuring tubes to be coupled with one another, are provided with bores, and, in given cases, supplementally slitted to the edge, so that the washers can first be mounted onto the respective measuring tubes $18_1$, $18_2$ and $18_3$, $18_4$, and, in given cases, thereafter still be bonded to the respective measuring tubes; for example, by hard soldering, or brazing, or by welding.

Accordingly, in an additional embodiment of the invention, the tube arrangement comprises a first coupling element $25_1$ of second type, for example, a plate shaped first coupling element $25_1$ of second type, which (as is directly evident from FIGS. 4a, 4b, 5a, 5b, 6a), for forming inlet-side oscillation nodes at least for vibrations—especially also bending oscillations, for instance, those in the mentioned V-mode—of the first measuring tube, and for vibrations of the second measuring tube opposite-equal thereto, is affixed on the inlet side to the first measuring tube and to the second measuring tube, and is spaced from the first flow divider; as well as a second coupling element $25_2$ of second type, which is, for instance, constructed equally to the first coupling element, and which, for forming outlet-side oscillation nodes for vibrations—especially also bending oscillations, thus those in the mentioned V-mode or X-mode—of the first measuring tube $18_1$ and for vibrations of the second measuring tube $18_2$ opposite-equal thereto, is affixed on the outlet side to the first measuring tube $18_1$ and to the second measuring tube $18_2$, and spaced from the second flow divider $20_2$. Equally, the tube arrangement includes, for forming inlet-side oscillation nodes for vibrations—especially the mentioned bending oscillations—of the third measuring tube and for vibrations of the fourth measuring tube opposite-equal thereto, a third coupling element $25_3$ of second type, which is, for instance, again plate shaped, and/or constructed equally to the first coupling element $24_1$ of second type, and which is affixed on the inlet side to the third measuring tube and to the fourth measuring tube, and apart spaced from the first flow divider, as well as, for forming outlet-side oscillation nodes for vibrations—for instance, the mentioned bending oscillations—of the third measuring tube and for vibrations of the fourth measuring tube opposite-equal thereto, a fourth coupling element $25_4$ of second type, which is, for instance, constructed equally to the first coupling element $25_1$ of second type, and which is affixed on the outlet side to the third measuring tube and to the fourth measuring tube and spaced from the second flow divider.

In an additional embodiment of the invention, the four aforementioned coupling elements $25_1, 25_2, 25_3, 25_4$ of second type are, as is also directly evident from the combination of FIGS. 4a, 4b, 5a, 5b, 6a, 6b, in each case, affixed to exactly two of the four measuring tubes—but not otherwise to any other of the four measuring tubes—so that, as a result, the first and second coupling elements $25_1, 25_2$ of second type are affixed only to the first and second measuring tubes, and the third and the fourth coupling element $25_3, 25_4$ of second type are affixed only to the third and the fourth measuring tubes. As a result of this, the tube arrangement, and consequently also the measuring transducer, can be manufactured, for example, in a manner such that, first, the first and second coupling elements $25_1, 25_2$ of second type are in each case affixed to the (future) first and second measuring tubes $18_1, 18_2$ for forming a first measuring tube package, and the third and fourth coupling elements $25_3, 25_4$ of second type are in each case affixed to the (future) third and the fourth measuring tubes $18_3, 18_4$ for forming a second measuring tube package. It is then possible to combine the two measuring tube packages at a later point in time as the tube arrangement, for instance, directly before or also after insertion of the two measuring tube packages into the mentioned tubular middle segment $7_{1A}$ of the (future) transducer housing, by correspondingly affixing the first and second coupling elements $24_1, 24_2$ of first type to each of the two measuring tube packages, for instance, for the time being, in each case to at least one of the measuring tubes $18_1, 18_2$ of the first measuring tube package, and to at least one of the measuring tubes $18_3, 18_4$ of the second measuring tube package. This has—especially also for the mentioned case, in which the measuring transducer is designed for large nominal diameters of more than 100 mm, in spite of the relatively large dimensions of its components, and consequently of the tube arrangement, of the transducer housing, of the flow dividers, etc.—the advantage, that the tube arrangement, which, as a result, is relatively spread-out, needs to be handled as a totality only at a relatively late point in the time of the total manufacturing process. Moreover, this permits use of long existent, conventional measuring transducer technology for double tube arrangements, which brings about a considerable reduction of the manufacturing and inventory costs. If required, the coupling elements $25_1, 25_2, 25_3, 25_4$ can, however, also, in each case, be affixed in a corresponding manner to all four measuring tubes, for example also in the case, in which the measuring transducer is designed for relatively small nominal diameters of 50 mm or less.

In the example of an embodiment shown here, the first coupling element $25_1$ of second type is affixed both to a—here sectionally bent—inlet-side tube segment of the first measuring tube $18_1$ extending between the first flow divider $20_1$ and the first coupling element $24_1$ of first type as well as also to an inlet-side tube segment of the second measuring tube $18_2$ likewise extending between the first flow divider $20_1$ and the first coupling element $24_1$ of first type, and the second coupling element $25_2$ of second type is affixed both to a—here likewise sectionally bent—outlet-side tube segment of the first measuring tube $18_1$ extending between the second flow divider $20_2$ and the second coupling element $24_2$ of first type as well as also to an outlet-side tube segment of the second measuring tube $18_2$ likewise extending between the second flow divider $20_2$ and the second coupling element $24_2$ of first type. In an analogous manner, the third coupling element $25_3$ of second type is affixed both to a—here likewise sectionally bent—inlet-side tube segment of the third measuring tube $18_3$ extending between the first flow divider $20_1$ and the first coupling element $24_1$ of first type, as well as also to an inlet-side tube segment of the fourth measuring tube $18_4$ likewise extending between the first flow divider $20_1$ and the first coupling element $24_1$ of first type, and the fourth coupling element $25_4$ of second type is affixed both to a—here, again, sectionally bent—outlet-side tube segment of the third measuring tube $18_3$ extending between the second flow divider $20_2$ and the second coupling element $24_2$ of first type as well as also to an outlet-side tube segment of the fourth measuring tube $18_4$ likewise extending between the second flow divider $20_2$ and the second coupling element $24_1$ of first type. This especially occurs in such a manner that—as is directly evident from the combination of FIGS. 4a, 4b, 5a, 5b—at least the first and fourth coupling elements of second type are parallel to one another, and at least the second and third coupling elements of second type are parallel to one another. Each of the four aforementioned coupling elements $25_1, 25_2$ of second type—which are especially constructed equally to one another—is, according to an additional embodiment of the invention, additionally embodied so as to be plate shaped, for example in such a manner that it in each case has a rectangular basic shape, or, as is shown in FIGS. 4a, 4b, has a more oval basic shape. As is additionally evident from the combination of FIGS. 4a, 4b, 5a, 5b, the four coupling elements $24_1, 24_2, 24_3, 24_4$ can additionally be embodied in such a manner and placed in the measuring transducer in such a manner that they are arranged symmetrically relative to the imaginary longitudinal section plane YZ, and pairwise symmetrically relative to the imaginary longitudinal section plane XZ and relative to the imaginary cross sectional plane XY. As a result, a center of mass of each of the coupling elements of second type thus in each case has the same distance from a center of mass of the tube arrangement. In the context of a still simpler and still more exact adjusting of the oscillatory behavior of the measuring transducer, it can additionally be quite advantageous when the measuring transducer moreover has—as, for example, provided in US-A 2006/0150750 and as indicated in FIGS. 4a, 4b, 5a, 5b—still other coupling elements of the aforementioned type acting as node plates, for example, a total of 8 or 12 coupling elements of second type.

Figure 5A:
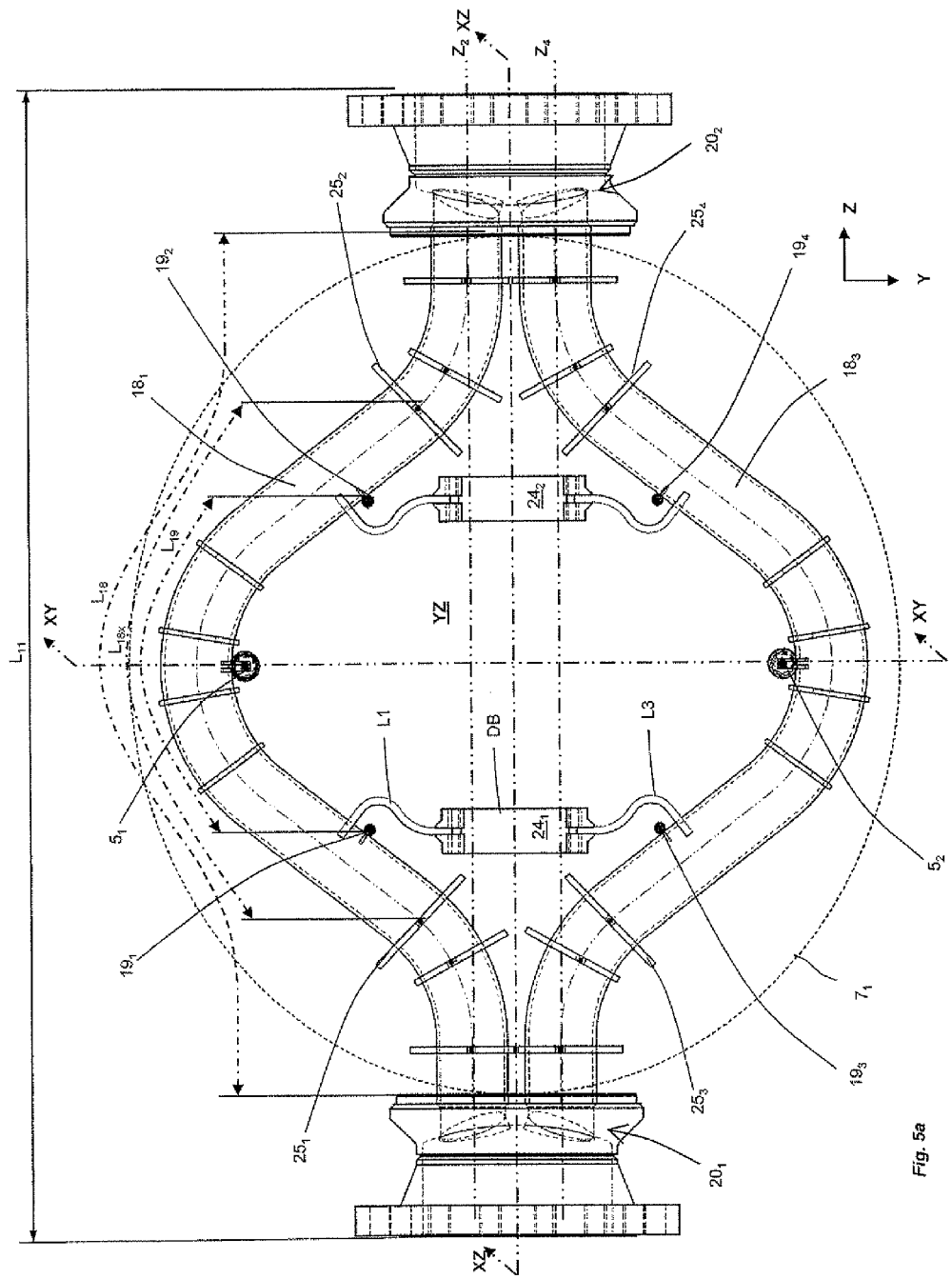
FIGS. 5a and 5b a projection of the measuring transducer of FIG. 4a in two different side views.
Figure 5B:
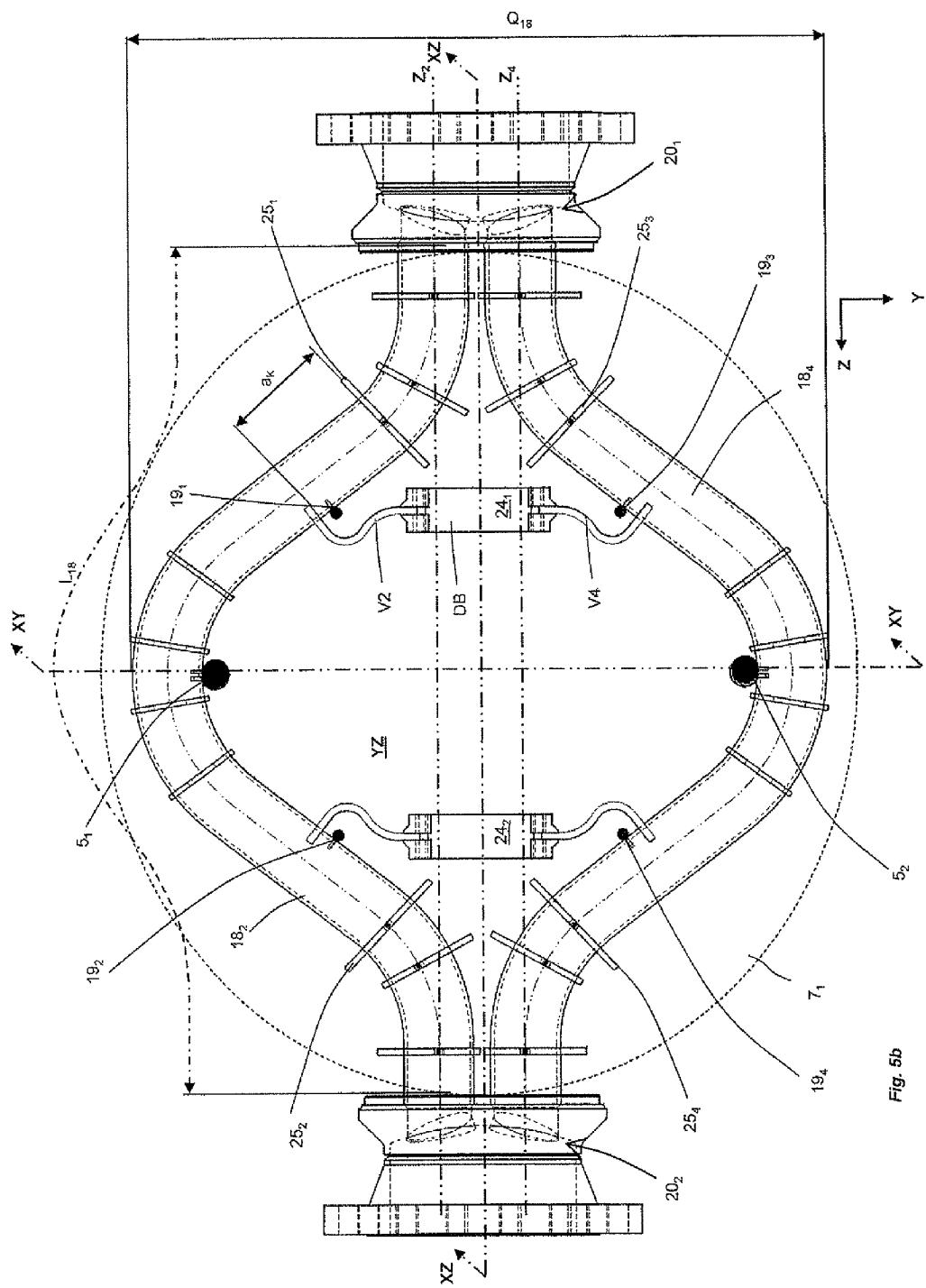
Figure 6A:
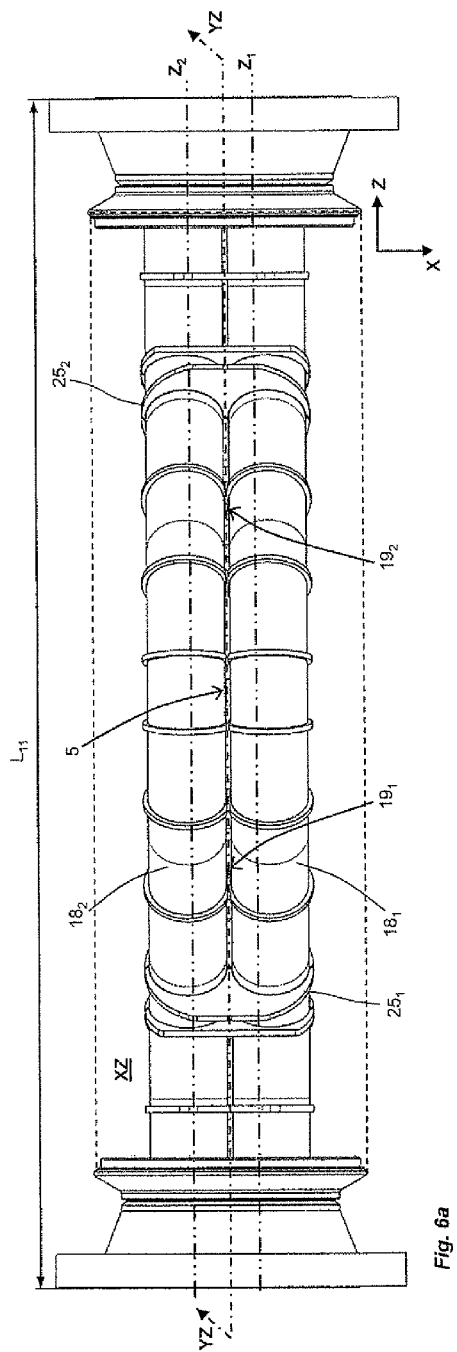
FIGS. 6a and 6b projections of a tube arrangement of FIG. 4b in two different side views.
Figure 6B:
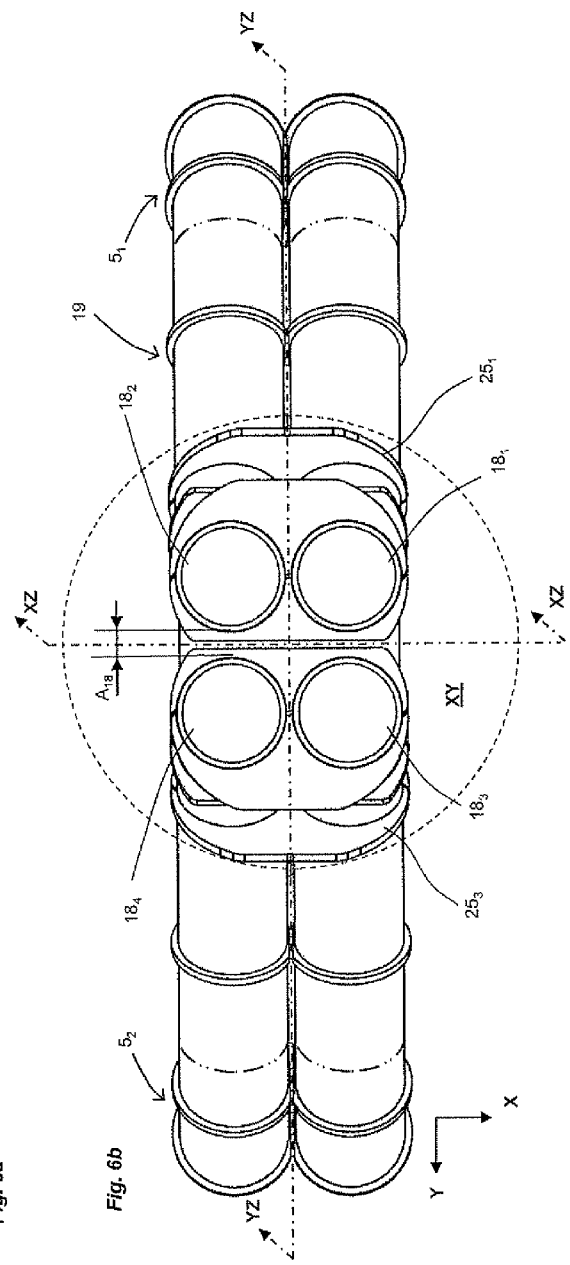

As is schematically presented in FIGS. 5a and 5b, the tube form of each of the measuring tubes, together with a minimum distance between the first and second coupling elements of second type—and consequently thus in the case of application of 8 or more such coupling elements, the coupling elements of second type lying on the inlet and outlet sides which are in each case nearest the center of mass of the tube arrangement, and thus, in this respect, the coupling elements of second type lying innermost on the inlet and outlet sides—in each case define a wanted oscillatory length, $L_{18x}$, of each of the measuring tubes. The wanted oscillatory length, $L_{18x}$, of the particular measuring tubes corresponds, in such case—as is also schematically presented in FIGS. 5a and 5b—to a length of the section of the bent line of said measuring tube extending between the two coupling elements $25_1, 25_2$ of second type, wherein, according to an additional embodiment of the invention, the coupling elements of second type are placed in the measuring transducer in such a manner that, as a result, the wanted oscillatory length of each of the measuring tubes $18_1, 18_2, 18_3, 18_4$ amounts to less than 3000 mm, especially less than 2500 mm and/or more than 800 mm. Alternatively or in supplementation, it is additionally provided to construct the measuring tubes and to arrange the coupling elements of first type in such a manner that all four measuring tubes $18_1, 18_2, 18_3, 18_4$ have, as a result, the same wanted oscillatory length, $L_{18x}$. According to an additional embodiment of the invention, the first measuring tube and the second measuring tube, at least in the region extending between the first coupling element of second type and the second coupling element of second type—consequently thus in their respective wanted oscillatory lengths—are additionally parallel to one another, and also the third measuring tube and the fourth measuring tube, at least in the region extending between the third coupling element of second type and the fourth coupling element of second type—and consequently thus their respective wanted, oscillatory lengths—are parallel to one another.

As is evident from the combination of FIGS. 4a, 4b, 5a, and 5b, the first coupling element of first type and the first or third coupling element of second type are additionally arranged in such a manner that a minimum distance between the first coupling element of second type and the second end of the second connecting strut of the coupling element of first type, measured along a surface element of the second measuring tube, is equal to a minimum distance, $a_K$, between the first coupling element of second type and the second end of the first connecting strut of the coupling element of first type, measured along a surface element of the first measuring tube, and that a minimum distance between the third coupling element of second type and the second end of third connecting strut of the coupling element of first type, measured along a surface element of the third measuring tube, as well as also a minimum distance between the third coupling element of second type and the second end of fourth connecting strut of the coupling element of first type, measured along a surface element of the fourth measuring tube, is in each case equal to the minimum distance, $a_K$, between the first coupling element of second type and the second end of the first connecting strut of the coupling element of first type.

Further investigations with tube arrangements according to the present invention have additionally yielded the result that it can be advantageous, for instance also for the purpose of minimizing the deforming influence of the coupling element of first type on the original natural oscillation form of the measuring tubes, when the first coupling element $24_1$, matched to the measuring tubes, and not least of all also to the maximal lateral expanse $Q_{18}$ of the tube arrangement resulting from its shape and arrangement, or matched to the tube cross sections of the measuring tubes, is dimensioned in such a manner and is affixed by means of its connecting struts to the measuring tubes in such a manner that the tube arrangement, as a result, fulfills the specification:

$$\frac{0.5 \cdot l_{L1}}{0.5 \cdot Q_{18} - (D_{18} + 2 \cdot h_{18})} \le \frac{a_k}{L_{18,x}} + \frac{0.5 \cdot D_{18} + h_{18} + 0.5 \cdot A_{18}}{0.5 \cdot Q_{18} - (D_{18} + 2 \cdot h_{18})},$$

or also the specification:

$$\frac{0.5 \cdot l_{L1}}{0.5 \cdot Q_{18} - (D_{18} + 2 \cdot h_{18})} > 0.2 \cdot \frac{a_k}{L_{18,x}} + \frac{0.5 \cdot D_{18} + h_{18} + A_{18}}{0.5 \cdot Q_{18} - (D_{18} + 2 \cdot h_{18})}.$$

For the purpose of additionally improving the effectiveness, with which, by means of the coupling element of first type, the desired separating of the eigenfrequencies, $f_{18}$, $f_{18x}$, of the V- and X-mode of the tube arrangement ultimately is achieved, as an alternative to or in supplementation of the preceding specification, the measuring tubes and the coupling element $24_1$ of first type are, according to an additional embodiment of the invention, additionally embodied or arranged in such a manner that the tube arrangement formed therewith, as a result, fulfills the specification $$\frac{c24x}{c18} \sim \frac{\frac{1}{1_{V1}^2} \cdot \left[ \frac{1}{3 \cdot \frac{E_{V1} \cdot J_{V1,max}}{1_{V1}}} + \left(\frac{a_{L1}}{2}\right)^2 \cdot \left(\frac{E_{L1} \cdot A_{L1}}{1_{L1}} + \frac{E_{L3} \cdot A_{L3}}{1_{L3}}\right) \right]}{3 \cdot \frac{E_{18} \cdot J_{18}}{a_K^3 \cdot \left(1 - 1.5 \cdot \frac{a_k}{L_{18x}}\right)}} > 0.01.$$

For creation of an as compact as possible measuring transducer of sufficiently high oscillation quality factor and high sensitivity coupled with as little a pressure drop as possible, according to an additional embodiment of the invention, the measuring tubes $18_1$, $18_2$, $18_3$, $18_4$ are dimensioned, matched to the mentioned, wanted oscillatory length, in such a manner that a caliber to oscillatory length ratio $D_{18}/L_{18x}$ of the measuring transducer, defined by a ratio of the caliber $D_{18}$ of the first measuring tube to the wanted oscillatory length $L_{18x}$ of the first measuring tube, amounts to more than 0.03, especially more than 0.05 and/or less than 0.15. As an alternative to this or in supplementation thereof, according to an additional embodiment of the invention, the measuring tubes $18_1$, $18_2$, $18_3$, $18_4$ are dimensioned, matched to the above-mentioned installed length $L_{11}$ of the measuring transducer, in such a manner that an oscillatory-length to installed-length ratio $L_{18x}/L_{11}$ of the measuring transducer, defined by a ratio of the wanted oscillatory length $L_{18x}$ of the first measuring tube to the installed length $L_{11}$ of the measuring transducer, amounts to more than 0.55, especially more than 0.6 and/or less than 1.5. According to an additional embodiment of the invention, the oscillation sensors are arranged in the measuring transducer, matched to the wanted oscillatory length, in such a manner that a measuring-length to oscillatory-length ratio $L_{19}/L_{18x}$ of the measuring transducer, defined by a ratio of the mentioned measuring length $L_{19}$ of the measuring transducer to the wanted oscillatory length $L_{18x}$ of the first measuring tube, amounts to more than 0.3, especially more than 0.4 and/or less than 0.95. Moreover, the measuring length, $L_{19}$, and/or measuring-length to oscillatory-length ratio $L_{19}/L_{18x}$ can, moreover, also be more exactly determined according to criteria proposed in the assignee's non-pre-published international applications PCT/EP2010/058797 and PCT/EP2010/058799 for determining optimum measuring lengths or optimum measuring-length to oscillatory-length ratios for measuring transducers of vibration type.

For lessening possible cross sensitivities of the measuring transducer to pressure, especially also in the case of as high as possible a nominal-diameter to installed-length ratio $D_{11}/L_{11}$ of more than 0.1 and as low as possible an oscillatory-length to installed-length ratio $L_{18x}/L_{11}$ of less than 1.5, annular stiffening elements can additionally be used on the measuring tubes, wherein each of these annular stiffening elements is placed on exactly one of the measuring tubes $18_1$, $18_2$, $18_3$, $18_4$, in such a manner that it encompasses the latter along one of its—especially circularly orbiting—imaginary peripheral lines; compare to this also the previously mentioned U.S. Pat. No. 6,920,798. It can, in such case, especially be of advantage, when at least four such stiffening elements, especially equally constructed stiffening elements, are placed on each of the measuring tubes $18_1$, $18_2$, $18_3$, or $18_4$. In such case, the stiffening elements can, for example, be placed in the measuring transducer 11 in such a manner that two adjoining stiffening elements mounted on the same measuring tube have a separation from one another, which amounts to at least 70% of a tube outer diameter of said measuring tube, but at most amounts to 150% of such tube outer diameter. In such case, a separation of neighboring stiffening elements from one another which lies in the range of 80% to 120% of the pipe-outer diameter of the respective measuring tube $18_1$, $18_2$, $18_3$, or $18_4$ has proved especially suitable.

Through application of four bent measuring tubes flowed-through in parallel—instead of, as hitherto been the case, two such measuring tubes—it is then also possible in a cost-effective manner to manufacture measuring transducers of the described type also for large mass flow rates, or with large nominal diameters of far over 250 mm, on the one hand having an accuracy of measurement of over 99.8% at an acceptable pressure drop, especially of less than 3 bar, and, on the other hand, keeping the installed mass, as well as also the empty mass, of such measuring transducers sufficiently within limits, so that, in spite of large nominal diameter, manufacture, transport, installation, as well as also operation can still always occur in an economically sensible manner. Especially also via implementation—individually or also in combination—of the above explained measures for further developing the invention, measuring transducers of the type being discussed can also, in the case of large nominal diameters, be embodied in such a manner and dimensioned in such a manner that a mass ratio of the measuring transducer, as defined by a ratio of the mentioned empty mass of the measuring transducer to a total mass of the tube arrangement, can readily be kept smaller than 3, especially smaller than 2.5.

The invention claimed is:

1. A measuring transducer of the vibration type for registering at least one physical, measured variable of a flowable medium conveyed in a pipeline and/or for producing Coriolis forces serving for registering a mass flow rate of a flowable medium conveyed in a pipeline, said measuring transducer comprising:
    a transducer housing, an inlet-side, first housing end of said transducer housing is formed by means of an inlet-side, first flow divider including four, mutually spaced flow openings, and an outlet-side, second housing end of said transducer housing is formed by means of an outlet-side, second flow divider including four, mutually spaced flow openings;
    a tube arrangement including four curved or bent measuring tubes, which are connected to said flow dividers for guiding flowing medium along flow paths connected in parallel, of which measuring tubes:
    a first measuring tube opens with an inlet-side, first measuring tube end into a first flow opening of the first flow divider, and with an outlet-side, second measuring tube end into a first flow opening of the second flow divider,
    a second measuring tube, opens with an inlet-side, first measuring tube end into a second flow opening of said first flow divider and with an outlet-side, second measuring tube end into a second flow opening of said second flow divider,
    a third measuring tube opens with an inlet-side, first measuring tube end into a third flow opening of said first flow divider and with an outlet-side, second measuring tube end into a third flow opening of said second flow divider,
    and a fourth measuring tube, opens with an inlet-side, first measuring tube end into a fourth flow opening of said first flow divider and with an outlet-side, second measuring tube end into a fourth flow opening of said second flow divider;
    a first coupling element of the first type, which is spaced both from said first flow divider as well as also from said second flow divider, and affixed, to each of the four measuring tubes and which serves for setting eigenfrequencies of natural oscillation modes of said tube arrangement, in which each of the four measuring tubes simultaneously executes or can execute bending oscillations about a respective static resting position; and
    an electro-mechanical exciter mechanism for producing and/or maintaining bending oscillations of each of said four measuring tubes, wherein:
    said two flow dividers are embodied and arranged in the measuring transducer in such a manner, that an imaginary first connecting axis of the measuring transducer imaginarily connecting said first flow opening of said first flow divider with the first flow opening of said second flow divider extends parallel to an imaginary second connecting axis of the measuring transducer imaginarily connecting the second flow opening of said first flow divider with the second flow opening of said second flow divider,
    and that an imaginary third connecting axis of the measuring transducer imaginarily connecting the third flow opening of said first flow divider with the third flow opening of said second flow divider extends parallel to an imaginary fourth connecting axis of the measuring transducer imaginarily connecting the fourth flow opening of said first flow divider with the fourth flow opening of said second flow divider;
    the measuring tubes are embodied and arranged in such a manner,
    that said tube arrangement exhibits a first imaginary longitudinal section plane extending both between the first measuring tube and the third measuring tube, as well as also between the second measuring tube and the fourth measuring tube,
    and that said tube arrangement exhibits a second imaginary longitudinal section plane perpendicular to its imaginary first longitudinal section plane and extending both between the first measuring tube and the second measuring tube as well as also between the third measuring tube and the fourth measuring tube;
    and said first coupling element of the first type includes a deformation body and four connecting struts, of which connecting struts: a first connecting strut is connected with said deformation body and with the first measuring tube, a second connecting strut is connected with said deformation body and with the second measuring tube, a third connecting strut is connected with said deformation body and with the first measuring tube, and a fourth connecting strut is connected with said deformation body and with the fourth measuring tube.

2. The measuring transducer as claimed in claim 1, wherein: each of said four measuring tubes is, at least sectionally, V-shaped or, at least sectionally, circular arc shaped.

3. The measuring transducer as claimed in claim 1, wherein:
    said four connecting struts, comprise, in each case, metal;
    and/or said four connecting struts, comprise, in each case, at least partially, steel;
    and/or each of said four connecting struts is, in each case, connected with the respective measuring tube by material bonding;
    and/or each of said four connecting struts is, in each case, welded to the respective measuring tube;
    and/or each of said four connecting struts is, in each case, affixed to said deformation body by material bonding;
    and/or each of said four connecting struts in each case, is connected with said deformation body by means of a screwed connection.

4. The measuring transducer as claimed in claim 1, wherein:
- said exciter mechanism is embodied in such a manner that each of said four measuring tubes is excitable, and/or said exciter mechanism is embodied in such a manner that said first measuring tube and said second measuring tube are excitable to bending oscillations opposite-equal relative to the second imaginary longitudinal section plane, and said third measuring tube and said fourth measuring tube are excitable to bending oscillations opposite-equal relative to the second imaginary longitudinal section plane;
- and/or said exciter mechanism is embodied in such a manner that said first measuring tube and said third measuring tube are excitable to bending oscillations opposite-equal relative to the second imaginary longitudinal section plane, and said second measuring tube and said fourth measuring tube are excitable to bending oscillations opposite-equal relative to the second imaginary longitudinal section plane;
- and/or said tube arrangement is mirror symmetrical relative to the first imaginary longitudinal section plane;
- and/or said tube arrangement is mirror symmetrical relative to the second imaginary longitudinal section plane; and/or said tube arrangement is mirror symmetrical both relative to the first imaginary longitudinal section plane as well as also relative to the second imaginary longitudinal section plane;
- and/or said first coupling element of the first type is embodied and arranged in such a manner that it is mirror symmetrical both relative to the first imaginary longitudinal section plane as well as also relative to the second imaginary longitudinal section plane of said tube arrangement;
- and/or each of said four measuring tubes has a bending stiffness determined by a modulus of elasticity dependent on a material of said measuring tube, as well as also by an areal moment of inertia dependent on a caliber and a wall thickness, and wherein both said second measuring tube as well as also said third measuring tube and said fourth measuring tube each have a bending stiffness, which in each case is equal to a bending stiffness, $E_{18}J_{18}$, of said first measuring tube;
- and/or said deformation body is formed by means of a frame construction.

5. The measuring transducer as claimed in claim 1, wherein:
- said first connecting strut is connected with a first strut end with said deformation body and with a second strut end with said first measuring tube;
- said second connecting strut is connected with a first strut end with said deformation body and with a second strut end with said second measuring tube;
- said third connecting strut is connected with a first strut end with said deformation body and with a second strut end with said third measuring tube; and
- said fourth connecting strut is connected with a first strut end with said deformation body and with a second strut end with said fourth measuring tube.

6. The measuring transducer as claimed in claim 1, wherein:
- said tube arrangement exhibits an imaginary cross sectional plane perpendicular both to the first imaginary longitudinal section plane as well as also to the second imaginary longitudinal section plane.

7. The measuring transducer as claimed in claim 6, wherein:
- a center of mass of the tube arrangement lies in the imaginary cross sectional plane; and/or
- said tube arrangement is mirror symmetrical relative to the imaginary cross sectional plane; and/or
- each of said four measuring tubes in each case has a measuring tube-peak, defined as the greatest perpendicular distance of the respective measuring tube from the first imaginary longitudinal section plane, and the imaginary cross sectional plane intersects each of said four measuring tubes in its respective measuring tube peak.

8. The measuring transducer as claimed in claim 6, wherein: said deformation body includes at least two longitudinal struts, of which:
- a first longitudinal strut, which is at least sectionally straight, and which extends from said first connecting strut to said third connecting strut, is arranged spaced from the second imaginary longitudinal section plane exclusively on a side of the longitudinal section plane occupied both by said first as well as also by said third measuring tube,
- and a second longitudinal strut, which is at least sectionally straight, and which extends from said second connecting strut to said fourth connecting strut, is arranged spaced from the second imaginary longitudinal section plane exclusively on a side of the longitudinal section plane occupied both by said second as well as also by said fourth measuring tube.

9. The measuring transducer as claimed in claim 1, wherein:
- said first longitudinal strut is at least sectionally straight in projection on the imaginary cross sectional plane, and said second longitudinal strut is at least sectionally straight in projection on the imaginary cross sectional plane;
- and/or said first longitudinal strut extends at least sectionally perpendicular to the first imaginary longitudinal section plane, and consequently parallel to the second imaginary longitudinal section plane, and said second longitudinal strut extends at least sectionally perpendicular to said first imaginary longitudinal section plane, and consequently parallel to the second imaginary longitudinal section plane;
- and/or said first longitudinal strut includes a subsection which is straight at least in projection on said imaginary cross sectional plane, this subsection, in projection on said cross sectional plane, extends with a length, $l_{L1}$, between said first and said third connecting strut, perpendicular to the first imaginary longitudinal section plane at least in projection on the imaginary cross sectional plane, and extends at a distance, $a_{L1}$, parallel to the second imaginary longitudinal section plane, and said second longitudinal strut includes a subsection which is straight at least in projection on the imaginary cross sectional plane, this subsection, in projection on the cross sectional plane, extends with a length, $l_{L2}$, extending between said second and said fourth connecting strut, perpendicular to the first imaginary longitudinal section plane at least in projection on the imaginary cross sectional plane, and extends at a distance, $a_{L2}$, parallel to the second imaginary longitudinal section plane;
- and/or the entire first longitudinal strut is straight, at least in projection on the imaginary cross sectional plane, in such a manner that the straight subsection of said first longitudinal strut extends from said first connecting strut to said third connecting strut, and consequently its length, $l_{L1}$, corresponds to a minimum distance between the first strut end of said third connecting strut and the first strut end of said third connecting strut, and the entire second longitudinal strut is straight at least in projection on the imaginary cross sectional plane, in such a manner that the straight subsection of said second longitudinal strut extends from said second connecting strut to said fourth connecting strut, and consequently its length, $l_{L2}$, corresponds to a minimum distance between the first strut end of said second connecting strut and the first strut end of said fourth connecting strut.

10. The measuring transducer as claimed in claim 8, wherein: said first longitudinal strut exhibits a minimum bending stiffness, $E_{L1} \cdot J_{L1,min}$, determined by a modulus of elasticity, $E_{L1}$, dependent on a material of said longitudinal strut, as well as also by a minimum areal moment of inertia, $J_{L1,min}$, about an imaginary principal bending axis immanent to said longitudinal strut, and said second longitudinal strut exhibits a minimum bending stiffness, $E_{L2} \cdot J_{L2,min}$, determined by a modulus of elasticity, $E_{L2}$, dependent on a material of said longitudinal strut, as well as also by a minimum areal moment of inertia, $J_{L2,min}$, about an imaginary principal bending axis immanent to said longitudinal strut; and said first longitudinal strut and said second longitudinal strut are arranged in such a manner that both the imaginary principal bending axis of the minimum areal moment of inertia, $J_{L1,min}$, of said first longitudinal strut as well as also the imaginary principal bending axis of the minimum areal moment of inertia, $J_{L2,min}$, of said second longitudinal strut in each case extend parallel both to the first longitudinal section plane as well as also to the second imaginary longitudinal section plane, especially in such a manner that the minimum bending stiffness, $E_{L1} \cdot J_{L1,min}$, of said first longitudinal strut is equal to the minimum bending stiffness, $E_{L2} \cdot J_{L2,min}$, of said second longitudinal strut.

11. The measuring transducer as claimed in claim 10, wherein:
said first longitudinal strut exhibits a maximum bending stiffness, $E_{L1} \cdot J_{L1,max}$, determined by the modulus of elasticity, $E_{L1}$, dependent on the material of said longitudinal strut, as well as also by a maximal areal moment of inertia, $J_{L1,max}$, about an imaginary principal bending axis immanent to said longitudinal strut, and said second longitudinal strut exhibits a maximum bending stiffness, $E_{L2} \cdot J_{L2,max}$, determined by the modulus of elasticity, $E_{L2}$, dependent on the material of said longitudinal strut, as well also by a maximal areal moment of inertia, $J_{L2,max}$, about an imaginary principal bending axis immanent to said longitudinal strut;
and said first longitudinal strut and said second longitudinal strut are arranged in such a manner that both the imaginary principal bending axis of the maximal areal moment of inertia, $J_{L1,max}$, of said first longitudinal strut, as well as also the imaginary principal bending axis of the maximal areal moment of inertia, $J_{L2,max}$, of said second longitudinal strut, in each case extend parallel to the first imaginary longitudinal section plane and perpendicular to the second imaginary longitudinal section plane and/or that said first longitudinal strut imaginarily intersects the first imaginary longitudinal section plane and said second longitudinal strut imaginarily intersects the first imaginary longitudinal section plane.

12. The measuring transducer as claimed in claim 10, wherein:
the first longitudinal strut exhibits a spring stiffness, $c_{L1}$, determined by the modulus of elasticity, $E_{L1}$, dependent on the material of said longitudinal strut, as well as also by the strut length, $l_{L1}$, of the longitudinal strut as well as by a surface area, $A_{L1}$, of a cross sectional area coincident with the first imaginary longitudinal section plane, for a tension force or compressive force acting on said longitudinal strut and directed perpendicular to the first imaginary longitudinal section plane,
and the second longitudinal strut exhibits a spring stiffness, $c_{L2}$, determined by the modulus of elasticity, $E_{L2}$, dependent on the material of said longitudinal strut, as well as also by the strut length, $l_{L2}$, of the longitudinal strut as well as by a surface area, $A_{L2}$, of a cross sectional area coincident with the first imaginary longitudinal section plane, for a tension force or compressive force acting on said longitudinal strut and directed perpendicular to the first imaginary longitudinal section plane.

13. The measuring transducer as claimed in claim 12, wherein:
said first longitudinal strut and said second longitudinal strut are in each case embodied and arranged in such a manner that the spring stiffness, $c_{L1}$, of the said first longitudinal strut is equal to the spring stiffness, $c_{L2}$, of said second longitudinal strut; and/or
said first longitudinal strut and said second longitudinal strut are in each case embodied and arranged in such a manner that the spring stiffness, $c_{L1}$, is proportional to $E_{L1} \cdot A_{L1}/l_{L1}$, and the spring stiffness, $c_{L2}$, is proportional to $$E_{L2} \cdot A_{L2}/l_{L2}.$$

14. The measuring transducer as claimed in claim 8, wherein:
said first longitudinal strut is formed by means of a flat bar, and said second longitudinal strut is formed by means of a flat bar; and/or
said first longitudinal strut and said second longitudinal strut are in each case composed of the same material, and/or in each case composed of steel; and/or
said first longitudinal strut and said second longitudinal strut are of equal construction; and/or
said first longitudinal strut and said second longitudinal strut are each of the same material as the connecting struts.

15. The measuring transducer as claimed in claim 8, wherein:
said deformation body includes a first cross brace, which extends from said first longitudinal strut to said second longitudinal strut and which is at least sectionally straight and/or sectionally non-parallel to the second imaginary longitudinal section plane.

16. The measuring transducer as claimed in claim 15, wherein:
said first cross brace exhibits a minimum bending stiffness, $E_{Q1} J_{Q1,min}$, determined by a modulus of elasticity, $E_{Q1}$, dependent on a material of said cross brace as well as also by a minimum areal moment of inertia, $J_{Q1,min}$, about an imaginary principal bending axis immanent to a said longitudinal strut, and said first cross brace is arranged in such a manner that the imaginary principal bending axis of its minimum areal moment of inertia, $J_{Q1,min}$, extends parallel both to the first longitudinal section plane as well as also to the second imaginary longitudinal section plane, in such a manner that said imaginary principal bending axis lies in the second imaginary longitudinal section plane.

17. The measuring transducer as claimed in claim 15, wherein:
said first cross brace exhibits a maximum bending stiffness, $E_{Q1} J_{Q1,max}$, determined by the modulus of elasticity, $E_{Q1}$, dependent on the material of said cross brace, as well as also by a maximal areal moment of inertia, $J_{Q1,max}$, about an imaginary principal bending axis immanent to said longitudinal strut, and is so arranged that said imaginary principal bending axis extends perpendicular to the first imaginary longitudinal section plane and parallel to the second imaginary longitudinal section plane;
and/or said first cross brace extends from said first connecting strut to said second connecting strut; and/or said first cross brace exhibits a smaller cross section in a region, in which it imaginarily intersects the second imaginary longitudinal section plane, than it has in an adjoining, neighboring region extending to said first connecting strut, and that it exhibits in an adjoining, neighboring region extending to said second connecting strut.

18. The measuring transducer as claimed in claim 15, wherein:
said deformation body comprises a second cross brace, which extends from said first longitudinal strut to said second longitudinal strut, and which is at least sectionally straight and/or sectionally non-parallel to the second imaginary longitudinal section plane and/or is constructed equally to said first cross brace; second cross brace exhibits a maximum bending stiffness, $E_{Q2} J_{Q2,max}$, determined by the modulus of elasticity, $E_{Q2}$, dependent on the material of said cross brace, as well as also by a maximal areal moment of inertia, $J_{Q2,max}$, about an imaginary principal bending axis immanent to a said longitudinal strut, and is so arranged that said imaginary principal bending axis extends perpendicular to the first imaginary longitudinal section plane and parallel to the second imaginary longitudinal section plane;
and said second cross brace exhibits a minimum bending stiffness, $E_{Q2} J_{Q2,min}$, determined by a modulus of elasticity, $E_{Q2}$, dependent on a material of said cross brace as well as also by a minimum areal moment of inertia, $J_{Q2,min}$, about an imaginary principal bending axis immanent to said longitudinal strut and is so arranged that said imaginary principal bending axis extends parallel both to the first longitudinal section plane as well as also to the second imaginary longitudinal section plane, in such a manner that the imaginary principal bending axis of the minimum areal moment of inertia, $J_{Q2,min}$, of said second cross brace lies in the second imaginary longitudinal section plane.

19. The measuring transducer as claimed in claim 18, wherein:
said second cross brace extends from said third connecting strut to said fourth connecting strut;
and/or said second cross brace exhibits a smaller cross section in a region, in which it imaginarily intersects the second imaginary longitudinal section plane, than it exhibits in an adjoining, neighboring region extending to said third connecting strut and that it has as in an adjoining neighboring region extending to said fourth connecting strut;
and/or said first cross brace is formed by means of a flat bar, one composed of metal, and the second cross brace is formed by means of a flat bar, one composed of metal; and/or said first cross brace and said second cross brace are each composed of the same material and/or in each case composed of steel.

20. The measuring transducer as claimed in claim 18, wherein:
said deformation body has a third longitudinal strut, which extends from said first cross brace to said second cross brace with a length, $l_{L3}$ and which is straight in projection on the imaginary cross sectional plane, a third longitudinal strut which is plate-shaped and/or parallel to the second imaginary longitudinal section plane and/or spaced from said first longitudinal strut by the same distance as it is from said second longitudinal strut.

21. The measuring transducer as claimed in claim 20, wherein:
said third longitudinal strut exhibits a minimum bending stiffness, $E_{L3} J_{L3,min}$, determined by a modulus of elasticity, $E_{L3}$, dependent on a material of said longitudinal strut, as well as by a minimum areal moment of inertia, $J_{L3,min}$, about an imaginary principal bending axis immanent to said longitudinal strut, and is so arranged that said imaginary principal bending axis extends parallel both to the first imaginary longitudinal section plane as well as also to the second imaginary longitudinal section plane;
and/or said third longitudinal strut is affixed with a first strut end to said first cross brace, in a region, in which said first cross brace imaginarily intersects the second imaginary longitudinal section plane, and with a second strut end to said second cross brace, in a region, in which said second cross brace imaginarily intersects the second imaginary longitudinal section plane, in such a manner that said third longitudinal strut is affixed with the first strut end to said first cross brace in the region of its minimum areal moment of inertia, $J_{Q1,min}$, and with the second strut end to said second cross brace in the region of its minimum areal moment of inertia, $J_{Q2,min}$;
and/or said third longitudinal strut exhibits a spring stiffness, $c_{L3}$
for a tension force or compressive force acting on said longitudinal strut and directed perpendicular to the first imaginary longitudinal section plane;
and/or said third longitudinal strut is formed by means of a flat bar;
and/or said first longitudinal strut, the said second longitudinal strut and said third longitudinal strut are each composed of steel;
and/or the length, $l_{L3}$, of said third longitudinal strut is greater than 10% of the length, $l_{L1}$, of said first longitudinal strut;
and/or the length, $l_{L1}$, of said third longitudinal strut is smaller than 120% of the length, $l_{L1}$, of said first longitudinal strut; and/or said third longitudinal strut has a maximum bending stiffness, $E_{L3} J_{L3,max}$, determined by a modulus of elasticity, $E_{L3}$, dependent on the material of said longitudinal strut, as well as also by a maximal areal moment of inertia, $J_{L3,max}$, about a imaginary principal bending axis immanent to said longitudinal strut, and is so arranged that the imaginary principal bending axis of its maximal areal moment of inertia, $J_{L3,max}$, extends parallel to the first imaginary longitudinal section plane and perpendicular to the second imaginary longitudinal section plane;
and/or said first, said second and said third longitudinal struts are embodied in such a manner that the deformation body fulfills the specification:

$$\frac{\left(\frac{a_{L1}}{2}\right)^2 \cdot \frac{E_{L1} \cdot A_{L1}}{I_{L1}} + \left(\frac{a_{L1}}{2}\right)^2 \cdot \frac{E_{L3} \cdot A_{L3}}{I_{L3}}}{6 \cdot \frac{E_{L1} \cdot J_{L1,min}}{I_{L1}}} > 1,$$

or the specification:

$$\cdot \cdot \frac{\left(\frac{a_{L2}}{2}\right)^2 \cdot \frac{E_{L2} \cdot A_{L2}}{I_{L2}} + \left(\frac{a_{L2}}{2}\right)^2 \cdot \frac{E_{L3} \cdot A_{L3}}{I_{L3}}}{6 \cdot \frac{E_{L2} \cdot J_{L2,min}}{I_{L2}}} > 1.$$

22. The measuring transducer as claimed in claim 1, wherein:
each of the connecting struts of the coupling element of the first type extends at least sectionally perpendicular to the first imaginary longitudinal section plane, and consequently parallel to the second imaginary longitudinal section plane;
and/or each of the connecting struts of said first coupling element of the first type includes a straight subsection, which extends, at least sectionally, perpendicular to the first imaginary longitudinal section plane, and consequently parallel to the second imaginary longitudinal section plan;
and/or each of the connecting struts of the coupling element of the first type imaginarily intersects the first imaginary longitudinal section plane, with its respective straight subsection;
and/or said first and said third connecting struts are oriented so as to be aligned with one another and wherein said second and said fourth connecting struts are oriented so as to be aligned with one another;
and/or said first connecting strut exhibits a minimum bending stiffness, $E_{V1}J_{V1,min}$, determined by the modulus of elasticity, $E_{V1}$, dependent on the material of said connecting strut, as well as also by a minimum areal moment of inertia, $J_{V1,min}$, about an imaginary principal bending axis immanent to said connecting strut, said second connecting strut has a minimum bending stiffness, $E_{V2}J_{V2,min}$, determined by the modulus of elasticity, $E_{V2}$, dependent on the material of said connecting strut, as well as also by a minimum areal moment of inertia, $J_{V2,min}$, about an imaginary principal bending axis immanent to said connecting strut, said third connecting strut has a minimum bending stiffness, $E_{V3}J_{V3,min}$, determined by the modulus of elasticity, $E_{V3}$, dependent on the material of said connecting strut, as well as also by a minimum areal moment of inertia, $J_{V3,min}$, about an imaginary principal bending axis immanent to said connecting strut, and said fourth connecting strut exhibits a minimum bending stiffness, $E_{V4}J_{V4,min}$, determined by the modulus of elasticity, $E_{V4}$, dependent on the material of said connecting strut, as well as also by a minimum areal moment of inertia, $J_{V4,min}$, about an imaginary principal bending axis immanent to said connecting strut, and each of said four connecting struts is in each case arranged in such a manner that the imaginary principal bending axis of their respective minimum areal moments of inertia extends parallel to the first longitudinal section plane and is perpendicular to the second imaginary longitudinal section plane; and/or the maximum bending stiffness, $E_{V1}J_{V1,max}$, of said first connecting strut is greater than the minimum bending stiffness, $E_{L1}J_{L1,max}$, of said first longitudinal strut;
and/or said first connecting strut exhibits a maximum bending stiffness, $E_{V1}J_{1,max}$, determined by a modulus of elasticity, $E_{V1}$, dependent on a material of said connecting strut, as well as also by a maximal areal moment of inertia, $J_{V1,max}$, about an imaginary principal bending axis immanent to said connecting strut; said second connecting strut has a maximum bending stiffness, $E_{V2}J_{V2,max}$ determined by a modulus of elasticity, $E_{V2}$, dependent on a material of said connecting strut, as well as also by a maximal areal moment of inertia, $J_{V2,max}$, about an imaginary principal bending axis immanent to said connecting strut, said third connecting strut exhibits a maximum bending stiffness, $E_{V3}J_{V3,max}$, determined by a modulus of elasticity, $E_{V3}$, dependent on a material of said connecting strut, as well as also by a maximal areal moment of inertia, $J_{V3,max}$, about an imaginary principal bending axis immanent to said connecting strut, and said fourth connecting strut exhibits a maximum bending stiffness, $E_{V4}J_{V4,max}$, determined by a modulus of elasticity, $E_{V4}$, dependent on a material of said connecting strut, as well as also by a maximal areal moment of inertia, $E_{4,max}$, about an imaginary principal bending axis immanent to said connecting strut, and each of said four connecting struts is in each case arranged in such a manner that the imaginary principal bending axis of their respective maximal areal moments of inertia in each case extends parallel both to the first longitudinal section plane as well as also to the second imaginary longitudinal section plane;
and/or each of said connecting struts is formed by means of a flat bar, which is at least sectionally curved manner in projection on the second imaginary longitudinal section plane;
and/or said first connecting strut, said second connecting strut, the said third longitudinal strut and said fourth connecting strut are each composed of steel.

23. The measuring transducer as claimed in claim 1, wherein:
said tube arrangement further comprises a second coupling element of said first type, which is spaced both from said first flow divider as well as also from said second flow divider, and is affixed on the outlet side to each of said four measuring tubes, and is essentially constructed equally to said first coupling element of said first type, and serves for adjusting eigenfrequencies of natural oscillation modes of said tube arrangement.

24. The measuring transducer as claimed in claim 23, wherein:
said first coupling element of first type and said second coupling element of the first type are mechanically connected with one another by means of at least one connecting element.

25. The measuring transducer as claimed in claim 1, wherein: said tube arrangement further comprises:
a first coupling element of the second type, which, for forming inlet-side oscillation nodes both for vibrations of said first measuring tube, as well as also for vibrations of said second measuring tube opposite-equal thereto, is affixed on the inlet side to said first measuring tube and to said second measuring tube;
a second coupling element of the second type, which, for forming outlet-side oscillation nodes both for vibrations of said first measuring tube, as well as also for vibrations of said second measuring tube opposite-equal thereto, is affixed on the outlet side to said first measuring tube and to said second measuring tube;

a third coupling element of the second type, which, for forming inlet-side oscillation nodes both for vibrations of said third measuring tube, as well as also for vibrations of said fourth measuring tube opposite-equal thereto, is affixed on the inlet side, spaced both from said first flow divider as well as also from second flow divider, to said third measuring tube and to said fourth measuring tube;

as well as a fourth coupling element of the second type, which, for forming outlet-side oscillation nodes both for vibrations of said third measuring tube, as well as also for vibrations of said fourth measuring tube opposite-equal thereto, is affixed on the outlet side, spaced both from said first flow divider as well as also from said second flow divider, as well as also from said first coupling element, to said third measuring tube and to said fourth measuring tube.

26. The measuring transducer as claimed in claim 25, wherein:

said first coupling element of the second type is affixed both to a tube segment of said first measuring tube extending between said first flow divider and said first coupling element of the first type, as well as also to a tube segment of said second measuring tube extending between said first flow divider and said first coupling element of the first type, and said second coupling element of the second type is affixed both to a tube segment of said first measuring tube extending between said second flow divider and said second coupling element of the first type, as well as also to a tube segment of said second measuring tube extending between said second flow divider and said second coupling element of the first type, in such a manner;

that a wanted oscillatory length of said second measuring tube corresponding to a length of a section of a deflection curve of said second measuring tube extending between said first coupling element of the second type and said second coupling element of the second type is equal to a wanted oscillatory length, $L_{18x}$, of said first measuring tube corresponding to a length of a section of a deflection curve of said first measuring tube extending between said first coupling element of the second type and said second coupling element of the second type; and that a minimum distance between said first coupling element of a second type and the second end of said second connecting strut of the coupling element of the first type, measured along a surface element of said second measuring tube, is equal to a minimum distance, $a_K$, between said first coupling element of the second type and the second end of said first connecting strut of the coupling element of the first type, measured along a surface element of said first measuring tube; and said third coupling element of the second type is affixed both to a tube segment of said third measuring tube extending between said first flow divider and said first coupling element as well as also to a tube segment of said fourth measuring tube extending between said first flow divider and said first coupling element of the first type, and said fourth coupling element of the second type is affixed both to a tube segment of said third measuring tube extending between said second flow divider and said second coupling element of the first type as well as also to a tube segment of said fourth measuring tube extending between said second flow divider and said second coupling element of the first type, in such a manner, that both a wanted oscillatory length of said third measuring tube corresponding to a length of a section of a deflection curve of said third measuring tube extending between said third coupling element of the second type and said fourth coupling element of the second type, as well as also a wanted oscillatory length of said fourth measuring tube corresponding to a length of a section of a deflection curve of said fourth measuring tube extending between said third coupling element of the second type and said fourth coupling element of the second type are in each case equal to the wanted oscillatory length, $L_{18x}$, of said first measuring tube, and that both a minimum distance between said third coupling element of the second type and the second end of said third connecting strut of said coupling element of the first type, measured along a surface element of said third measuring tube, as well as also a minimum distance between said third coupling element of the second type and the second end of said fourth connecting strut of said coupling element of the first type, measured along a surface element of said fourth measuring tube, are in each case equal to the minimum distance, $a_K$, between said first coupling element of the second type and the second end of said first connecting strut of said coupling element of the first type.

27. The measuring transducer as claimed in claim 12, wherein:

each of said four measuring tubes exhibits a tube cross section determined by a caliber of said measuring tube as well as a wall thickness of said measuring tube and both said second measuring tube as well as also said third measuring tube and said fourth measuring tube in each case exhibits a caliber, which in each case is equal to a caliber, $D_{18}$, of said first measuring tube, and in each case exhibits a wall thickness, which is equal to a wall thickness, $h_{18}$, of said first measuring tube, and, consequently, both said second measuring tube as well as also said third measuring tube and fourth measuring tube exhibit an outer diameter which is equal to an outer diameter, $D_{18}+2h_{18}$, of said first measuring tube; and the distance, au, of said first longitudinal strut from the second imaginary longitudinal section plane amounts to less than 200% of said outer diameter $D_{18}+2h_{18}$, and more than 50% of said outer diameter $D_{18}+2h_{18}$.

28. The measuring transducer as claimed in claim 5, wherein: each of said four connecting struts exhibits a strut length defined by a minimum distance between its respective first strut end and its respective second strut end, and both said second connecting strut as well as also said third as well as said fourth connecting strut each exhibit a strut length equal to the strut length, $L_{V1}$, of said first connecting strut.

29. The measuring transducer as claimed in claim 28, wherein:

said tube arrangement fulfills both the specification:

$$\frac{l_{V1}}{l_{V1}+0.5\cdot l_{L1}} > 0.3,$$

as well as also the specification:

$$\frac{l_{V1}}{l_{V1}+0.5\cdot l_{L1}} < 0.7;$$

and/or said tube arrangement fulfills the specification:

$$\frac{\frac{E_{V1} \cdot A_{V1}}{1_{V1}}}{3 \cdot \frac{E_{18} \cdot J_{18}}{a_K^3 \cdot \left(1 - 1.5 \cdot \frac{a_k}{L_{18x}}\right)}} < 20.$$

30. The measuring transducer as claimed in claim 1, wherein: said measuring tubes are bent in such a manner and arranged in such a manner that a caliber to height ratio, $D_{18}/Q_{18}$, of the tube arrangement, defined by a ratio of the caliber, $D_{18}$, of said first measuring tube to a maximal lateral expanse, $Q_{18}$, of said tube arrangement, measured from a peak of said first measuring tube to a peak of said third measuring tube, amounts to more than 0.05 and/or less than 0.35;

and/or said tube arrangement fulfills both the specification:

$$\frac{1_{V1} + 0.5 \cdot 1_{L1}}{0.5 \cdot Q_{18} - (D_{18} + 2 \cdot h_{18})} > 0.2$$

as well as also the specification $$\frac{1_{V1} + 0.5 \cdot 1_{L1}}{0.5 \cdot Q_{18} - (D_{18} + 2 \cdot h_{18})} < 0.9;$$

and/or
wherein the tube arrangement fulfills both the specification:

$$\frac{0.5 \cdot 1_{L1}}{0.5 \cdot Q_{18} - (D_{18} + 2 \cdot h_{18})} > 0.1$$

as well as also the specification:

$$\frac{0.5 \cdot 1_{L1}}{0.5 \cdot Q_{18} - (D_{18} + 2 \cdot h_{18})} < 0.5;$$

and/or said tube arrangement exhibits between said first measuring tube and said third measuring tube a minimum distance, $A_{18}$, determined by a minimum distance between the first and third flow opening of the first flow divider, or the first and third flow opening of said second flow divider and said tube arrangement fulfills the specification:

$$\frac{0.5 \cdot 1_{L1}}{0.5 \cdot Q_{18} - (D_{18} + 2 \cdot h_{18})} \leq \frac{a_k}{L_{18,x}} + \frac{0.5 \cdot D_{18} + h_{18} + 0.5 \cdot A_{18}}{0.5 \cdot Q_{18} - (D_{18} + 2 \cdot h_{18})};$$

and/or said tube arrangement fulfills the specification:

$$\frac{0.5 \cdot 1_{L1}}{0.5 \cdot Q_{18} - (D_{18} + 2 \cdot h_{18})} > 0.2 \cdot \frac{a_k}{L_{18,x}} + \frac{0.5 \cdot D_{18} + h_{18} + A_{18}}{0.5 \cdot Q_{18} - (D_{18} + 2 \cdot h_{18})};$$

and/or said four measuring tubes, said first coupling element of the first type, as well as said first, said second, said third and said fourth coupling elements of the second type are embodied and arranged in such a manner that, as a result, said tube arrangement fulfills the specification:

$$\frac{\frac{1}{1_{V1}^2} \cdot \left[\frac{1}{3 \cdot \frac{E_{V1} \cdot J_{V1,max}}{1_{V1}}} + \left(\frac{a_{L1}}{2}\right)^2 \cdot \left(\frac{E_{L1} \cdot A_{L1}}{1_{L1}} + \frac{E_{L3} \cdot A_{L3}}{1_{L3}}\right)\right]}{3 \cdot \frac{E_{18} \cdot J_{18}}{a_K^3 \cdot \left(1 - 1.5 \cdot \frac{a_k}{L_{18x}}\right)}} > 0.01.$$

31. The measuring transducer as claimed in claim 1, wherein:

said tube arrangement exhibits a natural bending oscillation mode of the first type, in which said first measuring tube and said second measuring tube execute bending oscillations, which are opposite-equal relative to the second imaginary longitudinal section plane, in each case about a static rest position associated with the respective measuring tube and in which said third measuring tube and said fourth measuring tube execute bending oscillations which are opposite-equal relative to the second imaginary longitudinal section plane in each case about a static rest position associated with the respective measuring tube in such a manner, that, relative to the second imaginary longitudinal section plane, said bending oscillations of said first measuring tube are also opposite-equal to said bending oscillations of said third measuring tube, and that, relative to the second imaginary longitudinal section plane, said bending oscillations of said second measuring tube are also opposite-equal to said bending oscillations of said fourth measuring tube;

and said tube arrangement exhibits a natural bending oscillation mode of the second type, in which said first measuring tube and said second measuring tube execute bending oscillations, which are opposite-equal relative to the second imaginary longitudinal section plane in each case about a static rest position associated with the respective measuring tube and in which said third measuring tube and said fourth measuring tube execute bending oscillations, which are opposite-equal relative to the second imaginary longitudinal section plane in each case about a static rest position associated with the respective measuring tube in such a manner, that, relative to the second imaginary longitudinal section plane, said bending oscillations of said first measuring tube are also opposite-equal to said bending oscillations of said fourth measuring tube, and that, relative to the second imaginary longitudinal section plane, said bending oscillations of said second measuring tube are also opposite-equal to said bending oscillations of said third measuring tube, and an eigenfrequency, $f_{18V,Ref}$, of the bending oscillation mode of the first type, measurable in the case of measuring tubes filled completely with air as reference medium, is different from an eigenfrequency, $f_{18X,Ref}$, of the bending oscillation mode of the second type measurable at the same time as said eigenfrequency, $f_{18V,Ref}$, of the bending oscillation mode of the first type and/or measurable in the case of measuring tubes completely filled with said reference medium.

32. The measuring transducer as claimed in claim 1, wherein:
said deformation body of said coupling element of the first type exhibits a mass, $M_{DB}$, which amounts to less than 50% of an empty mass, $M_{18}$, of said first measuring tube.

33. The measuring transducer as claimed in claim 32, wherein:
the mass, $M_{DB}$, of said deformation body of said first coupling element of the first type is more than 10% of the empty mass, $M_{18}$, of said first measuring tube;
and/or said first coupling element of the first type fulfills the specification:

$$\sqrt{\dfrac{\dfrac{1}{M_{DB}} \cdot \dfrac{E_{V1} \cdot J_{V1,min}}{1_{V1}^3}}{f_{18V,Ref}}} > 1.05,$$

and/or said second measuring tube, said third measuring tube and said fourth measuring tube each exhibit an empty mass, which equals the empty mass, $M_{18}$, of said first measuring tube.

34. The measuring transducer as claimed in claim 1, wherein:
inherent to the coupling element of the first type is an eigenmode of the first type, in which said deformation body of said coupling element can execute mechanical oscillations with an eigenfrequency, $f_{24X}$, in a plane of oscillation parallel to the imaginary cross sectional plane, wherein these oscillations are mirror symmetrical both relative to the first imaginary longitudinal section plane as well as also relative to the second imaginary longitudinal section plane, or cause said deformation body to appear mirror symmetrical both relative to the first imaginary longitudinal section plane as well as also relative to the second imaginary longitudinal section plane, as well as an eigenmode of the second type, in which said deformation body of said coupling element can execute mechanical oscillations in said plane of oscillation parallel to the imaginary cross sectional plane with an eigenfrequency, $f_{24Y}$, which is especially different from the eigenfrequency, $f_{24X}$, of the eigenmode of the first type, wherein these oscillations are mirror symmetrical only relative to the second imaginary longitudinal section plane, or cause the deformation body temporarily to appear mirror symmetrical only relative to the second imaginary longitudinal section plane; and
said deformation body of said coupling element of the first type is embodied in such a manner that an eigenfrequency ratio, $f_{24X}/f_{24Y}$, inherent to said coupling element, defined by a ratio of the eigenfrequency of its eigenmode of the first type to the eigenfrequency of its eigenmode of the second type, is greater than one, especially greater than 10.

35. The measuring transducer as claimed in claim 34, wherein:
inherent to said coupling element of the first type is a natural oscillatory mode of a third type, in which said deformation body, only moving translationally in the direction of a longitudinal axis parallel both to the first imaginary longitudinal section plane as well as also to the second imaginary longitudinal section plane, can oscillate with an eigenfrequency, $f_{24Z}$, about an associated static rest position, and in such a manner that simultaneous to this, said four connecting struts execute bending oscillations in the direction of the longitudinal axis about respective static resting positions, bending oscillations in the same direction and/or uniform bending oscillations; and
wherein said coupling element of the first type is embodied in such a manner that the eigenfrequency, $f_{24Z}$, of its eigenmode of the third type is not equal to the eigenfrequency, $f_{18V,Ref}$, of the bending oscillation mode of the first type of said tube arrangement measurable in the case of measuring tubes completely filled with air, especially in such a manner that said eigenfrequency, $f_{24Z}$, of the oscillatory mode of the third type of said coupling element of the first type is more than 10 Hz greater than said eigenfrequency, $f_{18V,Ref}$, of the bending oscillation mode of the first type of said tube arrangement, and/or that said eigenfrequency, $f_{24Z}$, of the oscillatory mode of the third type of said coupling element of the first type amounts to more than 101%, especially more than 105%, of said eigenfrequency, $f_{18V,Ref}$, of the bending oscillation mode of the first type of said tube arrangement.

36. The measuring transducer as claimed in claim 33, wherein:
inherent to said coupling element of the first type is a natural oscillatory mode of the fourth type, in which said deformation body, moving only translationally in the coupler plane of oscillation parallel to the imaginary cross sectional plane, can oscillate about its associated static rest position with an eigenfrequency, $f_{24XY}$, in such a manner that said four connecting struts execute bending oscillations about their respective static resting positions in said coupler plane, uniform bending oscillations and/or bending oscillations in the same direction; and
said coupling element of the first type is embodied in such a manner that the eigenfrequency, $f_{24XY}$, of its eigenmode of the fourth type is higher than the eigenfrequency, $f_{18X}$, of the bending oscillation mode of the second type of the tube arrangement, in such a manner that said eigenfrequency, $f_{24XY}$, of the mode of oscillation of the fourth type of said coupling element of the first type is more than 10 Hz greater than said eigenfrequency, $f_{18X}$, of the bending oscillation mode of the second type of said tube arrangement, and/or that said eigenfrequency, $f_{24XY}$, of the mode of oscillation of the fourth type of said coupling element of the first type amounts to more than 101%, especially more than 105%, of said eigenfrequency, $f_{18X}$, of the bending oscillation mode of the second type of said tube arrangement.

37. A measuring system for measuring density and/or mass flow rate and/or a total mass flow totaled over a time interval of a medium flowing, at least at times, in a pipeline, said measuring system comprising:
a measuring transducer as claimed in claim 1; and
transmitter electronics electrically coupled with said measuring transducer for activating the exciter mechanism of said measuring transducer, and for evaluating oscillation signals delivered by said measuring transducer.

38. The measuring system as claimed in claim 37, wherein: during operation, said four measuring tubes, excited by said exciter mechanism, simultaneously execute bending oscillations, especially bending oscillations in a bending oscillation fundamental mode of the first type.

39. The measuring system as claimed in claim 37, wherein: said exciter mechanism comprises at least a first oscillation exciter acting on said first and said second measuring tubes for converting electrical excitation power fed into said exciter mechanism by means of said transmitter electronics into mechanical exciter forces effecting bending oscillations of said first measuring tube and effecting bending oscillations of said second measuring tube opposite-equal to said bending oscillations of said first measuring tube relative to the second imaginary longitudinal section plane of said tube arrangement.

40. The measuring system as claimed in claim 39, wherein: said first oscillation exciter is formed by means of a permanent magnet held on said first measuring tube in the region of a measuring tube peak, and a cylindrical coil held on said second measuring tube, in the region of a measuring tube peak, and permeated by the magnetic field of the permanent magnet.

41. The measuring system as claimed in claim 39, wherein: said exciter mechanism further comprises a second oscillation exciter acting on said third and said fourth measuring tubes, affixed to said third and said fourth measuring tubes for converting electrical excitation power fed into the exciter mechanism by means of said transmitter electronics into mechanical exciter forces effecting bending oscillations of said third measuring tube and effecting bending oscillations of said fourth measuring tube opposite-equal to said bending oscillations of said third measuring tube relative to the second imaginary longitudinal section plane of said tube arrangement.

42. The measuring system as claimed in claim 41, wherein: said second oscillation exciter is formed by means of a permanent magnet held on said third measuring tube, in the region of a measuring tube peak, and by means of a cylindrical coil held on said fourth measuring tube, in the region of a measuring tube peak, and permeated by the magnetic field of the respective permanent magnet.

43. The measuring system as claimed in claim 37, wherein: said transmitter electronics feeds electrical excitation power into said exciter mechanism by means of at least one variable and/or at least at times periodic, electrical driver signal supplied to said exciter mechanism; and
said exciter mechanism converts the electrical excitation power at least partially both into bending oscillations of said first measuring tube and into bending oscillations of said second measuring tube opposite-equal to bending oscillations of said first measuring tube relative to the second imaginary longitudinal section plane of the said tube arrangement, as well as also into bending oscillations of said third measuring tube and into bending oscillations of said fourth measuring tube opposite-equal to bending oscillations of said third measuring tube relative to the second imaginary longitudinal section plane of said tube arrangement.

44. The measuring system as claimed in claim 43, wherein: the at least one driver signal is fed to said first oscillation exciter.

45. The measuring system as claimed in claim 43, wherein: the at least one driver signal includes a plurality of signal components with signal frequencies differing from one another, and at least one of the signal components of the first driver signal exhibits a signal frequency corresponding to an eigenfrequency of a natural mode of oscillation of said tube arrangement, of the first type, in which each of said four measuring tubes executes bending oscillations.

46. The measuring system as claimed in claim 39, wherein: said exciter mechanism effects oscillations of said measuring tubes by the fact that an exciter force generated by means of said first oscillation exciter and acting on said first measuring tube is opposite to an exciter force generated at the same time by means of said first oscillation exciter and acting on said second measuring tube.

47. The measuring system as claimed in claim 37, wherein: said transmitter electronics, based on electrical excitation power converted in said exciter mechanism, generates a viscosity measured value representing viscosity of the flowing medium; and/or
said transmitter electronics, based on oscillation signals delivered by the measuring transducer, generates a mass flow measured value representing a mass flow rate of the flowing medium and/or a density measured value representing density of the flowing medium.

48. The use of a measuring transducer as claimed in claim 1 for measuring density and/or mass flow rate and/or viscosity and/or Reynolds number of a medium flowing in a process line at least at times with a mass flow rate of more than 1000 t/h.

49. The measuring transducer as claimed in claim 24, wherein the at least one connecting element is rod shaped.

50. The measuring transducer as claimed in claim 24, wherein the at least one connecting element is plate shaped.

51. The measuring transducer as claimed in claim 24, wherein the at least one connecting element is bar shaped.

52. The measuring transducer as claimed in claim 23, wherein: said first coupling element of first type and said second coupling element of the first type are mechanically connected with one another by means of at least one connecting element suppressing translational movement of said deformation body of said first coupling element of the first type relative to said second coupling element of the first type in the direction of a longitudinal axis parallel both to the first imaginary longitudinal section plane as well as also to the second imaginary longitudinal section plane.

* * * * *